US012645002B2

(12) United States Patent (10) Patent No.: US 12,645,002 B2
Umemura et al. (45) Date of Patent: Jun. 2, 2026

(54) ULTRASONIC RECEIVER AND ULTRASONIC OBSERVATION DEVICE

(71) Applicant: SILICON & SYSTEM CO., LIMITED, Hong Kong (CN)

(72) Inventors: Shin-ichiro Umemura, Miyagi (JP); Yoshitaka Tadaki, Saitama (JP); Yoshiaki Takemoto, Tokyo (JP); Kaoru Ogaya, Tokyo (JP)

(73) Assignee: SILICON & SYSTEM CO., LIMITED, Hong Kong (CN)

( * ) Notice: Subject to any disclaimer, the term of this patent is extended or adjusted under 35 U.S.C. 154(b) by 285 days.

(21) Appl. No.: 18/485,380

(22) Filed: Oct. 12, 2023

(65) Prior Publication Data

US 2024/0036224 A1     Feb. 1, 2024

Related U.S. Application Data

(63) Continuation of application No. PCT/JP2022/018488, filed on Apr. 21, 2022.

(30) Foreign Application Priority Data

Apr. 22, 2021     (JP) ................................. 2021-072856

(51) Int. Cl.
*G01V 1/18* (2006.01)
(52) U.S. Cl.
CPC .................................. *G01V 1/186* (2013.01)
(58) Field of Classification Search
CPC . G01V 1/16; G01V 1/18; G01V 1/186; G01H 3/00
See application file for complete search history.

(56) References Cited

U.S. PATENT DOCUMENTS

2007/0282204 A1* 12/2007 Yamashita ............. G10K 11/02
600/459

FOREIGN PATENT DOCUMENTS

JP      H1171200 U      7/1989
JP      04132498 A      5/1992
JP      H04218765 A      8/1992
KR      20110035883 A  *  4/2011  ............. G10K 9/122

OTHER PUBLICATIONS

Nishie et al., Ultrasonic Transducer, Apr. 2011, FIT Machine Translation (Year: 2011).*
Xing, Guangzhen, et al., Review of Field Characterization Techniques for High Intensity Therapeutic Ultrasound, Metrologia, Feb. 23, 2021, 20 pages, vol. 58, Bureau International des Poids et Measures, United Kingdom.

* cited by examiner

*Primary Examiner* — Erika J. Villaluna

(57) ABSTRACT

An ultrasonic receiver encompasses a resin horn, a piezoelectric element provided at a tip of the resin horn exposed to outside, a stealth amplifier disposed at a predetermined minimum distance from the piezoelectric element, embedded in the resin horn and arranged in a behind space to which a shape of the piezoelectric element is projected, configured to change reflection characteristic of a reflection wave reflected by the stealth amplifier, and an input connection member electrically connecting between the piezoelectric element and the stealth amplifier. The predetermined minimum distance is a distance determined by design as a theoretical minimum value of an input stray-capacitance.

8 Claims, 51 Drawing Sheets

INTENSITY OF SOUND PRESSURE

FIG. 6

460nsec

10

REFLECTION
WAVE

TRANSMISSION
WAVE 300 200

−20ns    10

1.6mm 1.6mm

0ns    10

200ns    10

400ns    10

$\theta = 60°$ $\theta = 90°$

CHIP ROTATION ANGLES θ (INCLINATION ANGLES)

MINIMUM ANGLES AT WHICH WAVE-FRONTS INTERSECT WITH CHIP

OFFSET AMOUNT D = 0.3 mm

TIME ($\mu$s)

TIME ($\mu$s)

$t=10\mu m, \theta=90°$

ULTRASONIC RECEIVER AND ULTRASONIC OBSERVATION DEVICE

CROSS REFERENCE TO RELATED APPLICATIONS

This is a continuation of co-pending International Application No. PCT/JP2022/018488 with an international filing date of Apr. 21, 2022, which claims benefit of JP2021-072856 filed on Apr. 22, 2021, the entire contents of each of which are incorporated by reference herein.

BACKGROUND OF THE INVENTION

Field of the Invention

The present invention relates to ultrasonic receivers, such as hydrophones or underwater-microphones and the like, which are used to measure sound fields. Specifically, the present invention relates to ultrasonic receivers, each of which having a built-in amplifier, applicable to medical ultrasonic-diagnostic devices and the like, and ultrasonic observation devices using the ultrasonic receivers.

Description of the Related Art

In an earlier hydrophone, received voltages sensitivity (RVS) of the ultrasonic receiver having a built-in amplifier is extremely low, because a wiring capacitance from a piezoelectric element of the ultrasonic receiver to the built-in amplifier is about 10 pF, while a signal-source capacitance inherent in a piezoelectric element is about 0.1 pF. In the earlier ultrasonic receiver incorporating the built-in amplifier, when an integrated-circuit chip (hereinafter called "IC chip") as an amplifier is arranged in vicinity of the piezoelectric element, a tip size of an ultrasonic probe becomes larger, which results in an unrealistic and unfeasible size, as recited in JP 1992-132498A.

Owing to the above problem of larger size, an idea of miniaturizing the IC chip of the hydrophone is tried in recent years, by disposing the amplifier in vicinity of the piezoelectric element of the hydrophone, as recited in G. Xing et al., Metrologia, Vol. 58, (2021).

However, according to the reviews and speculations by the present inventors, by such a miniaturizing scheme of an ultrasonic probe, a new problem of unnecessary echo, in which ultrasonic waves passing through the piezoelectric element are reflected by the IC chip, and the reflected ultrasonic waves re-enter in the piezoelectric element, has become clear. According to a structure of the hydrophone recited in G. Xing et al., in which the tip of the ultrasonic probe is covered by a metallic enclosure, although influences of diffracted waves from edges of the piezoelectric element having a curved surface is considered, a problem of unnecessary echo, which is generated by reflection waves from the IC chip, is not speculated at all.

SUMMARY OF THE INVENTION

A first aspect of the present invention inheres in an ultrasonic receiver encompassing (a) a resin horn having a tapered shape in part, configured to include a sound-field detection-axis as a central axis, (b) a piezoelectric element provided at a tip of the tapered shape, partially exposed to outside, (c) a stealth amplifier disposed at a predetermined minimum distance from the piezoelectric element, embedded in the resin horn and arranged in a behind space, onto which a shape of the piezoelectric element is projected along the central axis, configured to amplify electric signals generated by an ultrasonic wave transmitted through the piezoelectric element in parallel with the sound-field detection-axis through electro-acoustic conversion in the piezoelectric element, to change reflection characteristic of a reflection wave, which is the ultrasonic wave reflected by the stealth amplifier, and to avoid the reflection wave from being entered to the piezoelectric element, or to avoid a wave-front of the reflection wave from uniformly enter to the piezoelectric element, and (d) an input connection member electrically connecting between the piezoelectric element and the stealth amplifier. In the ultrasonic receiver pertaining to the first aspect of the present invention, the predetermined minimum distance is a distance determined by design as a theoretical minimum value of an input stray-capacitance, which is parasitic in the input connection member, the theoretical minimum value is calculated from a sum of a component which increases depending on the distance, and another component which decreases inversely proportional to the distance.

A second aspect of the present invention inheres in an ultrasonic receiver encompassing (a) a resin horn having a tapered shape in part, configured to include a sound-field detection-axis as a central axis, (b) a piezoelectric element provided at a tip of the tapered shape, partially exposed to outside, (c) a stealth amplifier disposed at a predetermined minimum distance from the piezoelectric element, embedded in the resin horn and arranged in a position displaced from a behind space, onto which a shape of the piezoelectric element is projected along the central axis, configured to amplify electric signals generated by an ultrasonic wave transmitted through the piezoelectric element in parallel with the sound-field detection-axis through electro-acoustic conversion in the piezoelectric element, to change reflection characteristic of a reflection wave, which is the ultrasonic wave reflected by the stealth amplifier, and to avoid the reflection wave from being entered to the piezoelectric element, or to avoid a wave-front of the reflection wave from uniformly enter to the piezoelectric element, and (d) an input connection member electrically connecting between the piezoelectric element and the stealth amplifier. In the ultrasonic receiver pertaining to the second aspect of the present invention, the predetermined minimum distance is a distance determined by design as a theoretical minimum value of an input stray-capacitance, which is parasitic in the input connection member, the theoretical minimum value is calculated from a sum of a component which increases depending on the distance, and another component which decreases inversely proportional to the distance.

A third aspect of the present invention inheres in an ultrasonic-observation device encompassing (a) a main body including a resin horn at one end, the resin horn having a tapered shape shrinking toward a side of the one end, defining a sound-field detection-axis as a central axis, (b) a piezoelectric element provided at a tip of the tapered shape, partially exposed to outside, (c) a stealth amplifier disposed at a predetermined minimum distance from the piezoelectric element, embedded in the resin horn and arranged in a behind space, onto which a shape of the piezoelectric element is projected along the central axis, configured to amplify electric signals generated by an ultrasonic wave transmitted through the piezoelectric element in parallel with the sound-field detection-axis through electro-acoustic conversion in the piezoelectric element, to change reflection characteristic of a reflection wave, which is the ultrasonic wave reflected by the stealth amplifier, and to avoid the reflection wave from being entered to the piezoelectric element, or to avoid a wave-front of the reflection wave from uniformly enter to the piezoelectric element, (d) an input connection member electrically connecting between the piezoelectric element and the stealth amplifier, (e) an extraction terminal connected to other end of the main body, (g) an output interconnection electrically connecting between the stealth amplifier and the extraction terminal, (h) a transmission path connected to the extraction terminal, having an output stray-capacitance 50 times or more larger than signal-source capacitance inherent in the piezoelectric element, and (i) an observation apparatus connected to the transmission path. In the ultrasonic-observation device pertaining to the third aspect of the present invention, the predetermined minimum distance is a distance determined by design, in such a way that an input stray-capacitance parasitic in the input connection member becomes a value smaller than $\frac{1}{10}$ of the output stray-capacitance.

A fourth aspect of the present invention inheres in an ultrasonic-observation device encompassing (a) a main body including a resin horn at one end, the resin horn having a tapered shape shrinking toward a side of the one end, defining a sound-field detection-axis as a central axis, (b) a piezoelectric element provided at a tip of the tapered shape, partially exposed to outside, (c) a stealth amplifier disposed at a predetermined minimum distance from the piezoelectric element, embedded in the resin horn and arranged in a position displaced from a behind space, onto which a shape of the piezoelectric element is projected along the central axis, configured to amplify electric signals generated by an ultrasonic wave transmitted through the piezoelectric element in parallel with the sound-field detection-axis through electro-acoustic conversion in the piezoelectric element, to change reflection characteristic of a reflection wave, which is the ultrasonic wave reflected by the stealth amplifier, and to avoid the reflection wave from being entered to the piezoelectric element, or to avoid a wave-front of the reflection wave from uniformly enter to the piezoelectric element, (e) an input connection member electrically connecting between the piezoelectric element and the stealth amplifier, (f) an extraction terminal connected to other end of the main body, (g) an output interconnection electrically connecting between the stealth amplifier and the extraction terminal, (h) a transmission path connected to the extraction terminal, having an output stray-capacitance 50 times or more larger than signal source capacitance existing in the piezoelectric element, and (i) an observation apparatus connected to the transmission path. In the ultrasonic-observation device pertaining to the fourth aspect of the present invention, the predetermined minimum distance is a distance between the piezoelectric element and the stealth amplifier, which is determined by design, in such a way that an input stray-capacitance parasitic in the input connection member becomes a value smaller than $\frac{1}{10}$ of the output stray-capacitance.

BRIEF DESCRIPTION OF THE DRAWINGS

FIG. 1B is a schematic cross-sectional view of the ultrasonic receiver pertaining to the first embodiment, taken from a direction orthogonal to the cross-sectional view illustrated in FIG. 1A, with respect to a sound-field detection-axis AX in FIG. 1A.

FIG. 1C is a front view of the ultrasonic receiver pertaining to the first embodiment.

FIG. 1D is a front view of the ultrasonic receiver pertaining to the first embodiment, a cross-section orthogonal to the sound-field detection-axis AX in FIG. 1A.

FIG. 6 is a conceptual-schematic diagram explaining the position of the leading wave-front—a wave-front at a leading position—of the ultrasonic wave (reflection wave), after the transmission wave illustrated in FIG. 4 is reflected by the IC chip, at an elapse time of 460 ns after the ultrasonic wave arrives at the piezoelectric element from the external.

FIG. 17A is a schematic cross-sectional view explaining an outline of an ultrasonic receiver pertaining to a second embodiment of the present invention.

FIG. 17B is a schematic cross-sectional view of the ultrasonic receiver pertaining to the second embodiment, taken from a direction orthogonal to the cross-sectional view illustrated in FIG. 17A, with respect to a sound-field detection-axis AX in FIG. 17A.

FIG. 21A is a schematic cross-sectional view explaining an outline of an ultrasonic receiver pertaining to a first variation of the second embodiment in the present invention.

FIG. 21B is a schematic cross-sectional view of the ultrasonic receiver pertaining to the first variation of the second embodiment, taken from a direction orthogonal to the cross-sectional view illustrated in FIG. 21A, with respect to the sound-field detection-axis AX in FIG. 21A.

FIG. 25 is a diagram illustrating relationships between offset amounts of the IC chips and S/N ratios, in the ultrasonic receiver pertaining to the first variation of the second embodiment, which is implemented by the IC chips of the beveling angle θ=45 degrees.

FIG. 26 is a schematic cross-sectional view explaining a structure of an ultrasonic receiver pertaining to a second variation of the second embodiment of the present invention, in which the value of CSMI angle θ is further increased than the CMSI angle θ illustrated in FIG. 17B.

FIG. 32 is a view corresponding to the comparative example illustrated in FIG. 30B, and illustrates a schematic cross-sectional view of the ultrasonic receiver pertaining to the third embodiment, taken from a direction orthogonal to the cross-sectional view illustrated in FIG. 30A.

FIG. 42 is a schematic cross-sectional view explaining an outline of an ultrasonic receiver pertaining to another embodiment of the present invention.

Figure 1A:
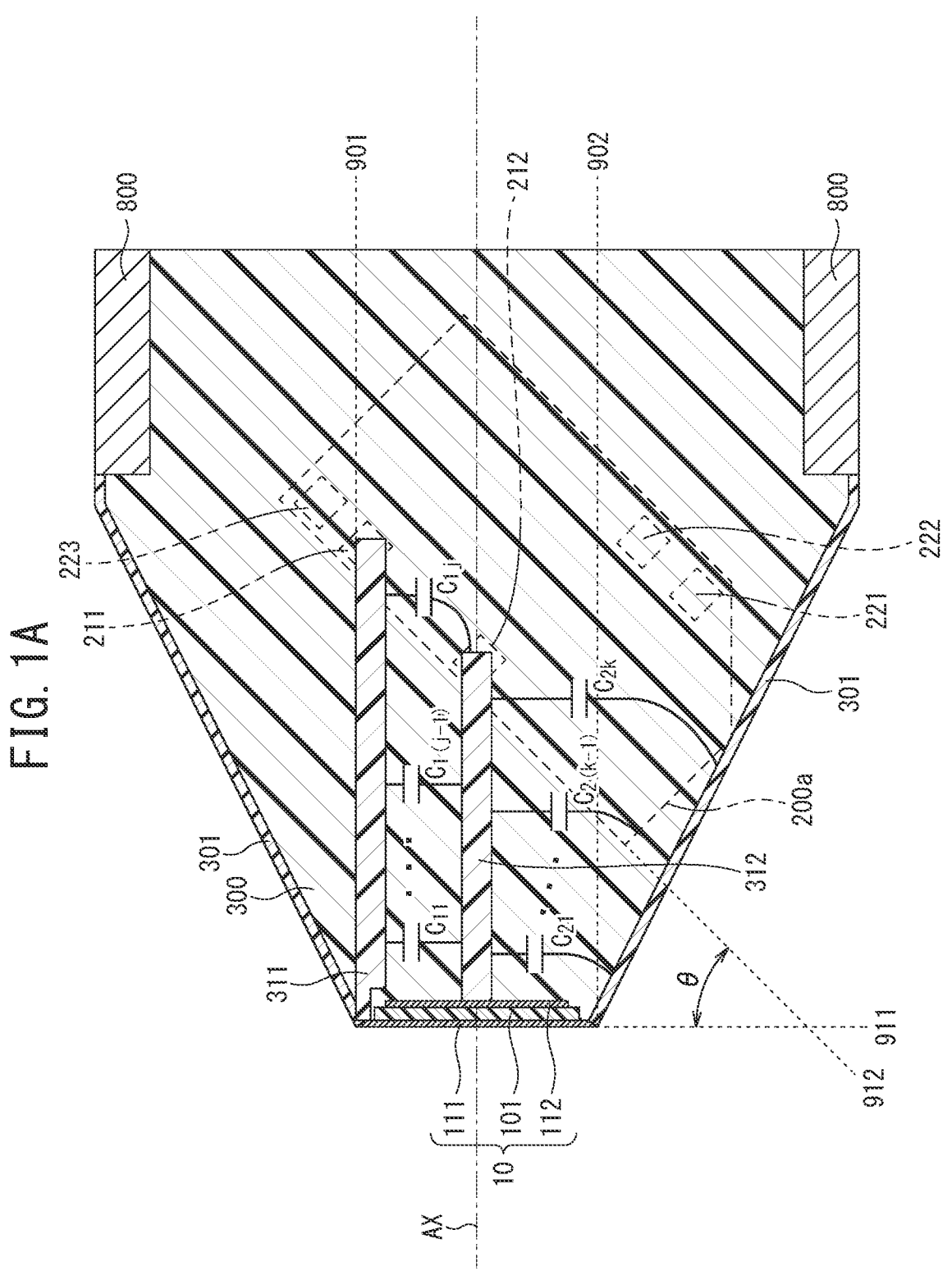
FIG. 1A is a schematic cross-sectional view explaining an outline of an ultrasonic receiver pertaining to a first embodiment of the present invention.

DETAILED DESCRIPTION OF THE
INVENTION

Hereinafter, first to fifth embodiments of the present invention will be described with reference to the drawings. In the following description of the drawings for the first to fifth embodiments, the same or similar parts are denoted by the same or similar reference numerals. However, it should be noted that the drawings are schematic, the relationship between the thickness and the planar dimension, the ratio of the size of each member, and the like may be different from the actual one. Therefore, specific thicknesses, dimensions, sizes, and the like should be determined more variously by considering the gist of the technical ideas that can be understood from the following description. In addition, it should also be understood that the respective drawings are illustrated with the dimensional relationships and proportions different from each other.

In addition, the first to fifth embodiments described below exemplify methods for concretizing the technical idea of the present invention and apparatuses used in the methods, and the technical idea of the invention does not specify the material, shape, structure, arrangement and the like of the elements, and the procedures of the methods, and the like described below. The technical idea of the present invention is not limited to the content described in the first to fifth embodiments, and various modifications can be made within the technical scope defined by the claims. Further, the definition of the "upper", "lower", and the like, in the following description is merely a rule for convenience of explanation and is not intended to limit the technical scope of the present invention. For example, the "upper" and "lower" are converted to the "right" and "left" if observed by rotating the object by 90° and inverted to the "lower" and "upper" if observed by rotating 180°, of course.

First Embodiment

Figure 1B:
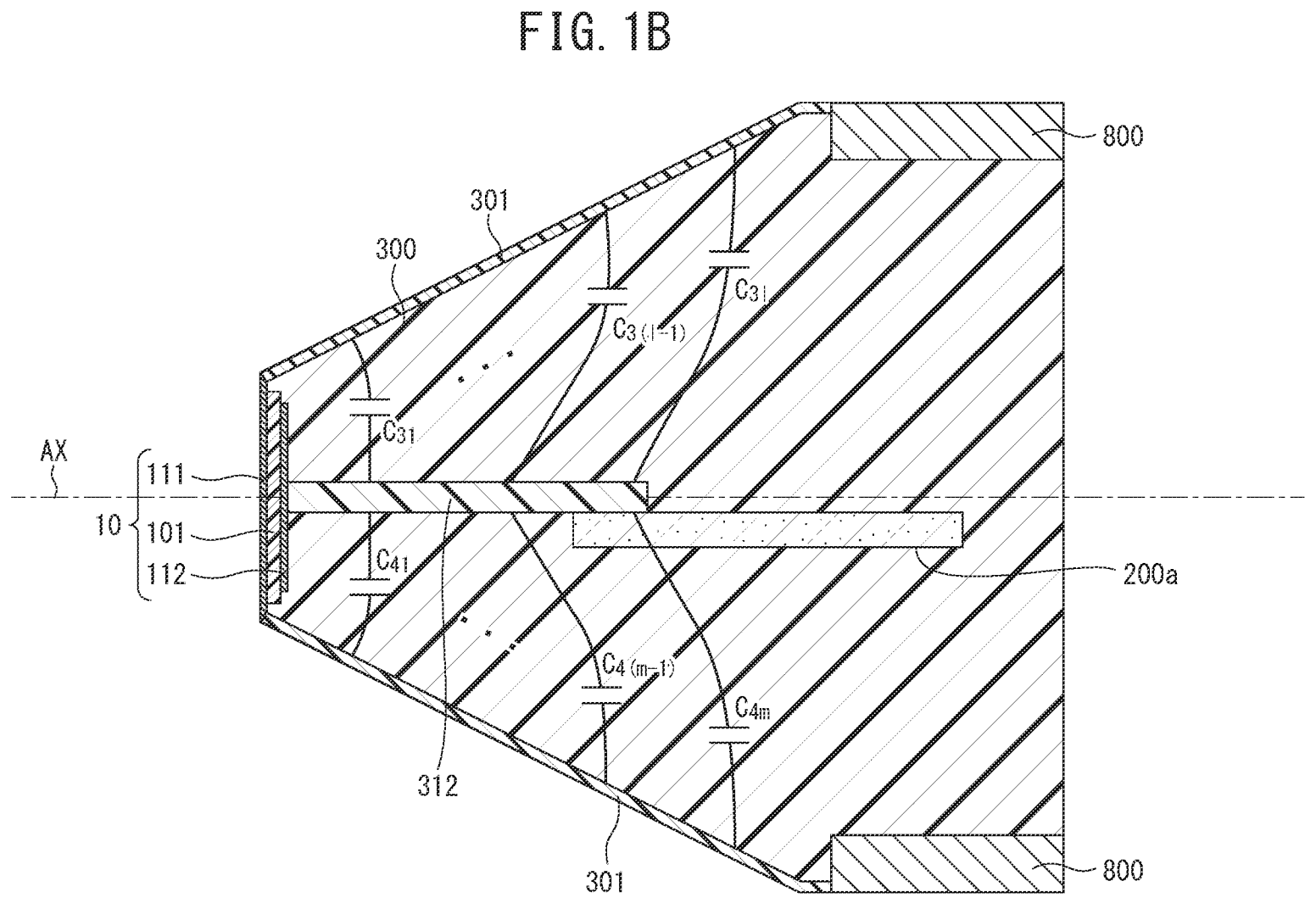

As illustrated in FIGS. 1A and 1B, an ultrasonic receiver pertaining to a first embodiment of the present invention encompasses a resin horn (300, 301), which has a shrinking tapered shape in part, made of polymeric material. The ultrasonic receiver of the first embodiment further encompasses a piezoelectric element (piezoelectric electro-acoustic conversion element) 10 provided at a tip of the tapering shape of the resin horn (300, 301), a stealth amplifier 200a that is arranged in vicinity of the piezoelectric element 10 at a distance corresponding to a predetermined minimum distance $d_{opt}$ from the piezoelectric element 10 in an inside of the resin horn (300, 301), an input connection member (resin signal wiring) 312 electrically connecting between the piezoelectric element 10 and the stealth amplifier 200a, and a resin grounding wiring 311.

As will be described later by Eq. (3), there is a theoretical minimum value that becomes disadvantageous if the stealth amplifier 200a becomes closer than the theoretical minimum value. Therefore, we cannot to say that the smaller distance between the stealth amplifier 200a and the piezoelectric element 10 is the better. In the ultrasonic receiver pertaining to the first embodiment, the minimum distance $d_{opt}$ is determined by considering the process limitations and other factors, so that the minimum distance $d_{opt}$ becomes close to the theoretical value defined by Eq. (3). And, in the stealth amplifier 200a, by assigning a distance between the stealth amplifier 200a and the piezoelectric element 10 to the minimum distance $d_{opt}$, an input stray-capacitance $C_{stray}$ of the input connection member connecting between the piezoelectric element 10 and the stealth amplifier 200a can be set as small as possible. The resin horn (300, 301) encompasses an insulating resin 300 implementing the main portion and a thin conductive resin layer 301 serving as an envelope portion that surrounds the insulating resin 300, as illustrated in FIGS. 1A, 1B and 1D.

The piezoelectric element 10 has a first electrode plate 111, a plate-shaped piezoelectric layer 101 in contact with the first electrode plate 111 and a second electrode plate 112, which is in contact with the piezoelectric layer 101. The second electrode plate 112 is parallel and opposite to the first electrode plate 111 through the piezoelectric layer 101. As the piezoelectric layer 101, for example, a polymeric piezoelectric film such as a poly-vinylidene fluoride (PVDF) film can be used. The PVDF film has the acoustic impedance close to the intrinsic impedance of water, exhibits the excellent pulse-response characteristics and has the low output impedance characteristics that is high in sensitivity and wide in band. Thus, although PVDF film is suitable for the application as hydrophone, it is not limited to PVDF film. For example, various piezoelectric films other than PVDF films, such as copolymers of vinylidene fluoride and trifluoroethylene, polymetaphenylene isophthalamide, or vinylidene-cyanide based copolymers can be used. Moreover, ceramics or crystalline piezoelectric films can be used. Also, composite films made of polymeric piezoelectric films and ceramics can be used.

By the way, lead zirconate titanate (PZT) is famous as the ceramic piezoelectric film or crystalline piezoelectric film. However, as mentioned above, due to the matching performance of acoustic impedance with water, number of application examples in which PVDF films are employed in the hydrophones are more than application examples in which PZTs are used. In addition, when PZT is used for the piezoelectric element of the ultrasonic receiver, since a signal-source capacitance $C_{signal}$ inherent in the piezoelectric layer 101 becomes as large as about 10 pF, the reducing scheme of the stray-capacitance, which is parasitic along the piezoelectric element to the stealth amplifier, is not required, and therefore, the forcible disposing scheme of the stealth amplifier in vicinity of the piezoelectric element is not necessary. On the contrary, in the case of the polymeric piezoelectric films represented by PVDF film, even if a thickness of PVDF film is set to be as thin as about 30 micrometers, because the signal-source capacitance $C_{signal}$ inherent in the piezoelectric layer 101 is extremely small such as about 0.01 pF, the technical advantage of disposing the stealth amplifier as close to the piezoelectric element as possible can be manifested.

As the stealth amplifier 200a, a plate-shaped or rectangular parallelepiped IC chip made of semiconductor, on which an amplifier—a preamplifier—for amplifying electric signals generated by electro-acoustic conversion in the piezoelectric element 10 is monolithically integrated, is preferable. For example, a protection-circuit element and others are merged usually at an input terminal of the IC chip in a commercially-available wide-band operational amplifier, and therefore, a stray-capacitance of the protection-circuit element and others of the commercially-available wide-band operational amplifier is about 0.1 to 1 pF. When such commercially-available IC chip is employed as an IC chip for the ultrasonic receiver pertaining to the first embodiment, the stray-capacitance of the protection-circuit element and others will reduce drastically a voltage amplitude of a received signal to ¹⁄₁₀ or less, and therefore will lose the objective of the instant invention. So, for the IC chip employed in the ultrasonic receiver pertaining to the first embodiment, it is necessary to use an IC chip in which the protection-circuit element of the input terminal is omitted, or it is necessary to reduce the stray-capacitance of the protection-circuit element and others to less than ¹⁄₁₀ of normally obtained values.

The semiconductor material, such as silicon (Si) or the like, which implements the stealth amplifier 200a, facilitates a larger acoustic impedance, the value of which is several times higher than PVDF film. Thus, the ultrasonic wave is reflected in the boundary of the insulating resin 300 building up the resin horn (300, 301). On and around the main-face of the IC chip, bonding pads 211, 212, 221, 222 and 223 are arranged as illustrated in FIG. 1A. To the input pad (grounding side) 211 that is one of the bonding pads, a resin grounding wiring 311 made of conductive epoxy resin and the like is connected as the input connection member (first inner wiring). The resin grounding wiring 311 is connected to the first electrode plate 111 provided on the surface (outer surface) side of the piezoelectric element 10, and the input pad 211 is electrically connected to the first electrode plate 111 through the resin grounding wiring 311.

Figure 3A:
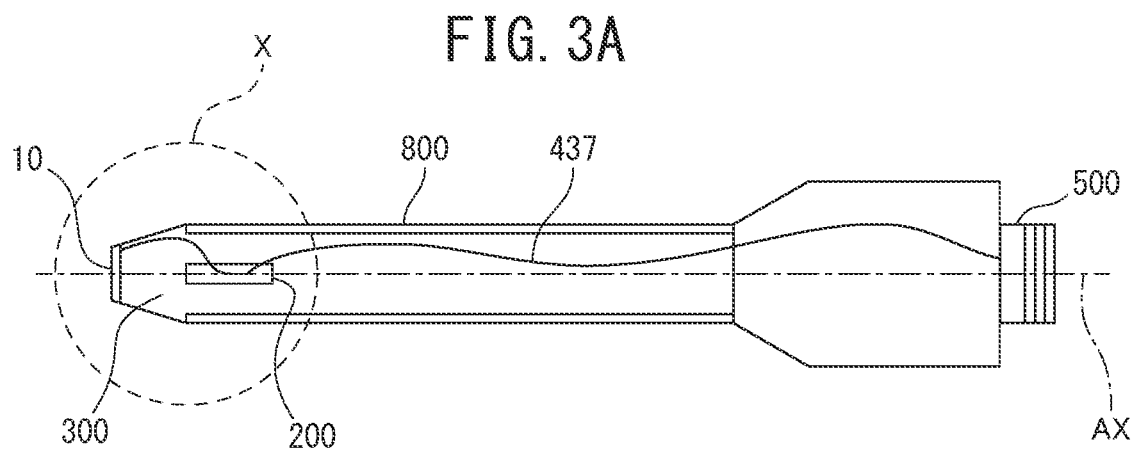
FIG. 3A is a diagram illustrating one example of the entire structure of the ultrasonic receiver pertaining to the first embodiment.

On the other hand, to the input pad (signal side) 212 that is another one of the bonding pads, the resin signal wiring 312 made of conductive epoxy resin and the like is connected as another input connection member (second inner wiring). Since the resin signal wiring 312 is connected to the second electrode plate 112 located on the bottom face (inner surface) of the piezoelectric element 10, the input pad (signal side) 212 is electrically connected to the second electrode plate 112 through the resin signal wiring 312. Around the main-face of the IC chip implementing the stealth amplifier 200a, the output pad 222 for delivering signals, which are amplified by the amplifier merged in the chip, to an extraction terminal 500 illustrated in FIG. 3A is provided as the bonding pad. As can be understood from FIG. 3A, the output pad 222 and the extraction terminal 500 are electrically connected to each other through an output interconnection (output lead line) 437. Moreover, around the main-face of the IC chip implementing the stealth amplifier 200a, the grounding pad 221 for receiving a grounding potential from an extraction terminal whose illustration is omitted, and the power-supply pad 223 for receiving a power-supply potential from the extraction terminal are provided respectively as the bonding pads.

The "stealth amplifier 200a" means "an amplifier whose feature inheres in low observable behavior against ultrasonic waves". For establishing the stealth characteristics in the stealth amplifier 200a against the ultrasonic waves, the wave-fronts of the reflection waves, which are ultrasonic waves reflected by the IC chip, shall not be uniformly entered into the main-face of the piezoelectric layer 101. The condition that the reflection waves shall not uniformly enter into the main-face of the piezoelectric layer 101 can be achieved either by protecting the entrance of the reflection waves into the piezoelectric element 10, or by setting angles of the wave-fronts of the reflection waves with respect to the main-face of the piezoelectric layer 101 larger than a specific angle. Even if a reflection wave from the stealth amplifier 200a is entered to the piezoelectric element 10, as far as the wave-front of the reflection wave has an angle larger than the specific level with respect to the main-face of the piezoelectric layer 101 implementing the piezoelectric element 10, the electromotive force generated by the piezoelectric electro-acoustic conversion is canceled in a portion of the piezoelectric layer 101 exposed to a positive sound pressure and a portion of the piezoelectric layer 101 exposed to a negative sound pressure. Since the electromotive force is canceled, the rate of the conversion to electricity is kept low, which contributes to the stealth characteristics of the stealth amplifier 200a.

As described already, in the earlier scheme, there has been an idea that the amplifier (preamplifier) for amplifying electric signals generated by electro-acoustic conversion in the piezoelectric element 10 is embedded in vicinity of the piezoelectric element 10. However, if the amplifier is tried to be arranged in vicinity of the piezoelectric element 10, the transmission waves penetrating through the piezoelectric element 10 is reflected by the IC chip, and the reflection wave will enter to the piezoelectric element 10. As a result, unnecessary echoes are induced between the originally-converted electric signals and the delayed signals having delay times shifted from the originally-converted electric signals, the delayed signals are ascribable to the reflection wave. Consequently, it is found that the earlier scheme is not a good idea because of a new problem in which the sound pressure-voltage response characteristics is deteriorated. The present inventors have studied the deterioration problem of the sound pressure-voltage response characteristics earnestly. And as a result, the present inventors have conceived a structure necessary for the stealth behavior, such as material, size, shape of the IC chip employed as the stealth amplifier 200a, and positional relationships between the IC chip and the piezoelectric element 10. Thickness of the IC chip is also included in the dimensional design of the stealth amplifier 200a necessary for reducing the observability to the ultrasonic wave.

Also, the positional relationships of the IC chip necessary for reducing the detectability to the ultrasonic wave include the relative position relations and arrangement locations of the IC chip to the piezoelectric element 10, and the relative orientations and angles of the IC chip to the directions of the main-face of the first electrode plate 111 constructing the piezoelectric element 10. Among the above elements for stealth behavior of the ultrasonic receiver pertaining to the first embodiment, a relative inclination angle $\theta$ of the IC chip to the direction of the main-face of the first electrode plate 111 is reviewed so that the problem of the unnecessary echoes can be solved. As a result, an excellent effectiveness of the ultrasonic receiver pertaining to the first embodiment, in which S/N ratios of the electric signals generated by electro-acoustic conversions in the piezoelectric element 10 can be greatly improved, is found.

Figure 3B:
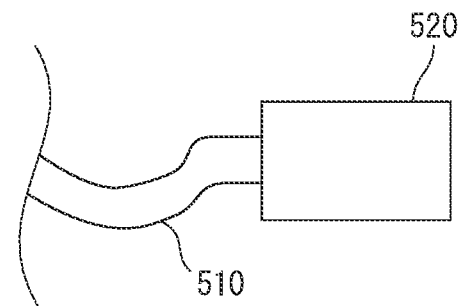
FIG. 3B is a schematic diagram explaining an example of a case in which an ultrasonic-observation device pertaining to the first embodiment is constructed by connecting the ultrasonic receiver illustrated in FIG. 3A to an external apparatus (observation apparatus).
Figure 3C:
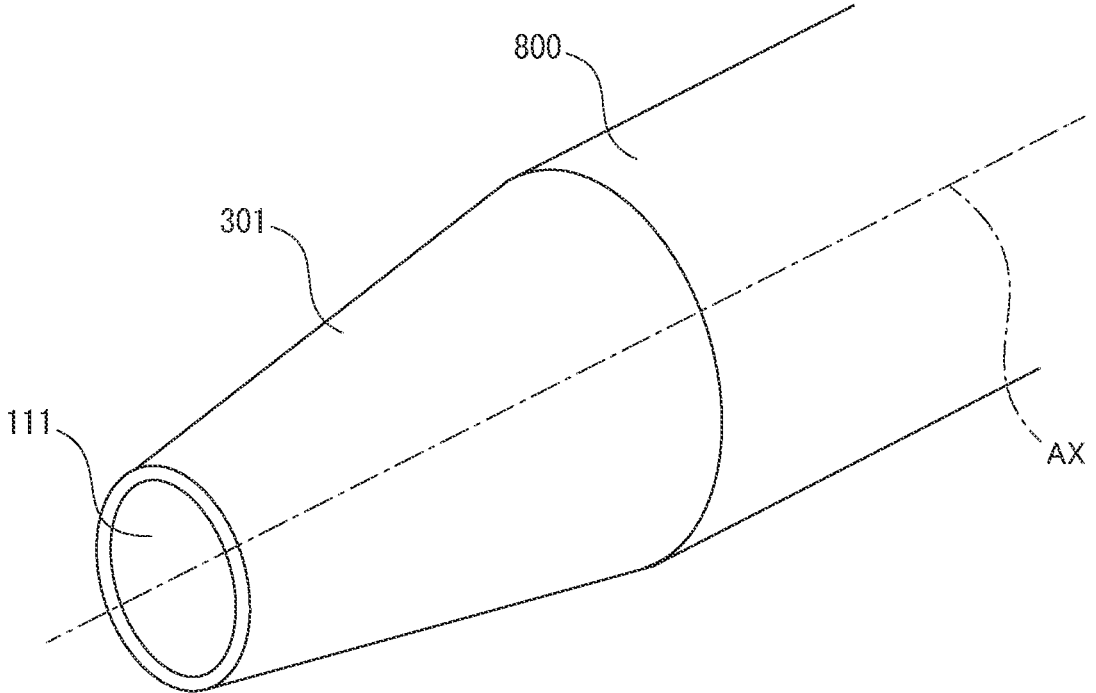
FIG. 3C is a bird's-eye view, enlarging a tip portion X of the ultrasonic receiver pertaining to the first embodiment illustrated in FIG. 3A.

As illustrated in FIGS. 3A and 3C, the ultrasonic receiver pertaining to the first embodiment has a rotationally symmetrical shape about a sound-field detection-axis AX, which serves as a central axis. The "sound-field detection-axis AX" is the central axis, which passes through the center of the piezoelectric element 10 and penetrates through the center of the ultrasonic receiver in parallel to the normal direction of the main-face of the first electrode plate 111. For the convenience of explanation, a direction along which the sound-field detection-axis AX illustrated in FIGS. 3A and 3C extends is defined as "the axis direction", and a direction vertical to the sound-field detection-axis AX is referred as "the radial direction". Along the axis direction, a site at which the piezoelectric layer 101 is arranged is referred as a tip side of the ultrasonic receiver. As can be understood from the following explanations, there may be cases that the wave-fronts of the transmission waves penetrating through the piezoelectric element 10 and travelling in the ultrasonic receiver will exhibit curved surfaces or mixtures of a plurality of waves. Unless otherwise specified, the wave-fronts of the main portions of transmission waves propagating in the center of the piezoelectric layer 101 are assumed to be plane waves approximately parallel to the direction of the main-face of the first electrode plate 111, as exemplified in FIG. 5(b). Since the first electrode plate 111 and the second electrode plate 112 are parallel to each other, the wave-fronts of the main portions of transmission waves propagating in the center of the piezoelectric layer 101 are also approximately parallel to the direction of the main-face of the second electrode plate 112.

Figure 4:
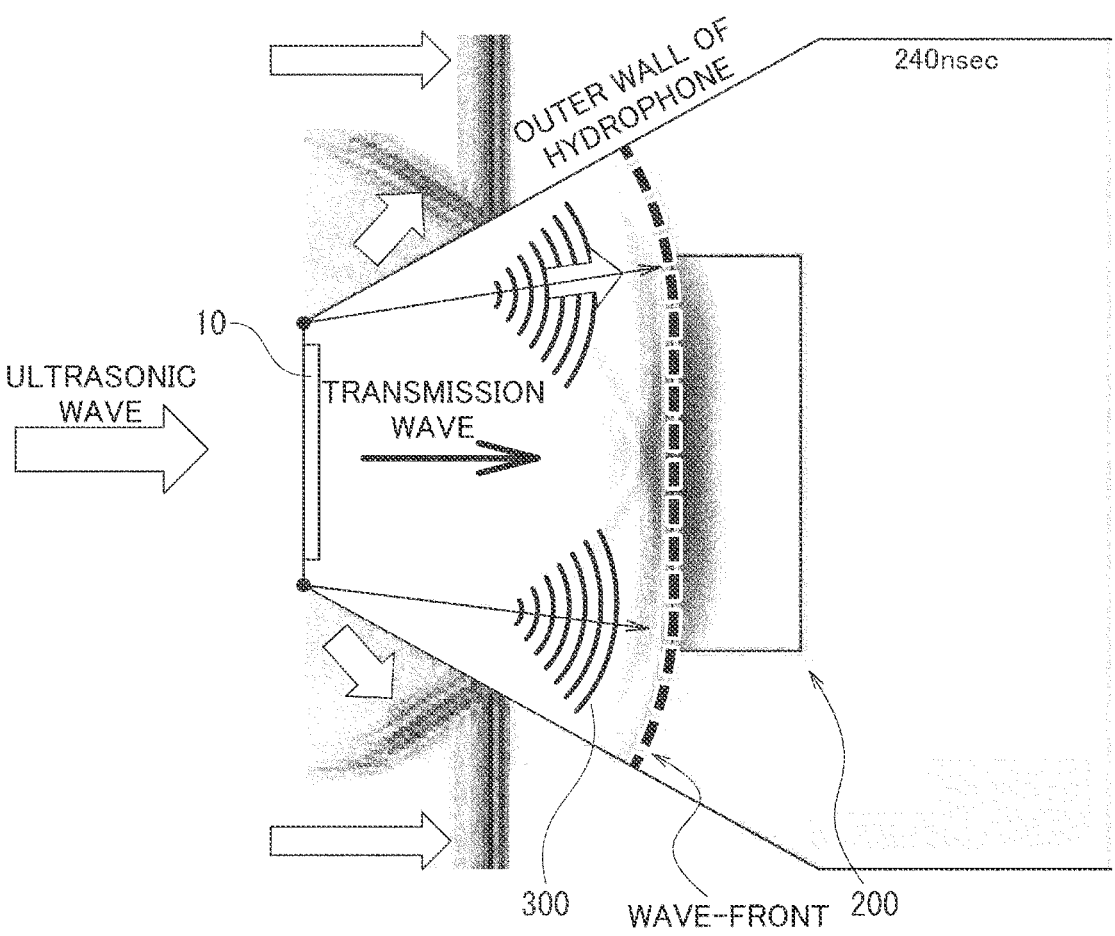
FIG. 4 is a conceptual-schematic diagram explaining a leading wave-front of transmission wave, at a timing when the transmission wave arrives to the IC chip with an elapse time of 240 ns after the arrival to the piezoelectric element, as an ultrasonic wave penetrating through the piezoelectric element after the ultrasonic wave arrives at the ultrasonic receiver from the external.

In FIG. 4, assigning a point at one ridge (upper ridge) and a point at the other ridge (lower ridge) assigned in the radial direction of the piezoelectric element 10 as the respective transmission sources, the diffraction waves from the ridges of the piezoelectric element 10 are represented as if the wave-fronts of continuous waves are transmitted in fan-shape. However, the representations of the wave-fronts in FIG. 4 are merely schematic models to explain a concept. Even outside of the insulating resin 300 building the horn shape in FIG. 4, views are indicated in which the ultrasonic waves—ultrasonic waves to be detected—arriving from external are traveling on outer wall sides of the horn. Outside the insulating resin 300 making up the horn shape, even the wave-fronts of the diffraction waves of the ultrasonic waves to be detected, which are transmitted from the ridges of the piezoelectric element 10, are indicated. In the drawings on and after FIG. 4, in order to simplify the representations of the shapes and positions of the wave-fronts, the propagations of the ultrasonic waves are represented by simplified line diagrams with two or three wave-fronts, as if the ultrasonic waves entered to the ultrasonic receiver are wavelet-like ultrasonic waves similar to delta functions excited by spikes. However, the purpose of the simplified line diagram is not intended to be limited by the wavelet-like ultrasonic waves.

Figure 5:
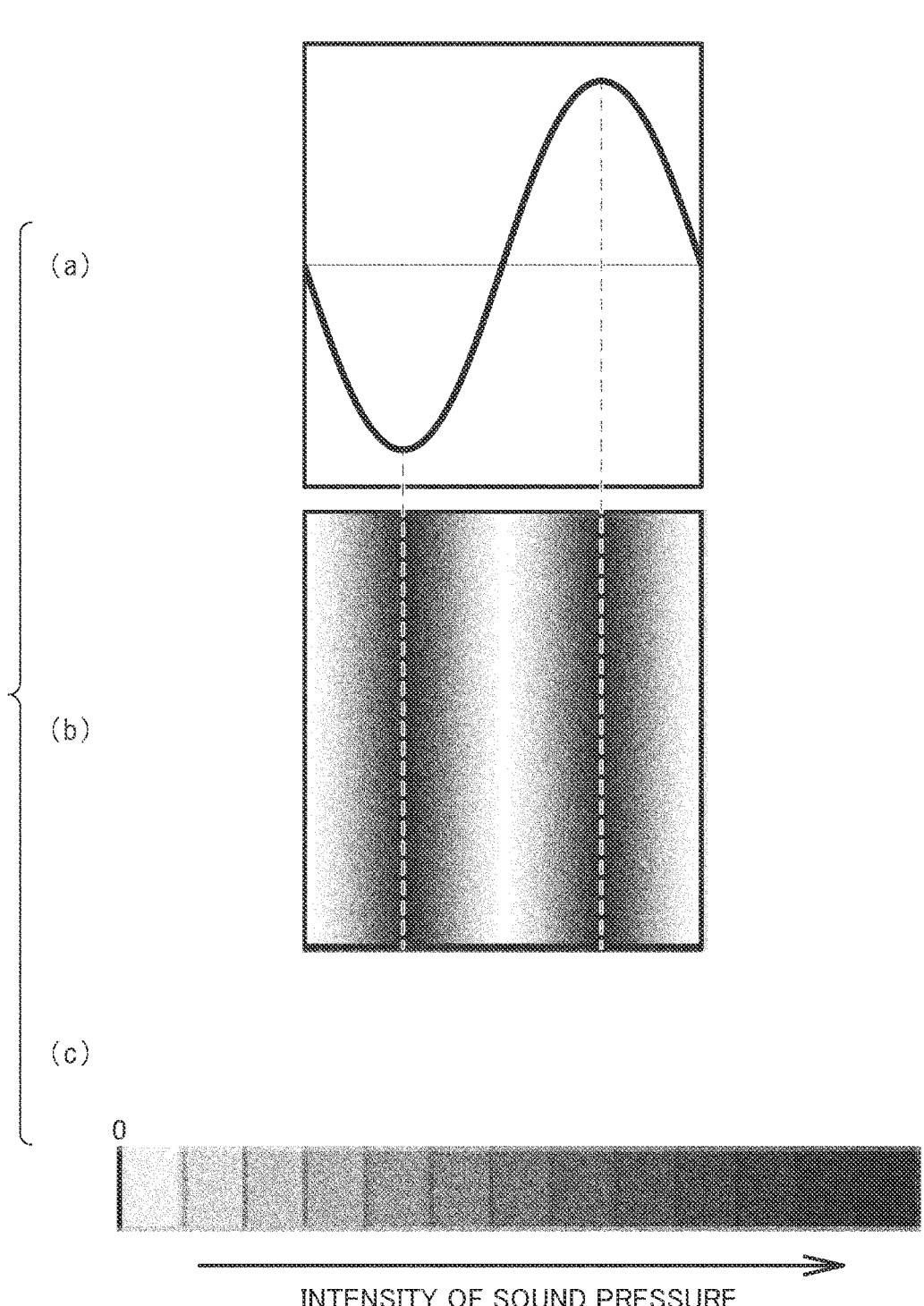
FIG. 5 is a set of diagrams explaining the positions and shapes of the wave-fronts of the ultrasonic wave, which are used in the explanation of the propagation and reflection in an inside of the ultrasonic receiver illustrated in FIG. 4, representing intensity-variation of sound pressures by gray values—contrasting density—in a black and white diagram.

In other words, care should be paid to a fact that the modeled waveforms represented in the drawings on and after FIG. 4 are not intended to simulate the wavelet. A wave generated from a sine wave at a representative frequency, the wave is clipped by one wavelength of the sine wave, will include a broad spectrum containing the representative frequency as its center. That is, in the drawings on and after FIG. 4, the one-wavelength-clipped sine waves are used because the clipped sine waves are suitable for the evaluation of the hydrophone for which the broadband characteristics is required. In addition, although it is a basic representation scheme that the absolute values of the sound pressure-intensities of the ultrasonic waves, which propagate in the resin horn (300, 301) in the ultrasonic receiver, shall be represented by multi-tone monochrome images—gray scales—as illustrated in FIGS. 5(*a*) and 5(*b*), there may be a case that wave-fronts are represented by simplified solid lines or dotted lines, such as the representation in FIG. 4. A scheme that the shapes and positions of the wave-fronts are indicated by the one-wavelength-clipped sine waves is equivalent to a scheme that only "a leading wave-front" implementing the continuous wave is illustrated, and the illustrations of the succeeding wave-fronts following the leading wave-front are omitted. By the way, a wave-front at a leading position in a continuous wave is called "the leading wave-front" hereinafter. Namely, in actual conditions that the ultrasonic waves enter into the ultrasonic receiver are the continuous sine waves illustrated in FIG. 5(*a*), only the leading wave-fronts of the transmission and reflection waves will be illustrated in FIGS. 7A-7D to 14, by using the representation schemes employed in FIG. 5(*b*) and FIG. 5(*c*).

Figure 7A:
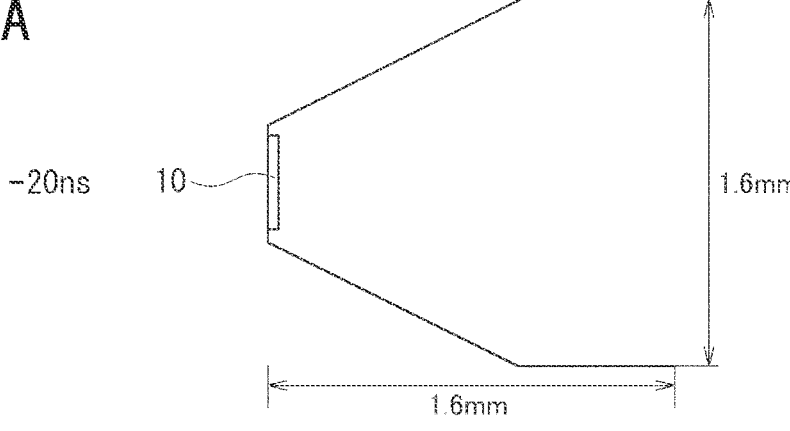
FIG. 7A is a view of an ultrasonic receiver at a timing before the ultrasonic wave arrives to the ultrasonic receiver from the external (–20 ns).
Figure 7B:
FIG. 7B is a view of the ultrasonic receiver at a moment when the ultrasonic wave arrives to the piezoelectric element of the ultrasonic receiver from the external (0 ns).
Figure 7B:
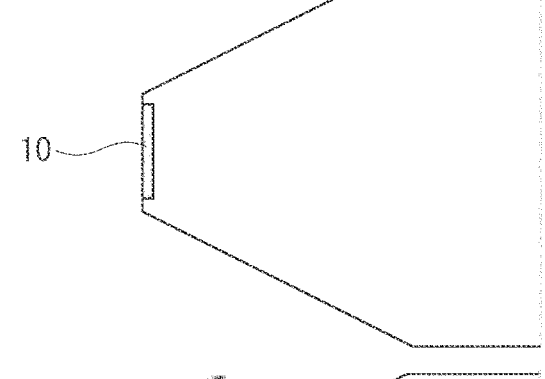
Figure 7C:
FIG. 7C is a view illustrating a leading wave-front of transmission wave, the wave-front is represented by gray values corresponding to intensity-variation of the sound pressures, at an elapse time of 200 ns after the ultrasonic wave arrives to the piezoelectric element.
Figure 7C:
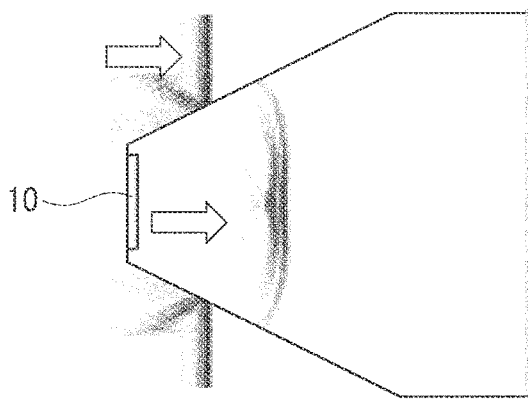
Figure 7D:
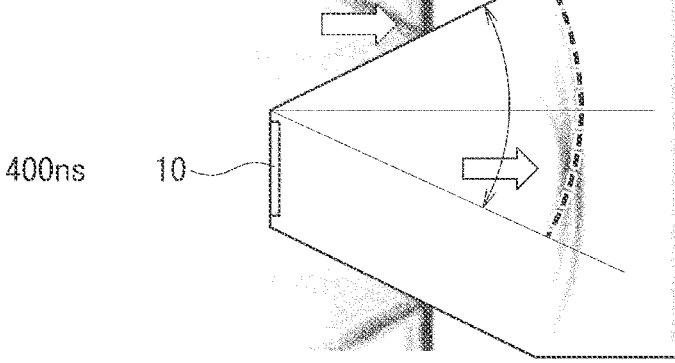
FIG. 7D is a diagram illustrating the leading wave-front of transmission wave, the wave-front is represented by gray values corresponding to intensity-variation of the sound pressures, at an elapse time of 400 ns after the ultrasonic wave arrives to the piezoelectric element.

The wave-fronts of transmission waves propagating in the center of the piezoelectric layer 101 are assumed to be the plane waves approximately parallel to the direction of the main-face of the first electrode plate 111. However, in a practical sense, as illustrated in FIGS. 7C and 7D, each of the wave-fronts of the transmission waves propagating in the resin horn (300, 301) in the ultrasonic receiver has the curved surfaces, and further, exhibits a mixture of a plurality of waves. For the sake of the explanation along time-series basis, at first, FIG. 7A illustrates a preceding situation of the ultrasonic waves in the resin horn (300, 301) at timing of −20 ns before the ultrasonic waves arrives to the ultrasonic receiver from the external. Next, although FIG. 7B illustrates an instantaneous situation of the ultrasonic waves in the resin horn (300, 301) at an instant of 0 ns when the ultrasonic waves arrive to the piezoelectric element 10 in the ultrasonic receiver from the external, between the instantaneous situation and the preceding situation at timing of −20 ns, there is no change in the resin horn (300, 301). FIG. 7C illustrates a subsequent situation at elapse time of 200 ns after the ultrasonic waves arrives to the piezoelectric element 10. An upper diffraction wave from an edge of the piezoelectric element 10, the upper diffraction wave has a curved wave-front transmitted from a point of one ridge (upper ridge) assigned in the radial direction of the piezoelectric element 10 as a transmission source, is synthesized with an upper portion of the transmission wave that is the plane wave propagating in the center of the piezoelectric element 10. Moreover, a lower diffraction wave having a curved wave-front, the lower diffraction wave is transmitted from a point of the other ridge (lower ridge) on the radial direction of the piezoelectric element 10 as a transmission source, is synthesized with a lower portion of the plane wave propagating in the center of the piezoelectric element 10. Therefore, the upper and lower syntheses result in complex shape of wave-fronts.

Even outside the resin horn (300, 301), a manner is indicated in which the outer ultrasonic waves are traveling on the outer wall sides of the horn at an elapse time of 200 ns. As explained in FIG. 4, outside the resin horn (300, 301), at an elapse time of 200 ns, the diffraction waves from the ridges of the piezoelectric element 10 are traveling along the outer wall of the horn. FIG. 7D illustrates a leading wave-front of the transmission wave at an elapse time of 400 ns after the ultrasonic waves arrives to the piezoelectric element 10, represented by gray values corresponding to intensity-variation of the sound pressures. However, similarly to FIG. 7C, the upper diffraction wave from the upper edge of the piezoelectric element 10, the upper diffraction wave has the curved wave-front transmitted from the point at the upper ridge in the radial direction of the piezoelectric element 10 as the transmission source. is synthesized with the upper portion of the plane wave. Moreover, a complex wave-front shape is generated in which the lower diffraction waves of the curved wave-front transmitted from the lower point of the lower ridge in the radial direction of the piezoelectric element 10 as the transmission source, is synthesized with the lower portion of the plane wave. Outside the resin horn (300, 301) in FIG. 7D, a wave-front profile of the outer ultrasonic waves is indicated, in which the outer ultrasonic waves are traveling at further right allocations than the wave-front profile illustrated in FIG. 7C, on the outer wall sides of the horn, at an elapse time of 400 ns. Furthermore, outside the resin horn (300, 301) in FIG. 7D, another wave-front profile of the diffraction waves is indicated, in which the diffraction waves are traveling at further right allocations than the wave-front profile illustrated in FIG. 7C, on the outer wall sides of the horn, at an elapse time of 400 ns.

Figure 9A:
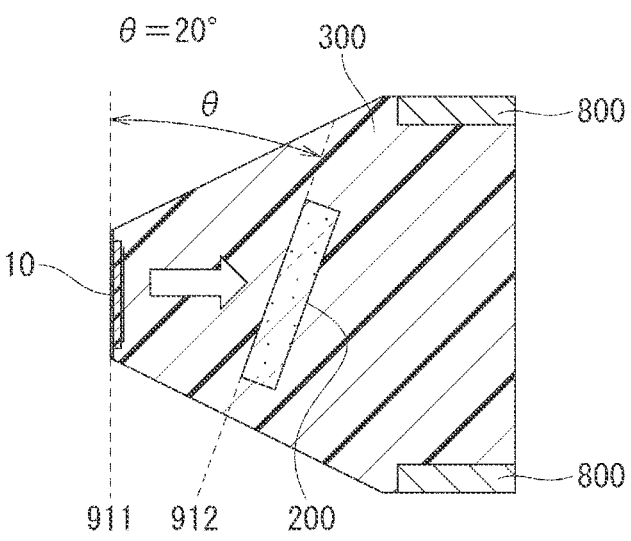
FIG. 9A is a view explaining a configuration of CSMI angle θ=20 degrees, which is defined by the main-face of the IC chip with respect to electrode planes of a pair of electrode plates implementing the piezoelectric layer.

As illustrated in FIG. 9A, in the ultrasonic receiver pertaining to the first embodiment, an angle between the main-face of the IC chip to be exposed to the transmission wave and the direction of the main-face of the first electrode plate 111 is defined as "the chip main-face inclination-angle θ". "The main-face" means a surface occupying the widest area in the three-dimensional shape constructing each of the first electrode plate 111 and the IC chip. Two main-faces parallel to each other exist in the flat rectangular-parallel-epiped shape. Under an assumption that the wave-front of the main portion of transmission wave propagating in the center of the piezoelectric layer 101 is approximately parallel to the direction of the main-face of the first electrode plate 111, an angle between a tangent plane of the wave-front of the transmission wave arriving to the IC chip implementing the stealth amplifier 200a and the main-face of the IC chip becomes the CMSI angle θ. The tangent plane of the wave-front and the sound-field detection-axis AX are orthogonal to each other. Also, the direction of the main-face of the IC chip and the normal direction of the main-face are orthogonal to each other. Thus, CMSI angle θ is equivalent to the angle between the normal direction of the main-face of the IC chip employed as the stealth amplifier 200a and the sound-field detection-axis AX.

The plate-shaped IC chip implementing the stealth amplifier 200a usually has sextuple faces. Then, when one of the sextuple faces is defined as a top face, which is the main-face on which circuit elements necessary for the configuration of the amplifier (preamplifier) and the like are merged, and a bottom face opposite to the top face is defined in the sextuple faces. And, as the IC chip has a constant thickness between the top and bottom faces, the quadruple side-faces (edge faces) each of which connects the top and bottom faces are included in the IC chip. In addition, in the ultrasonic receiver pertaining to the first embodiment, the main-face of the IC chip is assumed to be flat. When the wave-fronts of the ultrasonic waves are not uniform as mentioned above, among the angles between the tangent plane of the wave-front of the transmission wave arriving to the IC chip and the main-face of the IC chip to be exposed to the transmission wave, the smallest angle is referred as "the chip main-face inclination (CMSI) angle θ".

The first electrode plate 111 connected to the outer surface of the plate-shaped piezoelectric layer 101 serves as, for example, the grounding electrode and is connected to the stealth amplifier 200a through the resin grounding wiring (input connection member) 311. The second electrode plate 112 connected to the inner surface of the piezoelectric layer 101 serves as, for example, the signal electrode, and the signal of the piezoelectric element 10 is sent to the stealth amplifier 200a through the resin signal wiring (input connection member) 312. The piezoelectric element 10 detects, for example, the ultrasonic waves of 0.1 to 100 MHz and converts the ultrasonic waves into electric signals. The amplifier circuitry merged in the stealth amplifier 200a has a function for amplifying electric signals that is generated by electro-acoustic conversion between the first electrode plate 111 and the second electrode plate 112.

As illustrated on the right sides of FIGS. 1A and 1B, the stealth amplifier 200a is provided in a thick resin cylindrical portion, which is continuous to the tip of the resin horn (300, 301). Namely, the diameter of the side opposite to the tip of the resin horn (300, 301) is thick. The right end side of the resin cylindrical portion is further expanded as illustrated in FIG. 3A, and a stepped structure is constructed. As illustrated on the rights side of FIG. 1A and the like, the resin cylindrical portion constructing the stepped structure is encapusulated by a metallic cylindrical sheath 800. In other words, in the ultrasonic receiver pertaining to the first embodiment, as illustrated in FIGS. 1A, 1B, 3A, and 3C and the like, the resin horn (300, 301), the resin cylindrical portion constructing the stepped structure that is continuous to the resin horn (300, 301), and the cylindrical sheath 800 in which the resin cylindrical portion is housed are integrated, thereby making up a main body (300, 301, 800). The cylindrical sheath 800 is not disposed at a narrower portion of the resin horn (300, 301) in which the piezoelectric element 10 is embedded at the tip. Via the insulating resin 300 serving as the main portion of the resin horn (300, 301), the positional relationship between the piezoelectric layer 101 and the stealth amplifier 200a is determined, and the piezoelectric layer 101 and the stealth amplifier 200a are cemented together in the most narrower tip side of the ultrasonic receiver.

Figure 1D:
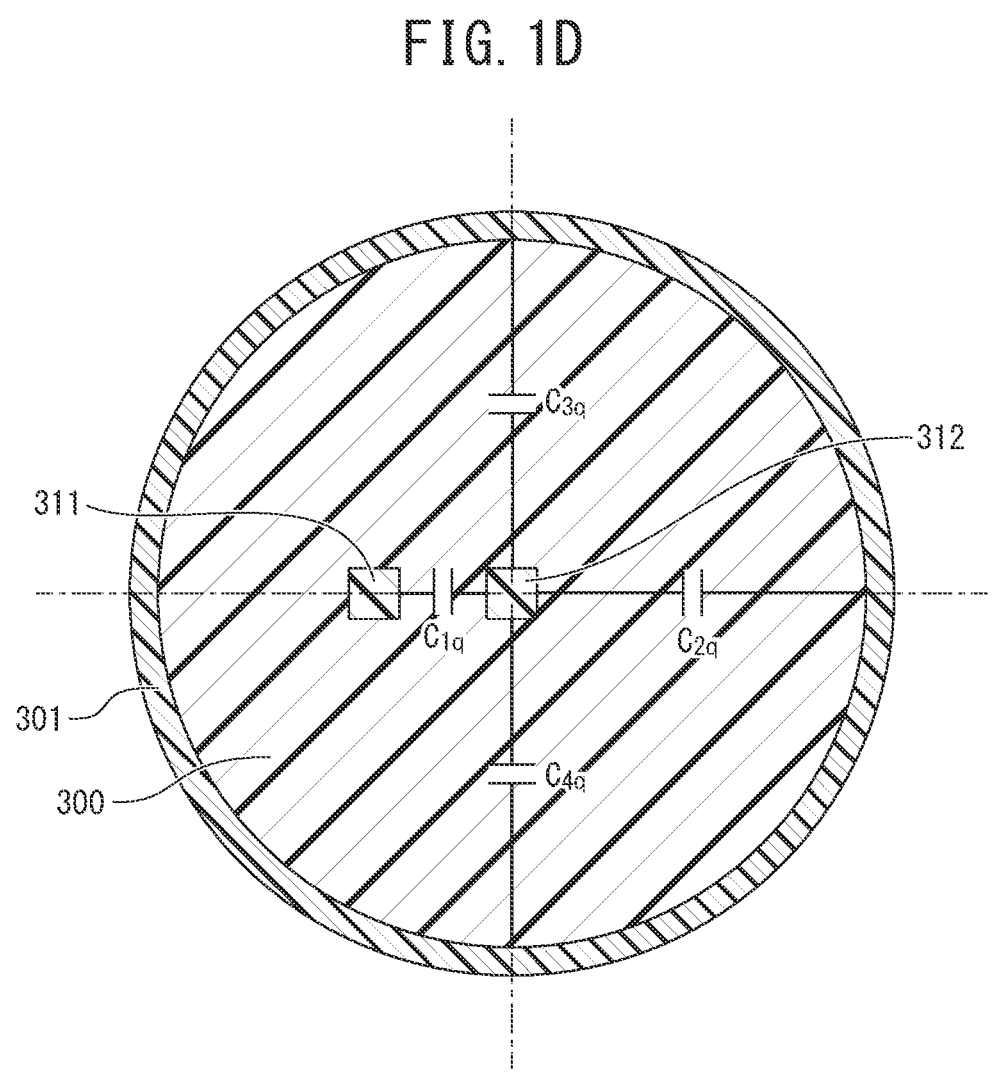
Figure 2A:
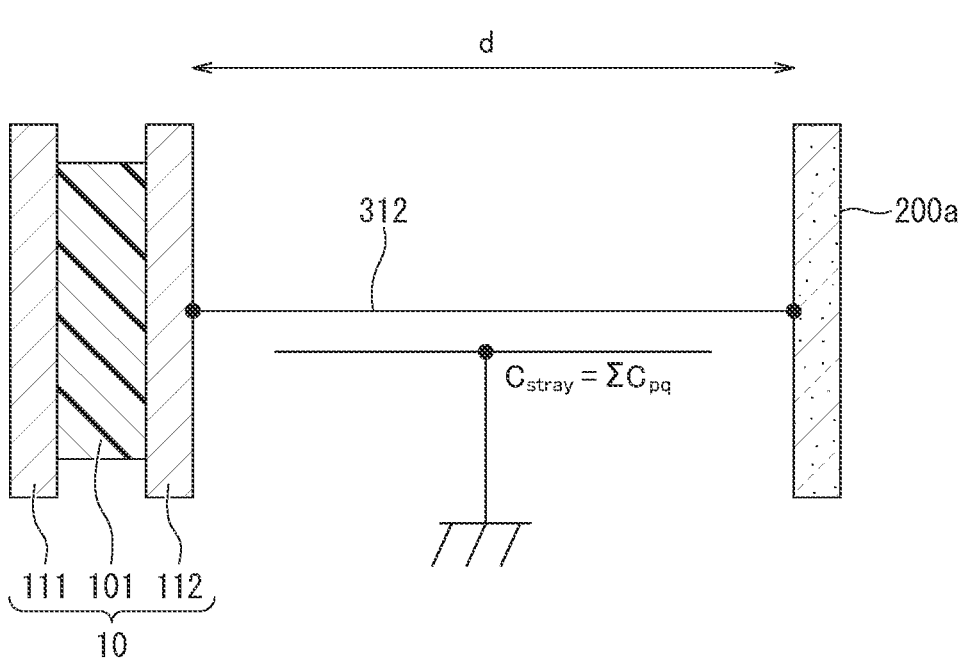
FIG. 2A is a view explaining a distance between a piezoelectric element and an IC chip, and an input stray-capacitance parasitic in a wiring connecting between the piezoelectric element and the IC chip.

As illustrated in FIG. 2A, the piezoelectric element 10 is assumed to encompass the first electrode plate 111, the piezoelectric layer 101 and the second electrode plate 112. In order to suppress the capacitive coupling with the outside of the ultrasonic receiver, the outer first electrode plate 111 is grounded, and the inner second electrode plate 112 opposite to the first electrode plate 111 is defined as the signal electrode. The second electrode plate 112 is electrically connected to the input of the stealth amplifier 200a through the resin signal wiring 312. Also, most of the outer circumference of the stealth amplifier 200a is coated with the conductive resin layer 301, as illustrated in FIGS. 1A, 1B, and 1D, and can be regarded to be connected to the grounding electrode from an aspect of alternate current circuit theory. In FIG. 2A, among the capacitances between the first electrode plate 111 and the second electrode plate 112, let us consider an input stray-capacitance $C_{stray}$, other than capacitances in the piezoelectric element 10.

As illustrated in FIGS. 1A, 1B, 1D and the like, a stray-capacitance $C_{line}$ between the input connection member (resin signal wiring) 312 and the grounding potential becomes a function of position, and can be represented by following Eq. (1):

$$C_{line}=C_{11}+\ldots C_{1(j-1)}+C_{1j}+\ldots C_{21}+\ldots C_{2(k-1)}+ \\ C_{2k}+\ldots C_{31}+\ldots C_{3(l-1)}+C_{3l}+\ldots C_{41}+\ldots \\ C_{4(m-1)}+C_{4m}+\ldots \tag{1}$$

As indicated by Eq. (1), the stray-capacitance Cline encompasses components based on a distance "d" between the second electrode plate 112 and the stealth amplifier 200a. Regarding the input stray-capacitance Cstray, other than the capacitances in the piezoelectric element 10, beyond the stray-capacitance $C_{line}$ indicated by Eq. (1), there are other stray-capacitance $C_{area}$ between the first electrode plate 111 and the resin signal wiring 312 and between the first electrode plate 111 and the stealth amplifier 200a. The stray-capacitance $C_{area}$ is a component inversely proportional to "d", and as the "d" becomes small, the contribution of the component inversely proportional to "d" becomes large. Although the $C_{line}$ indicated by Eq. (1) is not strictly proportional to "d", the $C_{line}$ can be regarded as the component approximately proportional to "d".

Then, the input stray-capacitance $C_{stray}$ around the input connection member (resin signal wiring) 312 can be approximated by following Eq. (2) with a coefficient "A" representing a factor inversely proportional to "d" and a coefficient "B" representing a factor proportional to "d":

$$C_{stray}=A/d+Bd \tag{2}$$

Figure 2B:
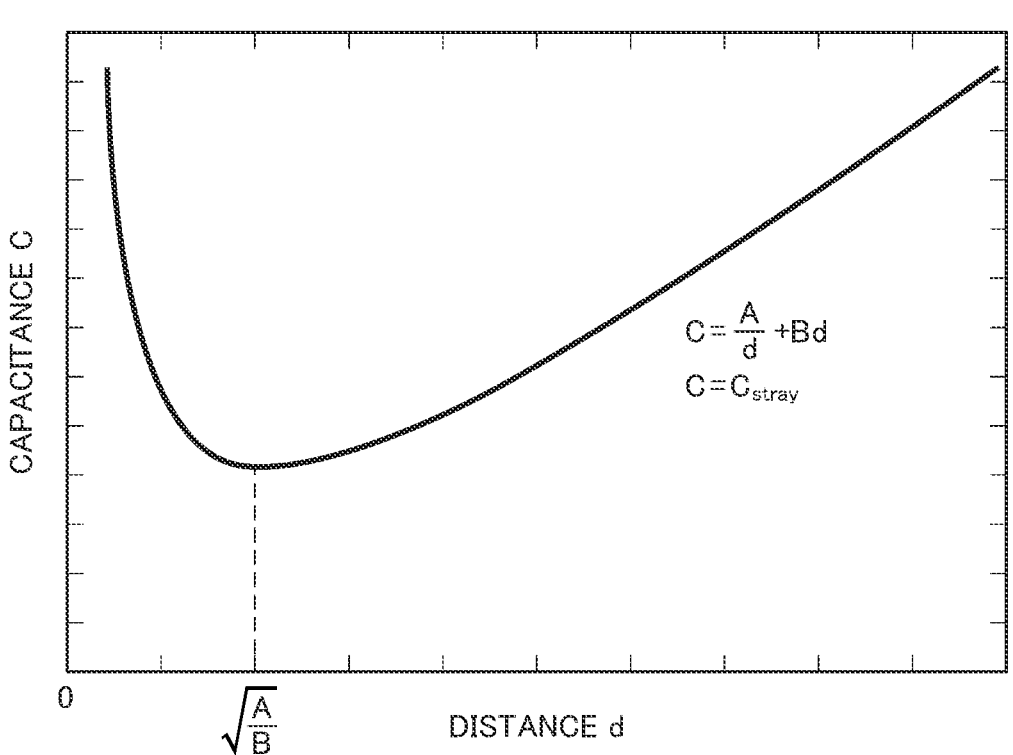
FIG. 2B is a curve illustrating a change in the input stray-capacitance between the piezoelectric element and the IC chip, with respect to the distance between the piezoelectric element and the IC chip.

Stated differently, the input stray-capacitance $C_{stray}$ can be approximated by the sum of the component inversely proportional to "d" and the component proportional to "d", and can be represented by a curve as illustrated in FIG. 2B.

The value of $d=d_{opt}$ that minimizes the value of the input stray-capacitance $C_{stray}$ in Eq. (2) is represented by following Eq. (3):

$$d_{opt}=(A/B)^{1/2} \tag{3}$$

In other words, complying with the curve illustrated in FIG. 2B, the input stray-capacitance $C_{stray}$ around the input connection member (resin signal wiring) 312 has the smallest value as the minimum value in the curve illustrated in FIG. 2B at a theoretical minimum distance $d_{idl}=(A/B)^{1/2}$. According to the ultrasonic receiver pertaining to the first embodiment, by disposing the IC chip as the stealth amplifier 200a in the vicinity position, separated by the theoretical minimum distance $d_{idl}$ from the piezoelectric element 10, a buried amplifier structure can be achieved, in which the input stray-capacitance $C_{stray}$ is suppressed to about 0.1 pF. And, by suppressing the input stray-capacitance $C_{stray}$ around the input connection member (resin signal wiring) 312 to about 0.1 pF, a sensitivity of received voltages as compared with earlier schemes can be improved.

On the other hand, when the stealth amplifier 200a is allocated at a distance shorter than the theoretical minimum distance dig, the input stray-capacitance $C_{stray}$ between the stealth amplifier 200a and the piezoelectric element 10 increases to about 1 pF, complying with the curve illustrated in FIG. 2B, and the received-voltage sensitivity will decrease. As illustrative example under a specific condition that a relative permittivity of the insulating resin 300 filling a space between the piezoelectric element 10 and the stealth amplifier 200a is about 3.4, an area of the first electrode plate 111 is about 0.1 mm² and a capacitance for the first electrode plate 111 between the resin signal wiring 312, which connects from the second electrode plate 112 to the stealth amplifier 200a, is about 100 pF/m, A≈3 pF/m and B≈100 pF/m can be estimated. And therefore, a value of the theoretical minimum distance $d_{idl}$ can be estimated to be about 200 micrometers, as the illustrative example. As understood from the illustrative example of the ultrasonic receiver pertaining to the first embodiment, although the distance between the stealth amplifier 200a and the piezoelectric element 10 depends on the relative permittivity of the insulating resin 300, and further depends on the area of the first electrode plate 111, the theoretical minimum distance $d_{idl}$ shall be about 150 to 250 micrometers. However, in view of practical limitations ascribable to manufacturing process, the minimum distance $d_{opt}$ is desired to be about 450 to 550 micrometers.

That is, by setting the distance "d" between the first electrode plate 111 and the stealth amplifier 200a to an approximate value of the minimum distance dopt, the input stray-capacitance Cstray, which becomes a factor of the sensitivity drop in the received voltages, can be suppressed to a relatively small value. Furthermore, because the values of the theoretical minimum distance didl≈150 to 250 micrometers and the minimum distance dopt≈450 to 550 micrometers are merely exemplifications, the theoretical minimum distance didl and the minimum distance dopt are not limited to the above values. Also, owing to the practical manufacturing technique, although the case of the following Eq. (4) has been explained as an example, it is natural that the following Eq. (5) will be possible by technical innovations in manufacturing techniques:

$$D_{idl} < d_{opt} \qquad (4) \text{ and}$$

$$D_{idl} \approx d_{opt} \qquad (5).$$

Additionally, the main body (300, 301, 800) is continuous to the thick diameter side of the resin horn (300, 301), and the resin horn (300, 301) is made of the resin cylindrical portion establishing the stepped structure. In the resin cylindrical portion establishing the stepped structure, since the diameter of the cylinder can be made thick, it is relatively easy to set the value of an output stray-capacitance $C_{out}$, which is parasitic in an output interconnection 437 that electrically connects between the stealth amplifier 200a and the extraction terminal 500, to a lower value. Also, by shortening a distance between the stealth amplifier 200a and the extraction terminal 500, the value of the output stray-capacitance $C_{out}$ can be reduced to a smaller value. Moreover, if the output voltage of the piezoelectric element 10 can be amplified to a sufficiently high voltage by the stealth amplifier 200a, the disadvantage of an output voltage drop can be suppressed, which is caused by the contribution of the output stray-capacitance $C_{out}$.

Figure 6:
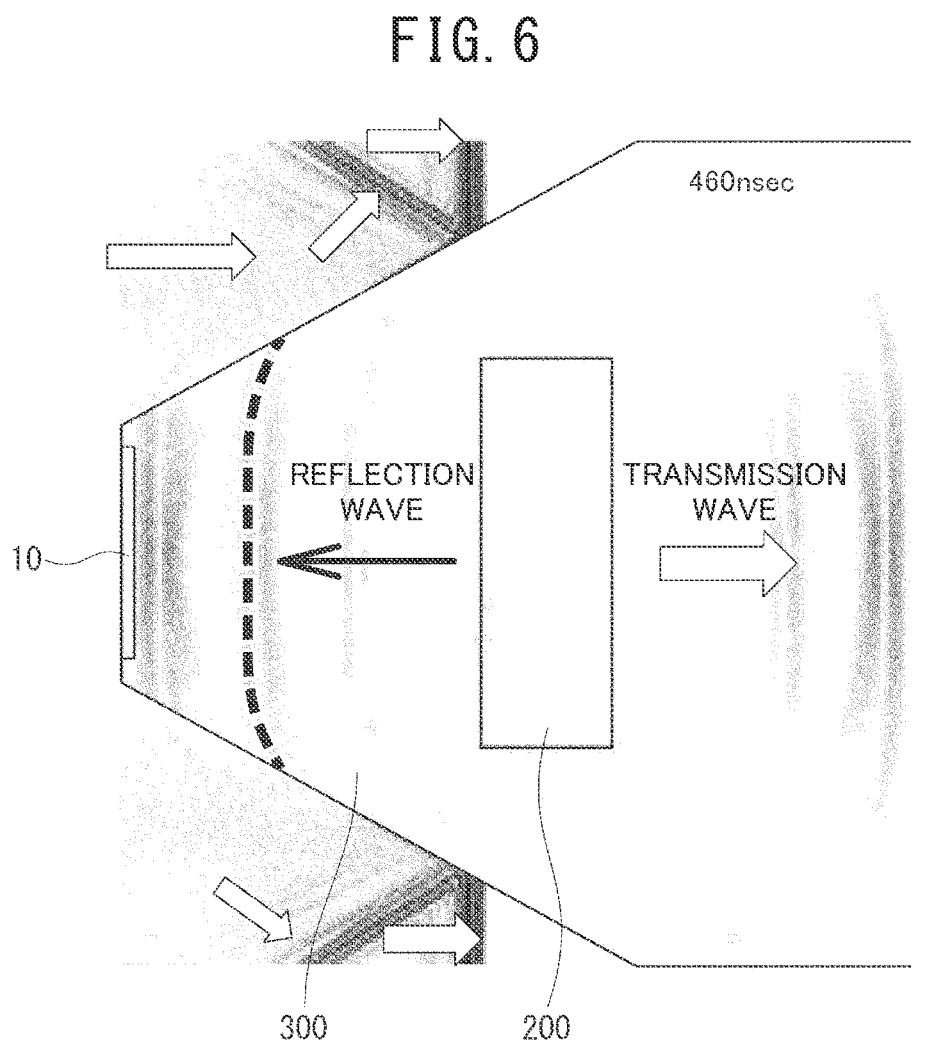

In the earlier ultrasonic receiver illustrated in FIG. 4, the piezoelectric element 10 detects ultrasonic wave, which penetrates through the piezoelectric element 10 to become the transmission wave, and the transmission wave enters into the main body (300, 301, 800) of the ultrasonic receiver. In the explanation of the present specification, under a condition that an ultrasonic wave has a waveform of a continuous wave at a constant frequency or a wavelet-like waveform, a time instant when the ultrasonic waves arrive to the piezoelectric element 10 is defined as 0 ns as illustrated in FIGS. 7A-7D. In the example illustrated in FIG. 4, the transmission wave penetrating through the piezoelectric element 10 arrives to the IC chip 200 after 240 ns. Moreover, as illustrated in FIG. 6, after 460 ns, a reflection wave—unnecessary echo—from the IC chip 200 again arrives to the piezoelectric element 10. The reflection wave as illustrated in FIG. 6 again arrives to the piezoelectric element 10 as the unnecessary echo and becomes noise. Thus, an S/N ratio of signals to be originally detected by the piezoelectric element 10 is deteriorated. The situation becomes particularly remarkable when a thickness of the IC chip 200 becomes three micrometers or more and a length of one side becomes 0.3 mm or more, with respect to the ultrasonic receiver whose tip diameter is about 0.5 to 3 mm. In addition, outside an insulating resin 300 in FIG. 6, wave-front profiles are indicated in which outer ultrasonic waves (ultrasonic waves to be detected) are traveling to the right direction, at more right locations than the situation illustrated in FIG. 4, on the outer wall sides of the horn. Outside the insulating resin 300 in FIG. 6, wave-fronts of diffracted ultrasonic waves to be detected, the diffracted ultrasonic wave are transmitted from the ridges of the piezoelectric element 10, are traveling along the horn shape in a right direction, at more right locations than the situation illustrated in FIG. 4.

So, according to the ultrasonic receiver pertaining to the first embodiment, under a condition that the IC chip is arranged on a transmission route of transmission waves propagating through the first electrode plate 111, an angle of the main-face of the IC chip is set so that CSMI angle θ is 30 degrees or more and 60 degrees or less, and the IC chip is used as the stealth amplifier 200a. Concretely, as illustrated in FIG. 1A, a virtual line 901 extending along the axis direction from one ridge (upper ridge) on the radial direction of the piezoelectric element 10 and a virtual line 902 extending along the axis direction from the other ridge (lower ridge) on the radial direction of the piezoelectric element 10 are defined. And, an area between the virtual line 901 and virtual line 902 in FIG. 1A is defined as "a behind space". When the piezoelectric element 10 is circular, the behind space is a cylindrical area onto which an outer circumference of the piezoelectric element 10 is projected along the sound-field detection-axis AX, which passes through the center of the piezoelectric element 10 and is parallel to the normal direction of the first electrode plate 111, as the central axis. According to the ultrasonic receiver pertaining to the first embodiment, in a configuration that the stealth amplifier 200a exists in the behind space defined in FIG. 1A, the stealth amplifier 200a shall be supposed to be located at a specific position to which the ultrasonic waves from the piezoelectric element 10 can be entered.

If the stealth amplifier 200a exists in the behind space, CSMI angle θ, which is an angle between the virtual line 911 indicating a main-face direction of the first electrode plate 111 illustrated in FIG. 9A and the virtual line 912 indicating an inclination of a main-face of the IC chip 200 exposed to the ultrasonic waves, is set to 30 degrees or more and 60 degrees or less. Then, according to the ultrasonic receiver pertaining to the first embodiment, since the stealth amplifier 200a is implemented by the IC chip in which the direction of the main-face is inclined by CMSI angle θ, a stealth effect can be achieved, in which the generation of the unnecessary echoes caused by the IC chip 200 is suppressed. Due to the stealth effect that does not generate the unnecessary echoes, as a result, S/N ratio of the ultrasonic receiver pertaining to the first embodiment can be improved.

By the way, the value of 30 degrees as the lower limit of CMSI angle θ is a lower limit value obtained to achieve a minimum realistically required S/N ratio (for example, 28 dB), from an analysis result illustrated in FIG. 15, which will be described later. Also, the value of 60 degrees as the upper limit of CMSI angle θ is an upper limit value obtained to achieve the minimum realistically required S/N ratio (for example, 28 dB), from the analysis result illustrated in FIG. 15. Besides, as to the other main-face (bottom face) of the IC chip 200 other than the main-face (top face) exposed to the ultrasonic waves, in a range in which CMSI angle θ is 0 degree or more and 90 degrees or less, it is enough that the main-face exposed to the transmission wave is considered with regard to the problem of the unnecessary echoes. According to the ultrasonic receiver pertaining to the first embodiment, when CMSI angle θ increases to exceed 90 degrees, the ultrasonic wave will enter to the other main-face that has not been exposed to the ultrasonic wave in a configuration with smaller CMSI angle θ, in view of the analysis result illustrated in FIG. 15, the upper limit of CMSI angle θ is set to 60 degrees.

As illustrated in FIG. 3A, the cylindrical sheath 800 according to the ultrasonic receiver pertaining to the first embodiment has an extraction terminal 500 on the edge side, which is allocated on an opposite side to the tip side along the axis direction. The extraction terminal 500 is a connector that is connected to other apparatuses through a transmission line 510 such as a coaxial cable or the like. As illustrated in FIG. 3A, the extraction terminal 500 is connected to the output pad 222 (see FIG. 1A) through the output interconnection (output lead line) 437, the output pad 222 is provided on the IC chip implementing the stealth amplifier 200a so that an output of the stealth amplifier 200a can be guided to the extraction terminal 500. As illustrated in FIG. 3B, an ultrasonic-observation device pertaining to the first embodiment of the present invention has the main body (300, 301, 800), the transmission line 510 connected to the other end side of the main body (300, 301, 800) and an observation apparatus 520 connected to the transmission line 510. By an architecture attached with cable, in which the observation apparatus 520 is supposed to be connected through the transmission line 510 such as coaxial cable or the like, the connection process of the ultrasonic receiver to the observation apparatus 520 such as an oscilloscope or the like is made easy as illustrated in FIG. 3B. In addition, when the other apparatus is directly connected to the extraction terminal 500 illustrated in FIG. 3A, the problem of the influence of external stray-capacitance $C_{ext}$ in the transmission line 510 can be removed. A dimension of a pressure-receiving plane in the hydrophone, the pressure-receiving plane is required to accurately measure a special distribution of any ultrasonic wave, must be ½ or less of the wavelength of the ultrasonic wave, if the measurement is executed based upon sampling theorem. When an ultrasonic frequency is 10 MHz, the dimension of the pressure-receiving plane becomes a small such as $\lambda/2=0.075$ mm$^\Phi$.

When PVDF film is assumed to be employed for the piezoelectric layer 101, as mentioned above, when PVDF film has a thickness of t=30 micrometers, signals source capacitance $C_{signal}$ of the piezoelectric element 10 can be made extremely small such as about 0.01 pF. However, the coaxial cable of 10 cm has a stray-capacitance (external stray-capacitance $C_{ext}$) of about 10 pF. By employing the coaxial cable having the above estimated external stray-capacitance $C_{ext}$ in the transmission line 510, the observation of voltages generated in the piezoelectric element 10 is tried by connecting to the observation apparatus 520 such as the oscilloscope or the like, the observed values of voltages becomes only ⅟1000 of a value assumed to be directly measured. Since the observed values of voltages are far from the value required for practical use, a challenge of measuring the distribution, which varies finely at dimension of several times or less of the wavelength, is abandoned for the spatial distribution of the ultrasonic waves. Then, a device configuration having the pressure-receiving plane with a dimension of several times larger than the above-mentioned 0.075 mm$^\Phi$, that is, an area about one digit larger than 0.075 mm$^\Phi$, becomes common, even in the earlier technology. Compromising on the fineness level of measurable spatial distribution is equivalent to make directionality of the hydrophone narrower. Furthermore, to make the received-voltage waveforms displayed on the observation apparatus 520, such as the oscilloscope or the like, closely approximate the sound-pressure waveforms entered to the ultrasonic receiver, the piezoelectric element 10 is required to have the excellent pulse-response characteristics. Dielectric constant of a polymeric piezoelectric material represented by PVDF film is nearly two orders of magnitude lower than that of piezoelectric ceramic represented by PZT. Thus, the polymeric piezoelectric material has a disadvantage that a voltage sensitivity tends to become lower, because the polymeric piezoelectric material is strongly susceptible to the effect of the capacitance in the transmission line 510 and the like. However, as described already, the acoustic impedance of PVDF film is close to the intrinsic impedance of water. Since the matching characteristics of the acoustic impedance leads to the excellent pulse-response characteristics, PVDF film is more widely used than PZT as the piezoelectric layer 101 constructing the piezoelectric element 10 in the hydrophone.

According to the ultrasonic receiver pertaining to the first embodiment, although a case is expressed in which the sound wave is propagated from the left to right side toward the head portion of the ultrasonic receiver, as exemplified in FIG. 4 and the like, the ultrasonic receiver pertaining to the first embodiment is not limited to the technique for detecting only the ultrasonic waves propagating along a specific one direction. In particular, because medical ultrasonic devices are required to accurately measure spatial distributions of any arbitrary ultrasonic waves, the ultrasonic waves can propagate in any arbitrary directions. However, according to the ultrasonic receiver pertaining to the first embodiment, in a meaning of available dimensional size by current technical level, after abundant of the scheme such that receiving any ultrasonic wave arriving to the ultrasonic receiver from the arbitrary directions with approximately uniform sensitivity, an ultrasonic wave arriving through the head portion toward the pressure-receiving plane of the ultrasonic receiver is merely elected as a main measurement target in the ultrasonic waves, for the sake of convenience. In other words, caution should be paid to a situation that only the ultrasonic wave arriving through the substantially head portion toward the pressure-receiving plane of the ultrasonic receiver is not always serves as the measurement target in the present invention. According to the ultrasonic receiver pertaining to the first embodiment, the problem of the unnecessary echoes from the stealth amplifier 200a can be removed by setting CMSI angle θ assigned to the IC chip employed as the stealth amplifier 200a to 30 degrees or more and 60 degrees or less, in the structure in which the piezoelectric element 10 and the stealth amplifier 200a are compactly embedded in the main body (300, 301, 800). Thus, according to the ultrasonic receiver pertaining to the first embodiment, S/N ratio as well as the received-voltage sensitivity can be improved.

Figure 8A:
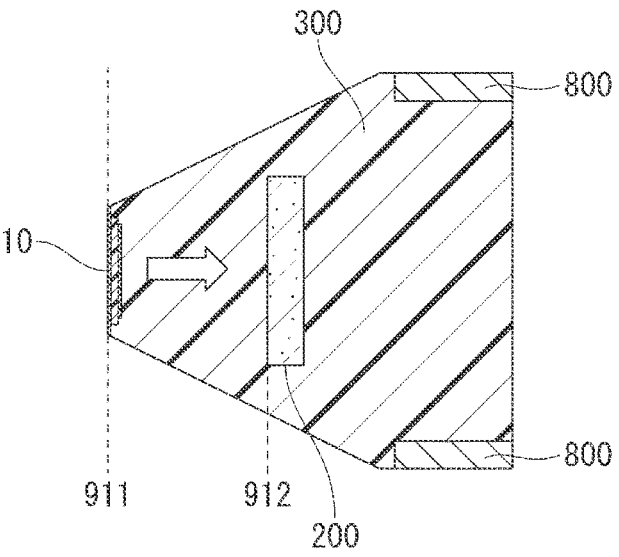
FIG. 8A is a view explaining a configuration of a chip main-face inclination (CMSI) angle θ=0 degree, which is defined by the main-face of the IC chip with respect to electrode surfaces of a pair of electrode plates implementing a piezoelectric layer.
Figure 8B:
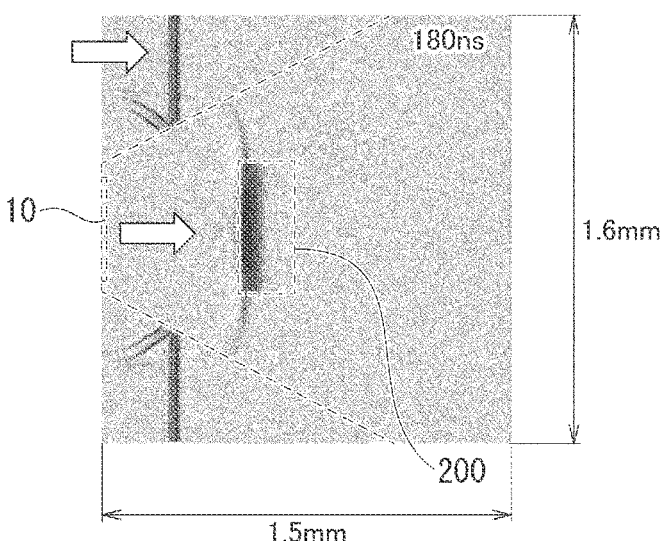
FIG. 8B is a view illustrating a wave-front at leading edge in a transmission wave at an instant of 180 ns, which is the instant when the transmission wave arrives to the main-face of the IC chip after the ultrasonic wave arrives to the piezoelectric element, the wave-front is represented by gray values corresponding to intensity-variation of the sound pressures, under the configuration with CMSI angle θ=0 degree.
Figure 8C:
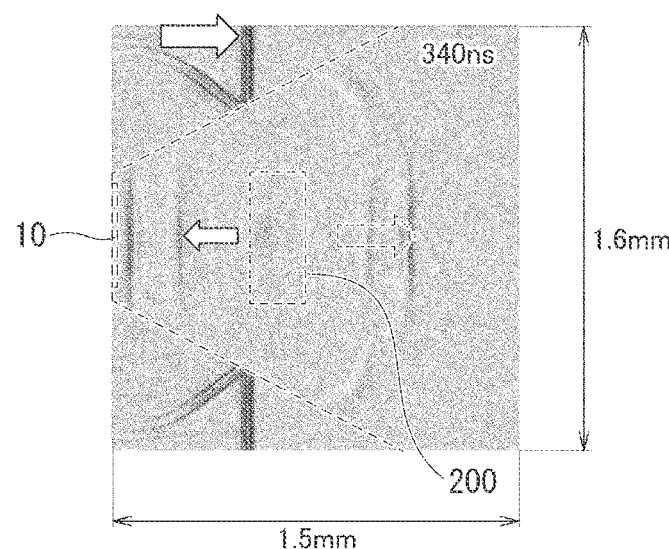
FIG. 8C is a view illustrating a leading wave-front of reflection wave reflected by the IC chip at an elapse time of 340 ns after the ultrasonic wave arrives to the piezoelectric element, the wave-front is represented by gray values corresponding to intensity-variation of the sound pressures, under the configuration with CMSI angle θ=0 degree.
Figure 14A:
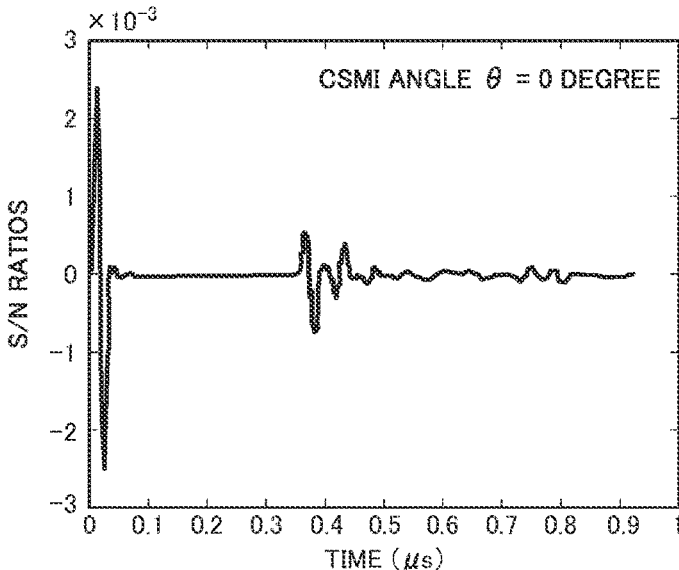
FIG. 14A illustrates a waveform due to intensity variation of a reflection wave, representing an influence of the reflection wave on S/N ratio with CSMI angle θ=0 degree.

At first, in a configuration with CMSI angle θ=0 degree as illustrated in FIG. 8A, the transmission wave arrives to the main-face of the IC chip 200 at a time of 180 ns, as illustrated in FIG. 8B. After that, at a time of 340 ns, as illustrated in FIG. 8C, the transmission wave penetrates through the IC chip 200 to further propagate forward, and simultaneously, the reflection wave—unnecessary echo—reflected by the main-face of the IC chip 200 will enter to the piezoelectric element 10. As simulation result, as illustrated in FIG. 14A, the curve representing intensity-variation of the received voltage at the piezoelectric element 10 is confirmed to increase from the timing near the instant of 340 ns. As a result, S/N ratio is known to become smaller than 28 dB that is an aimed value.

Figure 9B:
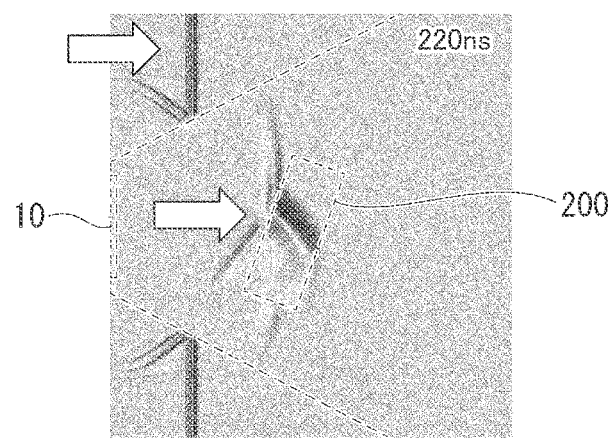
FIG. 9B is a view illustrating a wave-front at leading edge in a transmission wave at an instant of 220 ns, which is the instant when the transmission wave arrives to the center of the main-face of the IC chip after the ultrasonic wave arrives to the piezoelectric element, under the configuration with CMSI angle θ=20 degrees, the wave-front is represented by gray values corresponding to intensity-variation of the sound pressures.
Figure 9C:
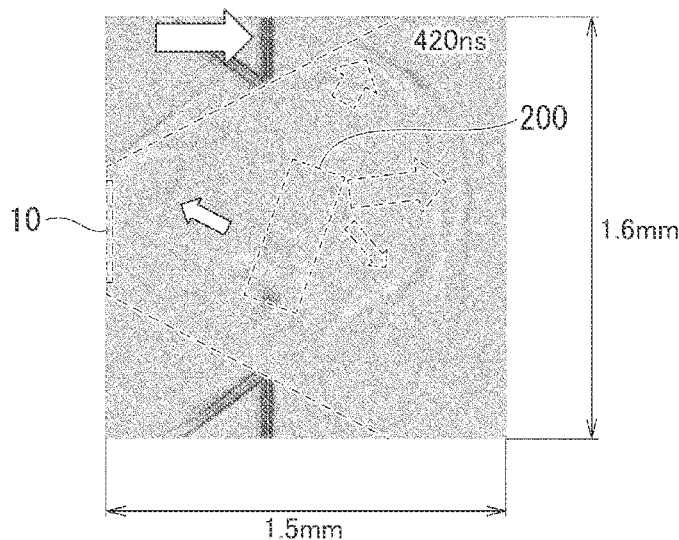
FIG. 9C is a view illustrating a leading wave-front of reflection wave reflected by the IC chip at an elapse time of 420 ns after the ultrasonic wave arrives to the piezoelectric element, under the configuration with CMSI angle θ=20 degrees, the wave-front is represented by gray values corresponding to intensity-variation of the sound pressures.
Figure 14B:
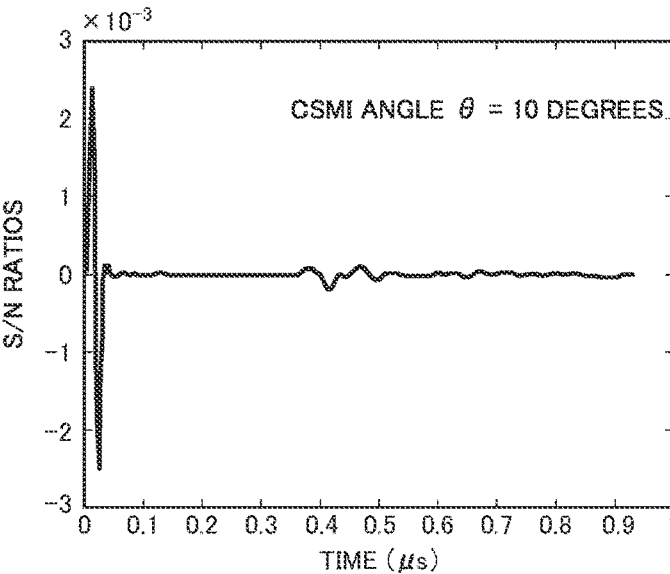
FIG. 14B illustrates a waveform due to intensity variation of a reflection wave, representing the influence of the reflection wave on S/N ratio with CSMI angle θ=10 degree.
Figure 14C:
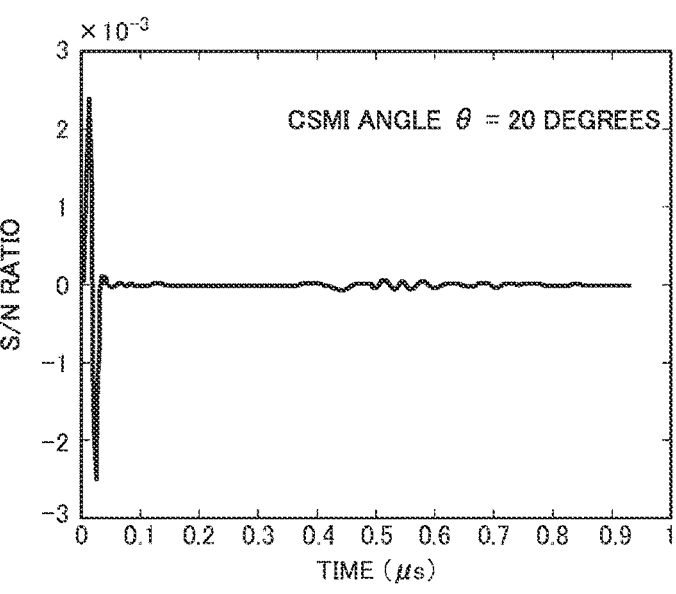
FIG. 14C illustrates a waveform due to intensity variation of a reflection wave, representing the influence of the reflection wave on S/N ratio with CSMI angle θ=20 degree.

Next, under a configuration of CMSI angle θ=20 degrees as illustrated in FIG. 9A, the transmission wave arrives to the center of the main-face of the IC chip 200 at a time of 220 ns, as illustrated in FIG. 9B. After that, at a time of 420 ns, as illustrated in FIG. 9C, the transmission wave arrives to the edge of the main-face of the IC chip 200, and there are mixtures of a reflection wave propagating back from the edge as a reflection point and a wave passing through the IC chip 200 to further propagate forward, and other waves. And simultaneously, the reflection wave reflected by the main-face of the IC chip 200 arrives to the vicinity of the piezoelectric element 10. As a simulation result, the curve representing intensity-variation of the received voltages in the piezoelectric element 10 having the configuration of CMSI angle θ=20 degrees is confirmed to increase from the timing near the instant of 420 ns, as illustrated in FIG. 14C. As a result, S/N ratio is known to become smaller than 28 dB that is the aimed value. In addition, although variation of the wave-fronts for CMSI angle θ=10 degrees is not represented, the curve representing intensity-variation of received voltages in the piezoelectric element 10 having the configuration of CMSI angle θ=10 degrees is confirmed to increase from the timing near an instant of 340 ns, as illustrated in FIG. 14B. As a result, it is known that S/N ratio become smaller than the aimed value of 28 dB.

Figure 10A:
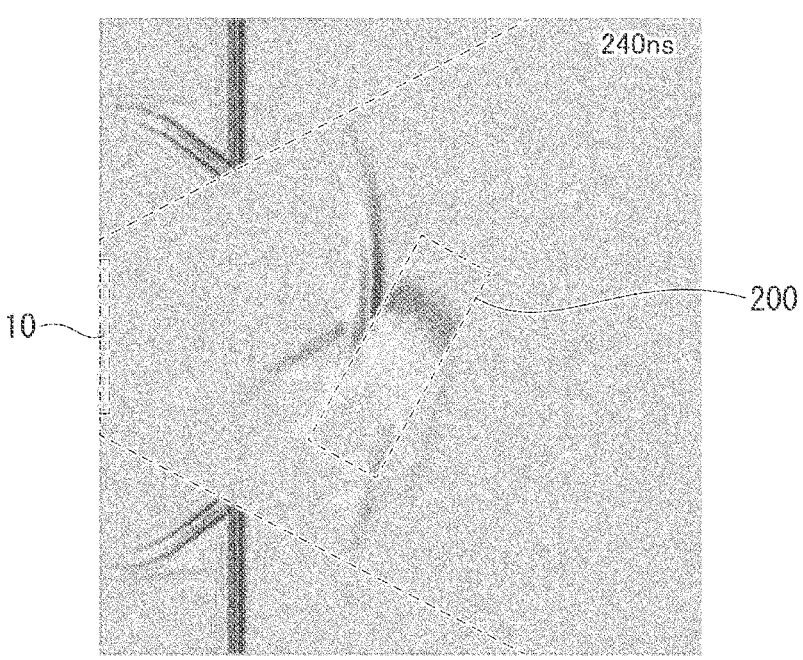
FIG. 10A is a view illustrating a wave-front at leading edge in a transmission wave at an instant of 240 ns, which is the instant when the transmission wave arrives to the center of the main-face of the IC chip after the ultrasonic wave arrives to the piezoelectric element, under a configuration with CSMI angle θ=30 degrees, the wave-front is represented by gray values corresponding to intensity-variation of the sound pressures.
Figure 10B:
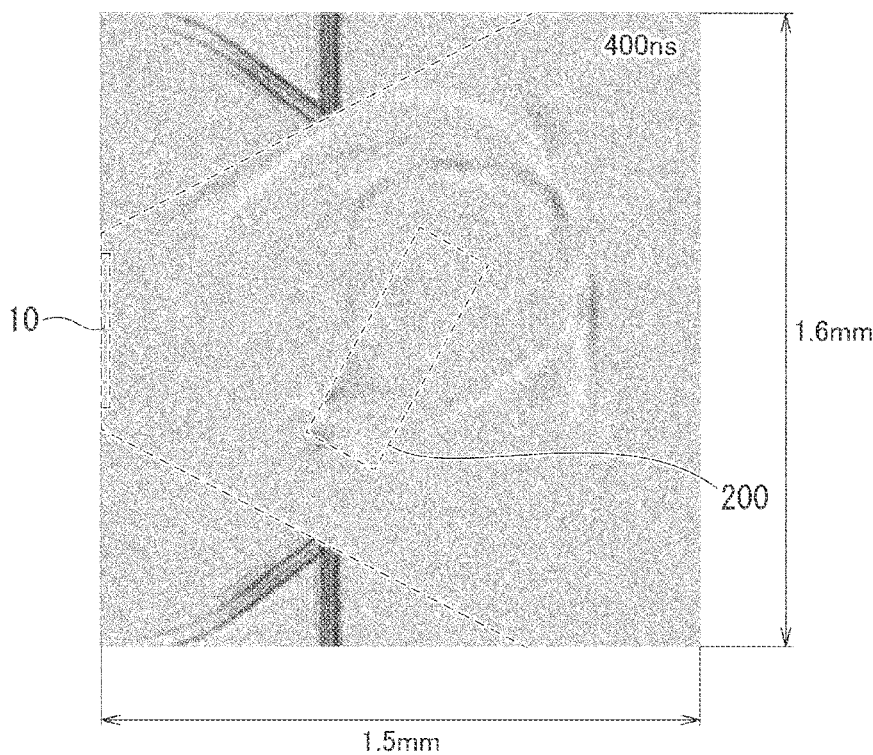
FIG. 10B is a view illustrating a leading wave-front of reflection wave reflected by the IC chip at an elapse time of 400 ns after the ultrasonic wave arrives to the piezoelectric element, under the configuration with CMSI angle θ=30 degrees, the wave-front is represented by gray values corresponding to intensity-variation of the sound pressures.
Figure 14D:
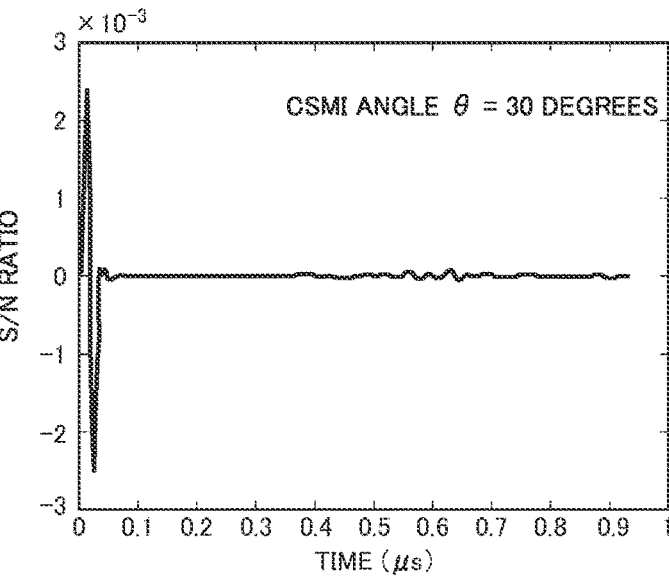
FIG. 14D illustrates a waveform due to intensity variation of a reflection wave, representing the influence of the reflection wave on S/N ratio with CSMI angle θ=30 degree.

Under a configuration of CMSI angle θ=30 degrees, as illustrated in FIG. 10A, the transmission wave arrives to the center of the main-face of the IC chip 200 at a time of 240 ns. After that, at a time of 400 ns, as illustrated in FIG. 10B, the transmission wave arrives to the edge of the main-face of the IC chip 200, and there are mixtures of a reflection wave propagating back from the edge as a reflection point and a wave passing through the IC chip 200 to further propagate forward, and other waves. On the other hand, the wave-front of the reflection wave reflected by the main-face of the IC chip 200 does not arrive in vicinity of the piezoelectric element 10. As a simulation result, even the curve representing intensity-variation of the received voltages in the piezoelectric element 10 having a configuration of CMSI angle θ=30 degrees is confirmed to hardly increase, even at a time when the reflection wave is assumed to re-enter into the piezoelectric element 10, as illustrated in FIG. 14D. As a result, it is known that S/N ratio become the aimed values of 28 dB or more.

Figure 11A:
FIG. 11A is a view illustrating a wave-front at leading edge in a transmission wave at an instant of 260 ns, which is the instant when the transmission wave arrives to a position a little before the center of the main-face of the IC chip after the ultrasonic wave arrives to the piezoelectric element, under a configuration with CSMI angle θ=40 degrees, the wave-front is represented by gray values corresponding to intensity-variation of the sound pressures.
Figure 11A:
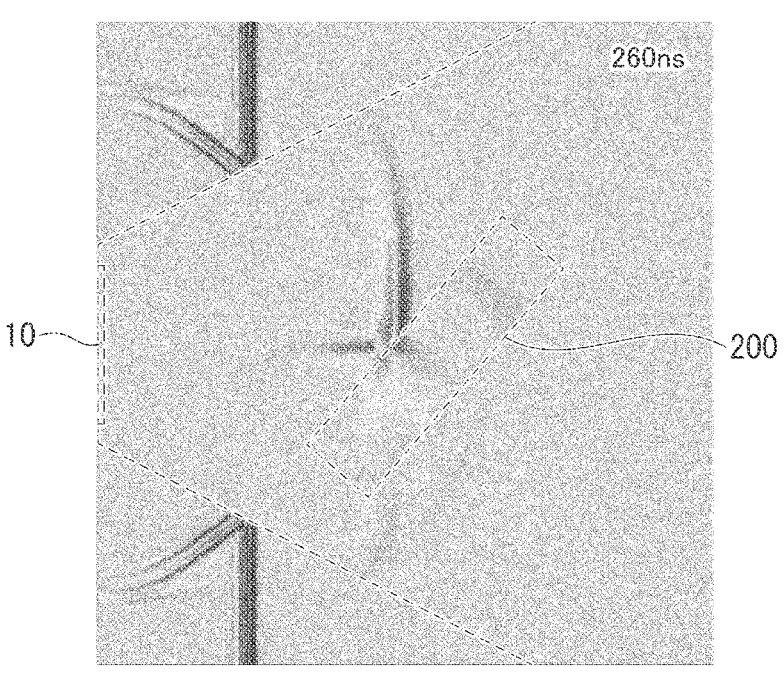
Figure 11B:
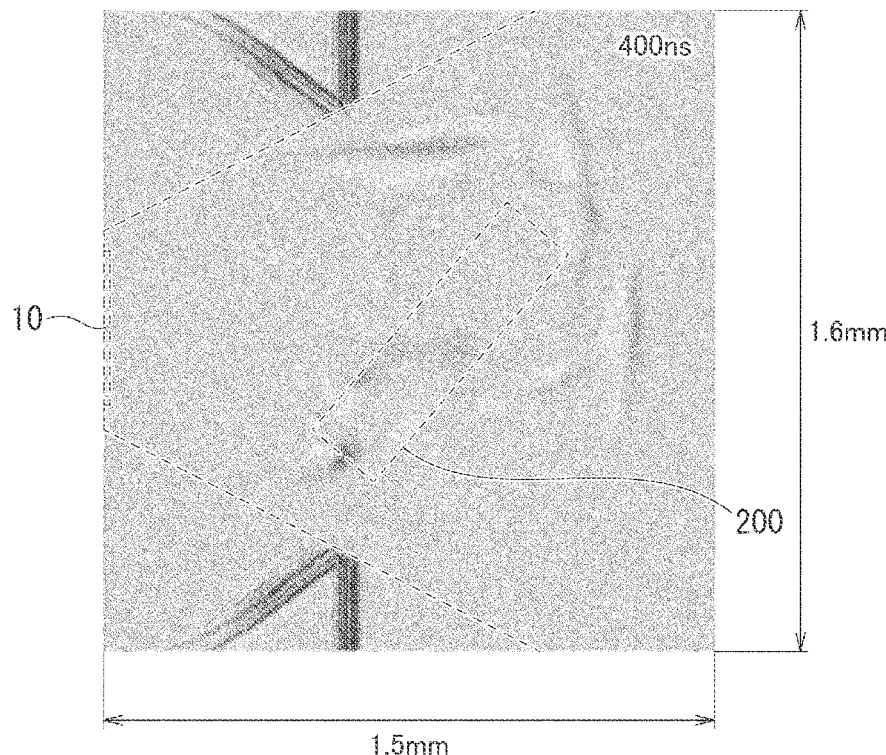
FIG. 11B is a view illustrating a leading wave-front of reflection wave reflected by the IC chip at an elapse time of 400 ns after the ultrasonic wave arrives to the piezoelectric element, under the configuration with CMSI angle θ=40 degrees, the wave-front is represented by gray values corresponding to intensity-variation of the sound pressures.
Figure 14E:
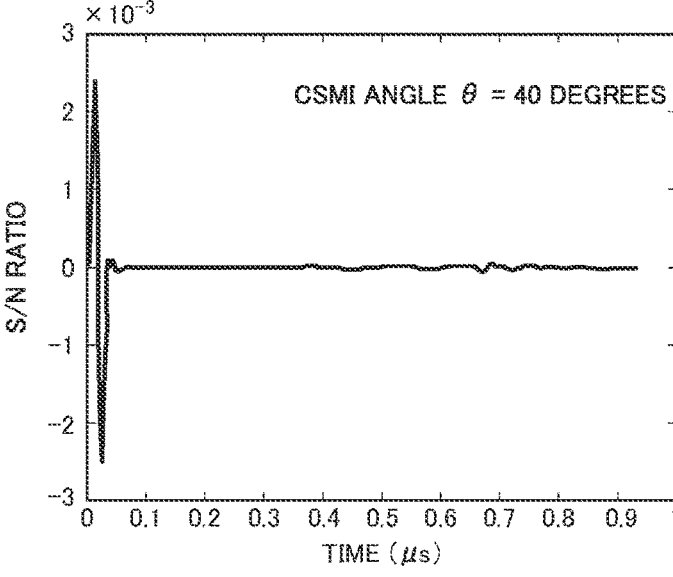
FIG. 14E illustrates a waveform due to intensity variation of a reflection wave, representing the influence of the reflection wave on S/N ratio with CSMI angle θ=40 degree.
Figure 14F:
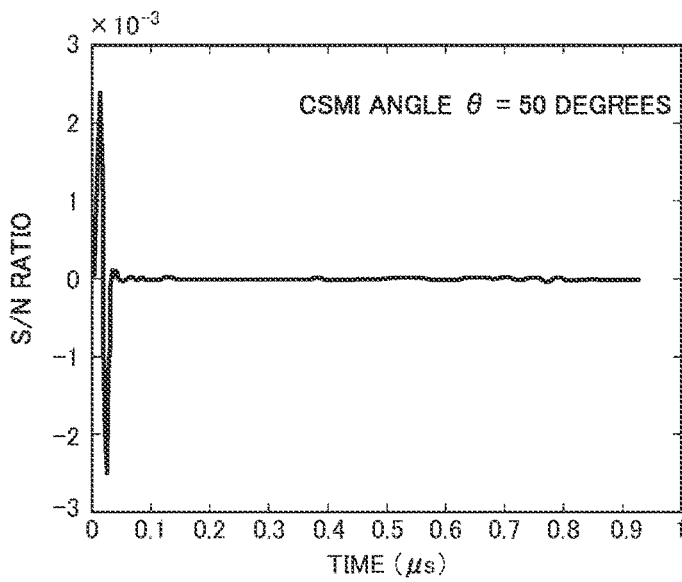
FIG. 14F illustrates a waveform due to intensity variation of a reflection wave, representing the influence of the reflection wave on S/N ratio with CSMI angle θ=50 degrees.

Under a configuration of CMSI angle θ=40 degrees, as illustrated in FIG. 11A, the transmission wave arrives to the center of the main-face of the IC chip 200 at a time of 260 ns. After that, at a time of 400 ns, as illustrated in FIG. 11B, the transmission wave arrives to the edge of the main-face of the IC chip 200, and there are mixtures of a reflection wave propagating back from the edge as a reflection point, a wave passing through the IC chip 200 to further propagate forward, and other waves. On the other hand, the reflection wave reflected by the main-face of the IC chip 200 is directed to the upper direction of the IC chip 200, and the wave-fronts of the reflection wave does not arrive in vicinity of the piezoelectric element 10. As a simulation result, even the curve representing intensity-variation of the received voltages in the piezoelectric element 10 having a configuration of CMSI angle θ=40 degrees is confirmed to hardly increase, even at a time when the reflection wave is assumed to re-enter into the piezoelectric element 10, as illustrated in FIG. 14E. As a result, it is known that S/N ratio become the aimed values of 28 dB or more. Additionally, although variation of the wave-fronts under a configuration of CMSI angle θ=50 degrees is not represented, even the curve representing intensity-variation of the received voltages in the piezoelectric element 10 having the configuration of CMSI angle θ=50 degrees is confirmed to hardly increase, even at a time when the reflection wave is assumed to re-enter into the piezoelectric element 10, as illustrated in FIG. 14F. As a result, it is known that S/N ratio become the aimed values of 28 dB or more.

Figure 12A:
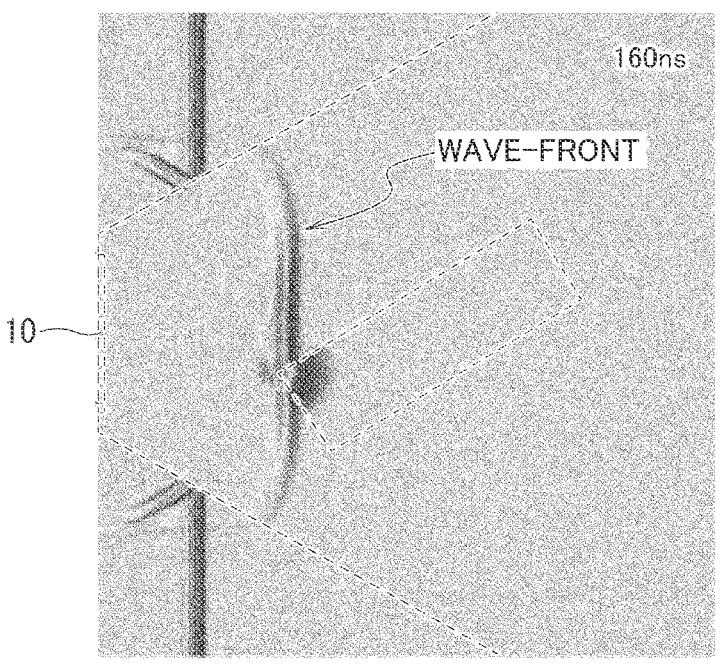
FIG. 12A is a view illustrating a wave-front at leading edge in a transmission wave at an instant of 160 ns, which is the instant when the transmission wave arrives at an edge of IC chip after the ultrasonic wave arrives to the piezoelectric element, under a configuration with CSMI angle θ=60 degrees, the wave-front is represented by gray values corresponding to intensity-variation of the sound pressures.
Figure 12B:
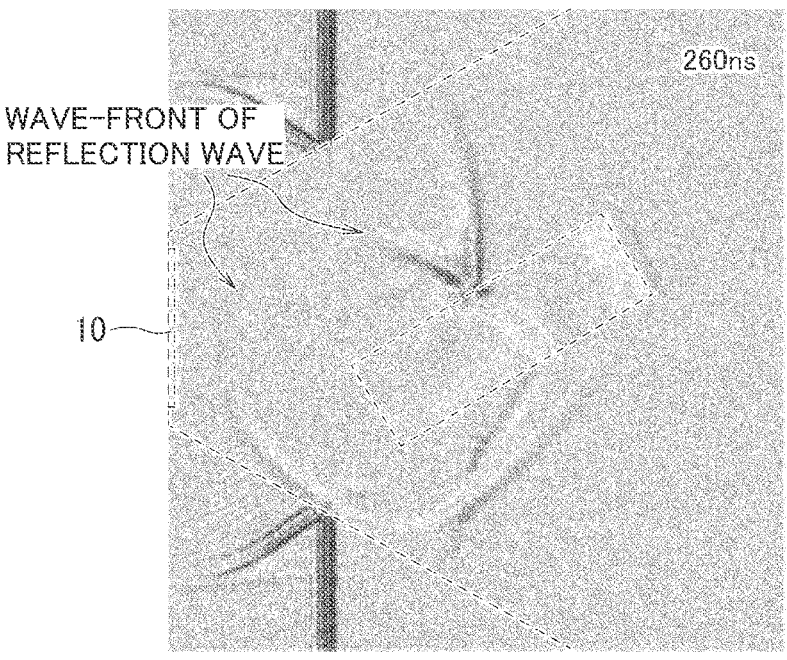
FIG. 12B is a view illustrating a leading wave-front of reflection wave reflected by the IC chip at an elapse time of 260 ns after the ultrasonic wave arrives to the piezoelectric element, under the configuration with CSMI angle θ=60 degrees, the wave-front is represented by gray values corresponding to intensity-variation of the sound pressures.
Figure 13A:
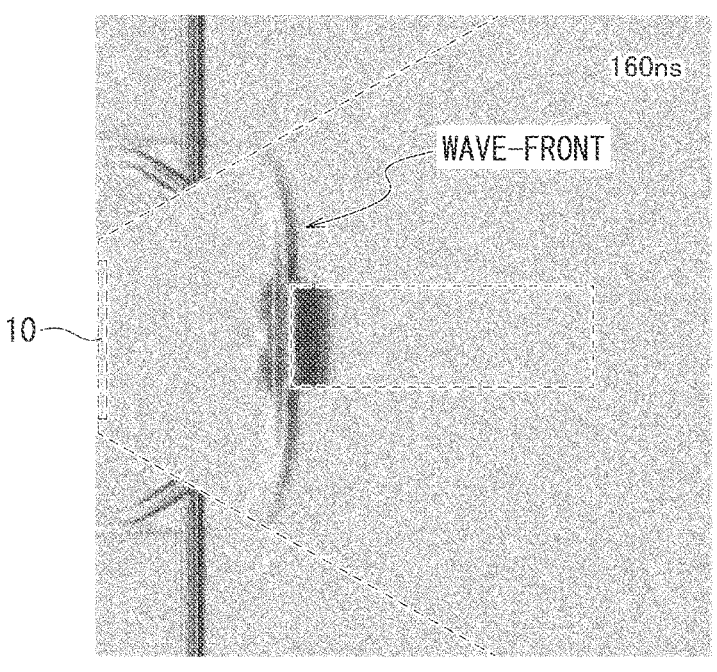
FIG. 13A is a view illustrating a wave-front at leading edge in a transmission wave at an instant of 160 ns, which is the instant when the transmission wave arrives at a side-face of the IC chip after the ultrasonic wave arrives to the piezoelectric element, under a configuration with CSMI angle θ=90 degrees, the wave-front is represented by gray values corresponding to intensity-variation of the sound pressures.
Figure 13B:
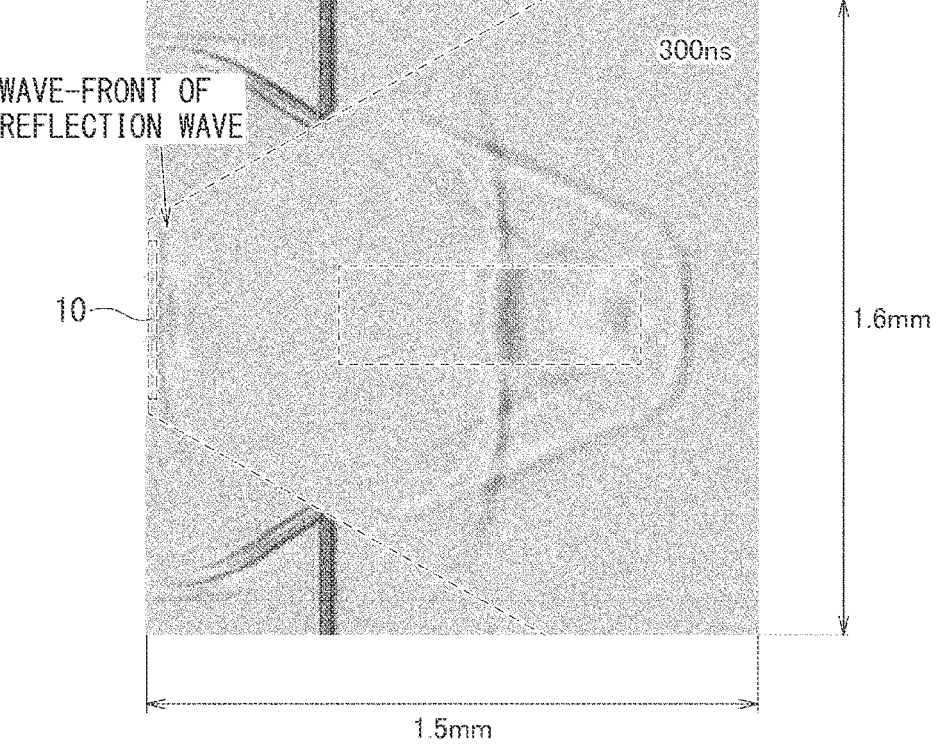
FIG. 13B is a view illustrating a leading wave-front of reflection wave reflected by the IC chip at an elapse time of 300 ns after the ultrasonic wave arrives to the piezoelectric element, the wave-front is represented by gray values corresponding to intensity-variation of the sound pressures.

Under a configuration of CMSI angle θ=60 degrees, as illustrated in FIG. 12A, the transmission wave arrives to the edge of the front side of the main-face of the IC chip 200, at a time of 160 ns. After that, at a time of 260 ns, as illustrated in FIG. 12B, the transmission wave arrives to the vicinity of the center of the main-face of the IC chip 200, and there are mixtures of a reflection wave from the main-face, a wave passing through the IC chip 200 to further propagate forward, and other waves. On the other hand, the reflection wave reflected from a region disposed in vicinity of the edge of the main-face of the IC chip 200 arrives to the vicinity of the piezoelectric element 10. Under a configuration of CMSI angle θ=90 degrees, as illustrated in FIG. 13A, the transmission wave arrives to the edge face of the IC chip 200 at a time of 160 ns. After that, at a time of 300 ns, as illustrated in FIG. 13B, the transmission wave arrives to the vicinities of the centers in both of main-faces of the IC chip 200, and there are mixtures of reflection waves from both of main-faces, waves passing through the IC chip 200 to further propagate forward, and other waves. On the other hand, the reflection wave reflected by the edge face of the IC chip 200 arrives to the vicinity of the piezoelectric element 10.

As mentioned above, the waveforms of curves representing each of intensity-variations of the received voltage in the piezoelectric element 10 with the conditions of CMSI angles θ=30, 40 or 50 degrees hardly increase, even at the times when the reflection waves (unnecessary echoes) are assumed to re-enter into the piezoelectric element 10, as illustrated in FIGS. 14D to 14F. As a result, in a configuration with CMSI angle θ assigned to the IC chip 200, which is used as the stealth amplifier 200a, is set to a range spanning 30 to 60 degrees, it is known that the aimed values of 28 dB or more in S/N ratio can be achieved. Moreover, by carrying out the simulations in which CMSI angles θ are changed, the relationship as indicated in FIG. 15 can be obtained, as the relationship between CMSI angle θ and S/N ratio. Caution should be paid that under abscissa in FIG. 15, CMSI angle θ is expressed as a "chip rotation angle θ (inclination angle)".

Figure 16:
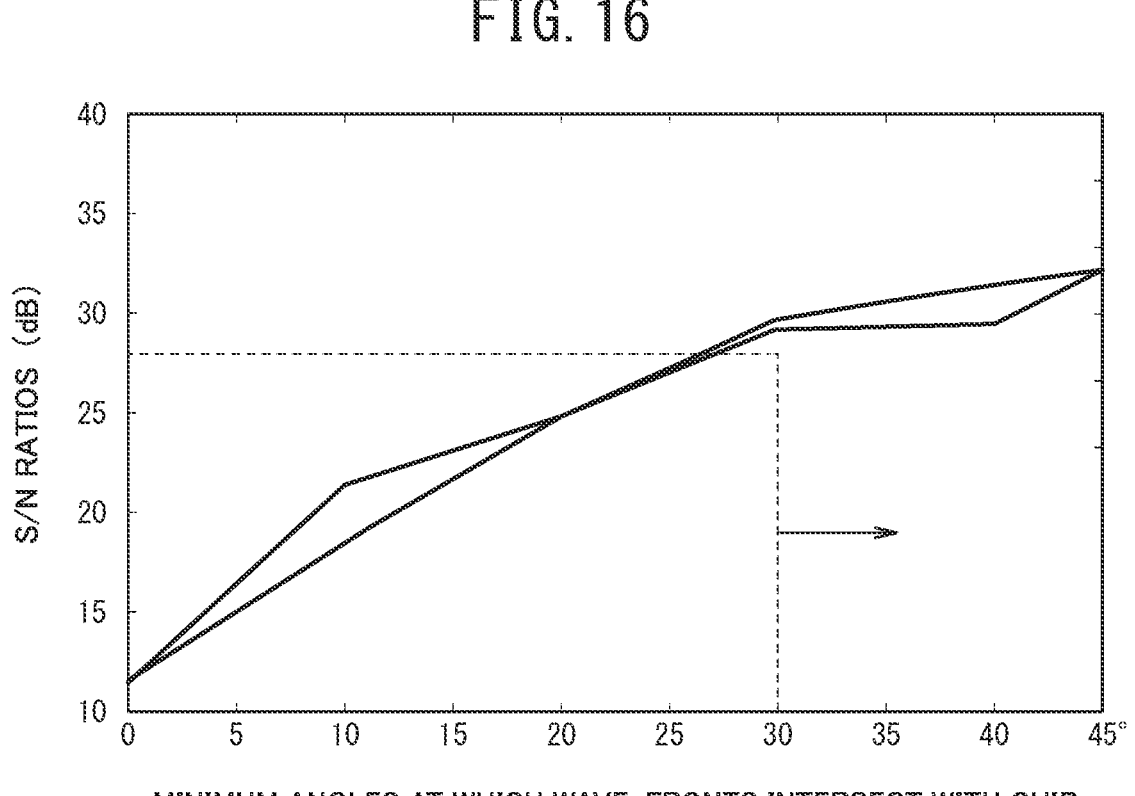
FIG. 16 is a diagram illustrating relationships between the minimum angles, at which the wave-fronts of ultrasonic waves intersect the main-face of the IC chip, and S/N ratios.

Furthermore, as explained already with reference to FIGS. 7A-7D, there are cases that the wave-fronts of the ultrasonic waves propagated through the resin horn (300, 301) in the ultrasonic receiver are practically implemented by curved surfaces or mixtures of a plurality of waves. In the case that the wave-front of the target ultrasonic wave manifests the curved surface, a plurality of tangent planes can exist in the wave-front implementing the curved surface. Thus, in a case that the wave-front arriving to the IC chip 200 represents the curved surface, a plurality of CMSI angles θ exist for the main-face of the IC chip 200 exposed to the ultrasonic wave. Hence, in the case that the wave-front of the transmission wave arriving to the IC chip 200 represents the curved surface, a tangent plane which defines the smallest angle, among a plurality of inclination angles assigned with the main-face of the IC chip 200, is elected for the smallest angle labeled on abscissa in FIG. 16. Stated differently, in the case that the wave-front of the transmission wave arriving to the IC chip 200 represents the curved surface, the inclination angle required for the stealth amplifier 200a shall be defined by the smallest angle represented on abscissa in FIG. 16. Then, as illustrated in FIG. 16, in a regime that the smallest angle is 30 degrees or more, the aimed values of 28 dB or more can be obtained for S/N ratio.

As mentioned above, according to the ultrasonic receiver and ultrasonic-observation device pertaining to the first embodiment, the compact structure in which the piezoelectric element 10 and the stealth amplifier 200a are embedded and fixed in the resin horn (300, 301) is achieved, which can provide the ultrasonic receiver and the ultrasonic-observation device that are high in sensitivity and high in S/N ratio. Especially, PVDF film that has the excellent acoustic impedance matching with water can be used for the piezoelectric element 10. And furthermore, even if the PVDF film is used, the input stray-capacitance $C_{stray}$ can be made small. Hence, the hydrophone that has a high sensitivity and a high S/N ratio can be provided, which has been desired for measuring the minute ultrasonic waves generated by medical ultrasonic devices, by using excellent pulse-response characteristics of PVDF film, and the ultrasonic-observation device using the hydrophone that has high sensitivity and S/N ratio.

Second Embodiment

Figure 17A:
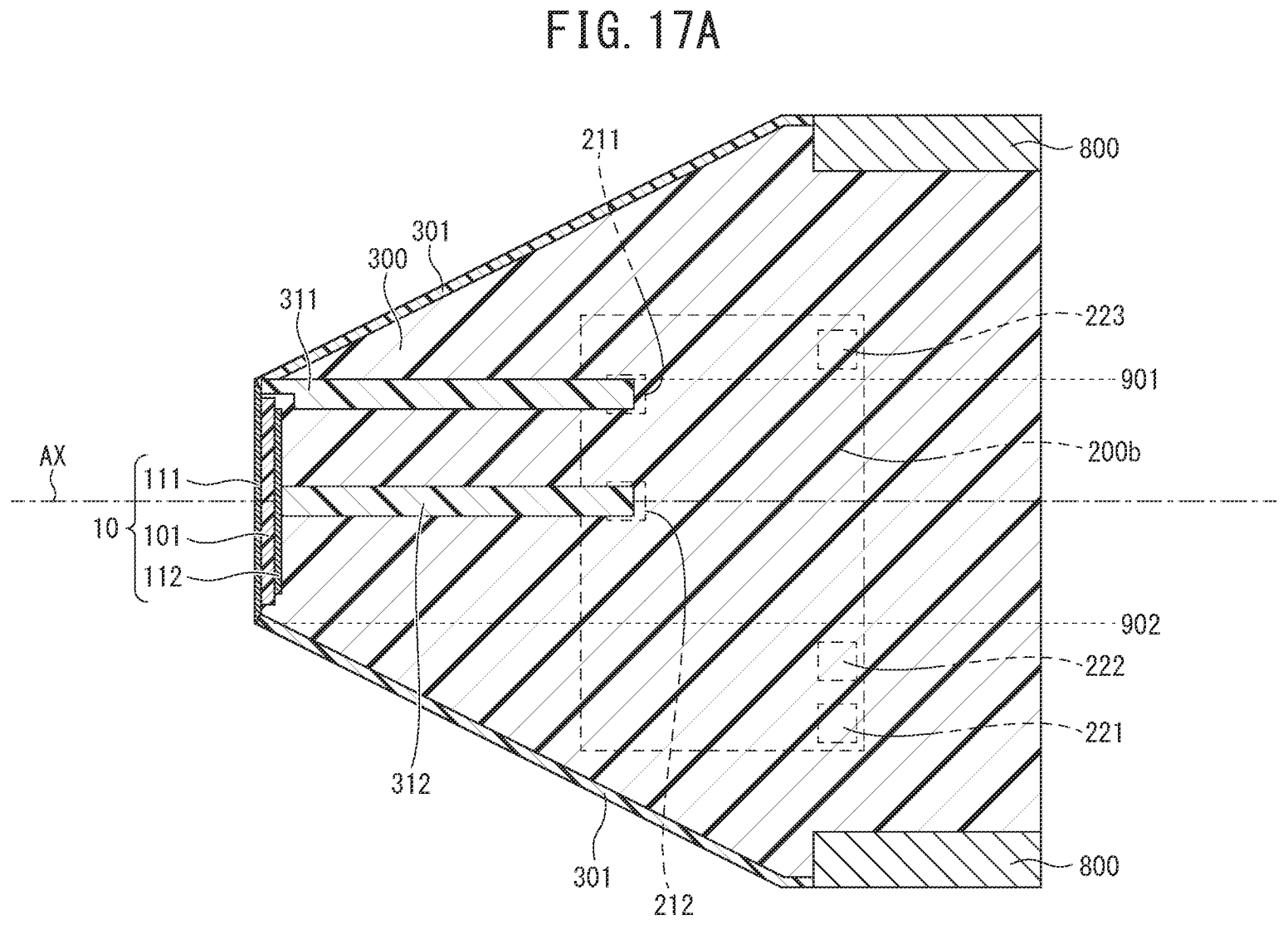
Figure 17B:
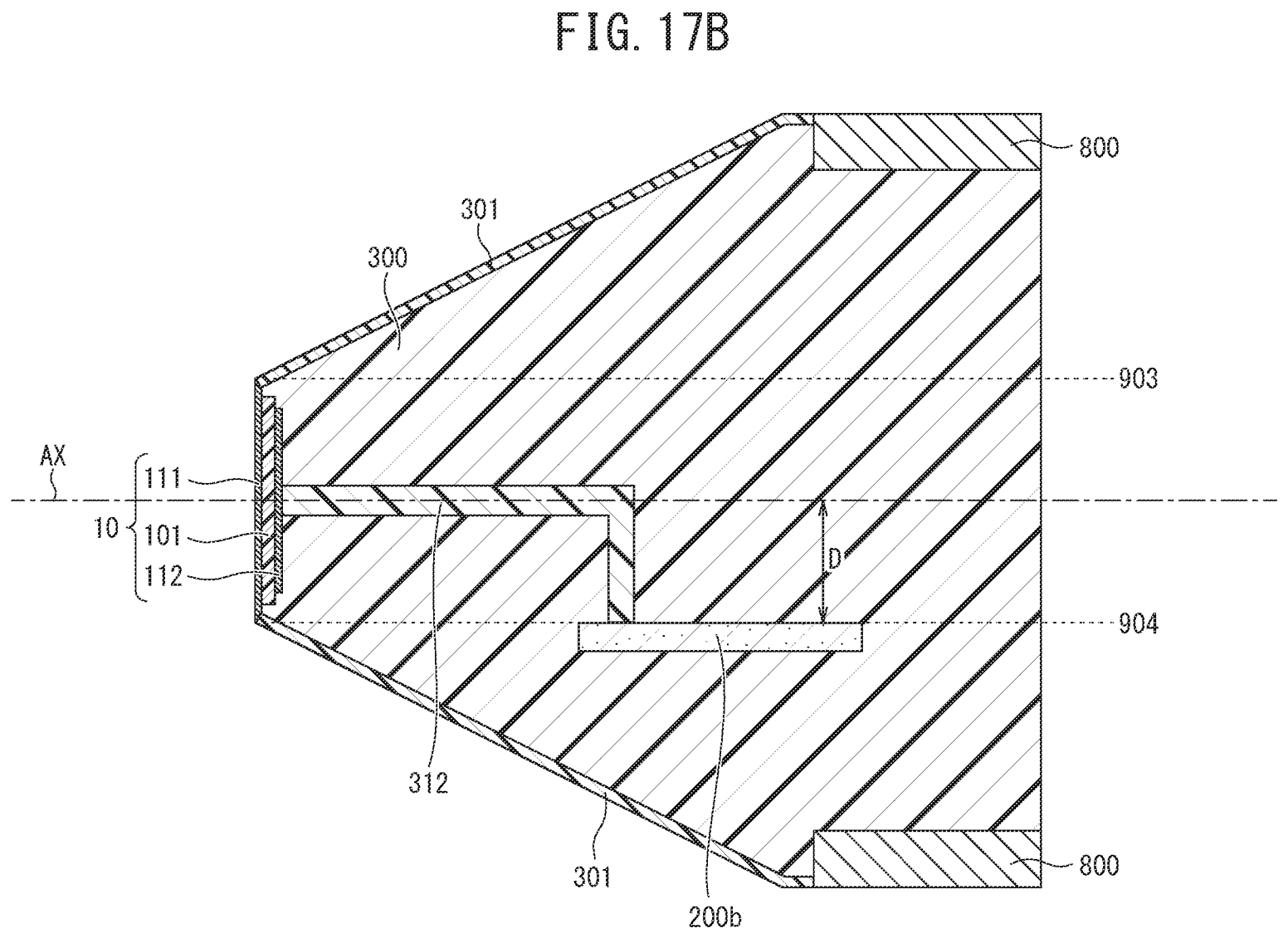

As illustrated in FIGS. 17A and 17B, an ultrasonic receiver pertaining to a second embodiment of the present invention encompasses a resin horn (300, 301) having a tapered shape in part. The resin horn (300, 301) has a sound-field detection-axis AX as a central axis, the sound-field detection-axis AX is parallel to a propagation direction of an ultrasonic wave. The ultrasonic receiver pertaining to the second embodiment further encompasses a piezoelectric element 10, which is partially exposed and provided at the tip of the resin horn (300, 301) and a stealth amplifier 200b embedded in the resin horn (300, 301). The stealth amplifier 200b is arranged at a position displaced from a behind space, onto which a shape of the piezoelectric element 10 is projected. The ultrasonic receiver pertaining to the second embodiment still further encompasses an input connection member (resin signal wiring) 312, which electrically connects between the piezoelectric element 10 and the stealth amplifier 200b. The stealth amplifier 200b is disposed in vicinity of the piezoelectric element 10, at a distance corresponding to the minimum distance $d_{opt}$, as an available distance defined by basic design scheme with Eq. (3). The stealth amplifier 200b is provided to amplify electric signals generated by electro-acoustic conversion in the piezoelectric element 10. Furthermore, the stealth amplifier 200b is provided to avoid a reflection wave from being not entered to the piezoelectric element 10. Or alternatively, the stealth amplifier 200b is provided to avoid a wave-front from being uniformly entered to the main-face of the piezoelectric layer 101, in a configuration such that the wave-front has an angle larger than the specific level with respect to the main-face of a piezoelectric layer 101 constructing the piezoelectric element 10.

The piezoelectric element 10 has a plate-shaped piezoelectric layer 101, such as PVDF film and the like, and a first electrode plate 111 and a second electrode plate 112, sandwiching the piezoelectric layer 101 in between. The first electrode plate 111 connected to an outer surface of the piezoelectric layer 101 is connected to an input pad (grounding side) 211 provided on the main-face (top face) of the IC chip implementing the stealth amplifier 200b through a resin grounding wiring 311. The second electrode plate 112 connected to an inner surface of the piezoelectric layer 101 is connected to an input pad (signal side) 212 provided on the main-face of the IC chip implementing the stealth amplifier 200b through a resin signal wiring 312. In the stealth amplifier 200b, circuit elements building up an amplifier (preamplifier) are monolithically merged.

Also, a grounding pad 221 for receiving a grounding potential from the extraction terminal 500 illustrated in FIG. 3A, an output pad 222 for delivering signals, which are amplified by the amplifier merged on the IC chip, to the extraction terminal 500, and a power-supply pad 223 for receiving a power-supply potential from an extraction terminal are provided on the main-face of the IC chip implementing the stealth amplifier 200b, respectively. That is, although illustration is omitted, similarly to the diagram illustrated in FIG. 3A, according to the ultrasonic receiver pertaining to the second embodiment, the main body (300, 301, 800) has the extraction terminal 500 on the edge side opposite to the tip side along the axial direction. The extraction terminal 500 is the terminal connected to the observation apparatus 520 through the transmission line 510 such as coaxial cable or the like, similarly to the configuration illustrated in FIG. 3B.

In analogy with the ultrasonic receiver pertaining to the first embodiment, even according to the ultrasonic receiver pertaining to the second embodiment, a portion between the virtual line 901 extending along the axis direction from one ridge (upper ridge) on the radial direction of the piezoelectric element 10 and the virtual line 902 extending along the axis direction from the other ridge (lower ridge) on the radial direction of the piezoelectric element 10 is defined as "the behind space". As illustrated in FIG. 17B, according to the ultrasonic receiver pertaining to the second embodiment, the stealth amplifier 200b is disposed in vicinity of the piezoelectric element 10 separated by the minimum distance $d_{opt}$ from the piezoelectric element 10, at a site dislocated from the behind space. As explained in the ultrasonic receiver pertaining to the first embodiment, the minimum distance $d_{opt}$ between the piezoelectric element 10 and the stealth amplifier 200b is set to the optimal value by considering the input stray-capacitance $C_{stray}$ of the input connection member (resin signal wiring) 312 electrically connecting between the piezoelectric element 10 and the stealth amplifier 200b. According to the ultrasonic receiver pertaining to the first embodiment, since the stealth amplifier 200a has been disposed in the behind space, the stealth amplifier 200a has received the transmission wave penetrating through the piezoelectric element 10. On the contrary, according to the ultrasonic receiver pertaining to the second embodiment, since the stealth amplifier 200b is arranged at a position that will not be exposed to the transmission wave, CMSI angle θ of the stealth amplifier 200b is not required to be 30 degrees or more and 60 degrees or less.

Figure 1C:
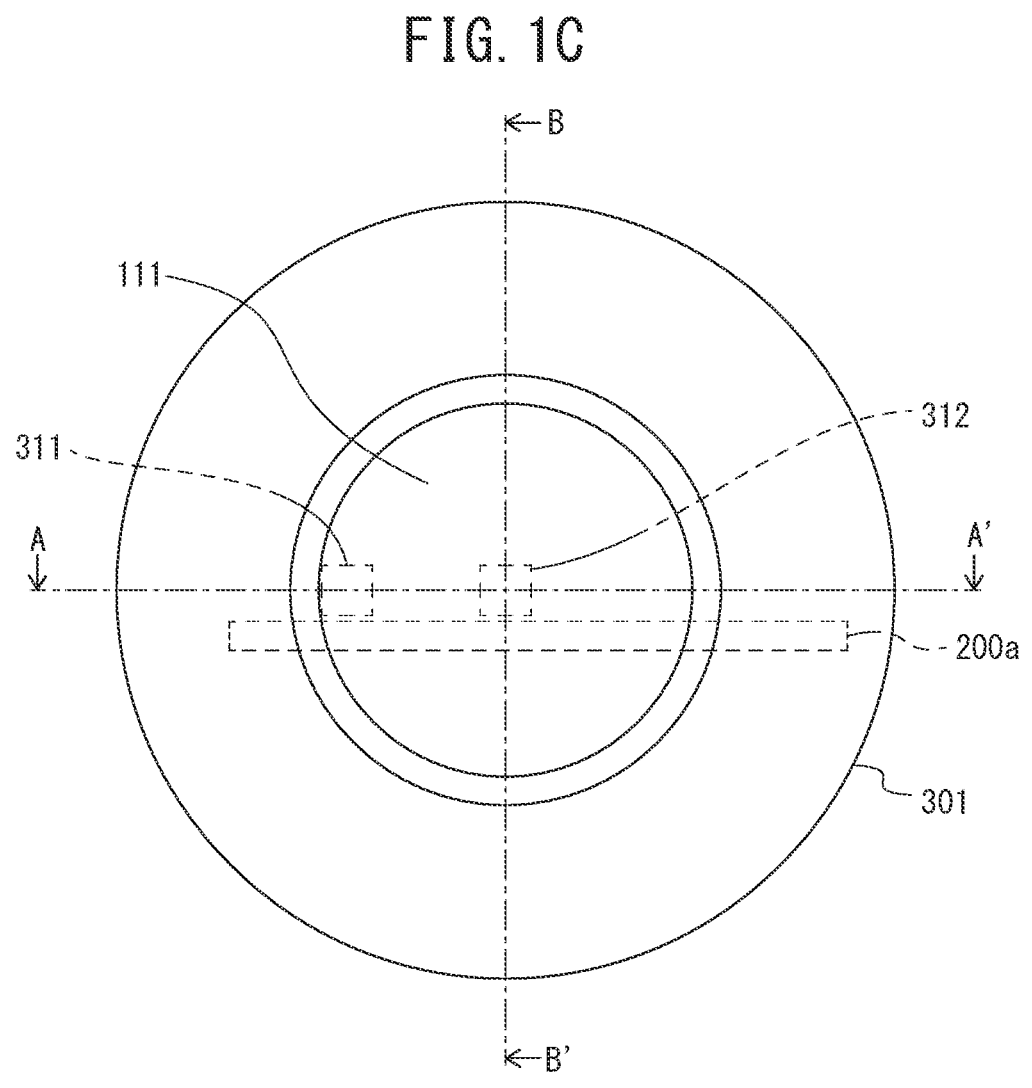

In a horizontal cross-sectional view as illustrated in FIG. 17A corresponding to the cross-sectional view taken from an A-A' direction in FIG. 1C, at first glance, the main-face of the stealth amplifier 200b appears to reside in the behind space assigned to the piezoelectric element 10 and exposed to a transmission wave penetrating through the piezoelectric element 10. However, when the main-face is taken on a vertical cross-sectional view in FIG. 17B, corresponding to the cross-sectional view taken from B-B' direction in FIG. 1C, the main-face of the stealth amplifier 200b exists in a regime out of the behind space assigned to the piezoelectric element 10, and the main-face of the stealth amplifier 200b is not exposed to the transmission wave penetrating through the piezoelectric element 10. In other words, when the main-face is taken on the vertical cross-sectional view in FIG. 17B, the stealth amplifier 200*b* is arranged at a position that is displaced by offset amount D, which is a specific constant distance in the radial direction from the sound-field detection-axis AX as the central axis, so as not to receive as little the transmission wave from the piezoelectric element 10 as possible. For example, if a standard position of the stealth amplifier 200*b* is supposed to be located on the sound-field detection-axis AX, the offset amount D may be set to a half or more of the size, along the radial direction of the piezoelectric element 10, with respect to the standard position.

In other words, according to the ultrasonic receiver pertaining to the second embodiment, the stealth amplifier 200*b* is arranged at a position at which the stealth amplifier 200*b* does not overlap with the piezoelectric element 10, when the ultrasonic receiver is viewed along the sound-field detection-axis AX from the tip side along the axial direction. The arrangement can suppress the generation of the reflection wave contributing as the unnecessary echo. Moreover, the stealth amplifier 200*b* is arranged at the position that is displace by the offset amount D along the radial direction from the sound-field detection-axis AX as the central axis. Thus, even if the reflection wave is generated by the stealth amplifier 200*b*, since the wave-front of the reflection wave is made to have an angle of a certain level or more on the main-face of the piezoelectric layer 101, which implements the piezoelectric element 10, the wave-front of the reflection wave can be designed not to be uniformly entered to the main-face of the piezoelectric layer 101. Since the wave-front of the reflection wave is designed not to uniformly enter to the piezoelectric element 10, the electromotive force generated by the piezoelectric electro-acoustic conversion in a portion of the piezoelectric layer 101, exposed to positive sound pressures, is canceled by another portion of the piezoelectric layer 101, exposed to negative sound pressures, so that the electromotive force can be decreased to a small value.

Although illustration is omitted, by encompassing the main body (300, 301, 800) of the ultrasonic receiver whose right side is made thick in the stepped structure of, for example, two stages, the extraction terminal provided on the other end side of the main body (300, 301, 800), a transmission line connected to the extraction terminal, and an observation device connected through the transmission line, the ultrasonic-observation device pertaining to the second embodiment can be constructed. In the ultrasonic-observation device pertaining to the second embodiment, even if the transmission line has an external stray-capacitance $C_{ext}$ that is more than 50 times larger than the signal-source capacitance $C_{signal}$ inherent in the piezoelectric element 10 such as coaxial cable, for example, a value of the external stray-capacitance $C_{ext}$ 10 pF, the minimum distance $d_{opt}$ can be set in such a way that the input stray-capacitance $C_{stray}$ becomes a value smaller than $\frac{1}{10}$ of the external stray-capacitance $C_{ext}$. When 50 times the signal-source capacitance $C_{signal}$ is assumed to be the external stray-capacitance $C_{ext} \approx 10$ pF, reversely, the signal-source capacitance $C_{signal}$ becomes 0.2 pF. When the external stray-capacitance $C_{ext} \approx 10$ pF is considered fixedly, 100 times the signal-source capacitance $C_{signal}$ means the signal-source capacitance $C_{signal} = 0.1$ pF, and 1000 times means the signal-source capacitance $C_{signal} = 0.01$ pF. By setting the minimum distance $d_{opt}$ short so that the input stray-capacitance $C_{stray}$ becomes a value smaller than $\frac{1}{10}$ of the external stray-capacitance $C_{ext}$, S/N ratio of the ultrasonic receiver and ultrasonic-observation device pertaining to the second embodiment can be improved. For example, the input stray-capacitance $C_{stray}$ shall be made to values of $C_{ext}/20$, $C_{ext}/50$, or even $C_{ext}/100$ or the less, depending on the values of signal-source capacitance $C_{signal}$.

By the way, the main body (300, 301, 800) embraces a resin horn (300, 301) and a resin cylindrical portion being continuous to the thick diameter side of the resin horn (300, 301), a right side of the resin cylindrical portion is made further thick in a two-stage stepped structure. In the resin cylindrical portion establishing the two-stage stepped structure, since the diameter of the cylinder can be made thick, it is relatively easy to set the value of an output stray-capacitance $C_{out}$, which is parasitic in an output interconnection 437 electrically connecting between the stealth amplifier 200*b* and the extraction terminal 500, to a lower value. Also, by shortening a distance between the stealth amplifier 200*b* and the extraction terminal 500, the value of the output stray-capacitance $C_{out}$ of the ultrasonic receiver pertaining to the second embodiment can be reduced to a smaller value. Moreover, if the output voltage of the piezoelectric element 10 can be amplified to a sufficiently high voltage by the stealth amplifier 200*b*, the disadvantageous effect caused by the contribution of the output stray-capacitance Cot can be ignored.

Just like the ultrasonic receiver pertaining to the first embodiment, the insulating epoxy resin 300 for fixing a positional relation between the piezoelectric element 10 and the stealth amplifier 200*b* is covered by a metallic cylindrical sheath 800. The cylindrical sheath 800 is not arranged at a tip of the ultrasonic receiver at which the piezoelectric element 10 is embedded and its vicinity. According to the ultrasonic receiver and ultrasonic-observation device pertaining to the second embodiment, even in the structure in which the piezoelectric element 10 and the stealth amplifier 200*b* are compactly embedded in the main body (300, 301, 800), the problem of the reflection wave contributing to unnecessary echo from the stealth amplifier 200*b* can be improved. Hence, S/N ratio as well as the received-voltage sensitivity can be improved.

Figure 18A:
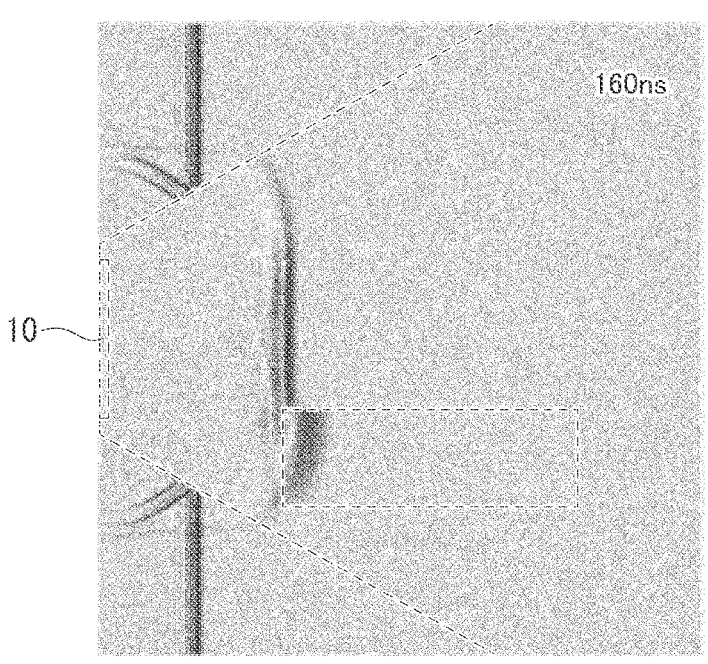
FIG. 18A is a view illustrating a leading wave-front of reflection wave reflected by an IC chip at an instant of 160 ns, when a transmission wave arrives to a side-face of the IC chip, under a configuration with CSMI angle θ=90 degrees, and with offset amount D=0.3 mm.
Figure 18B:
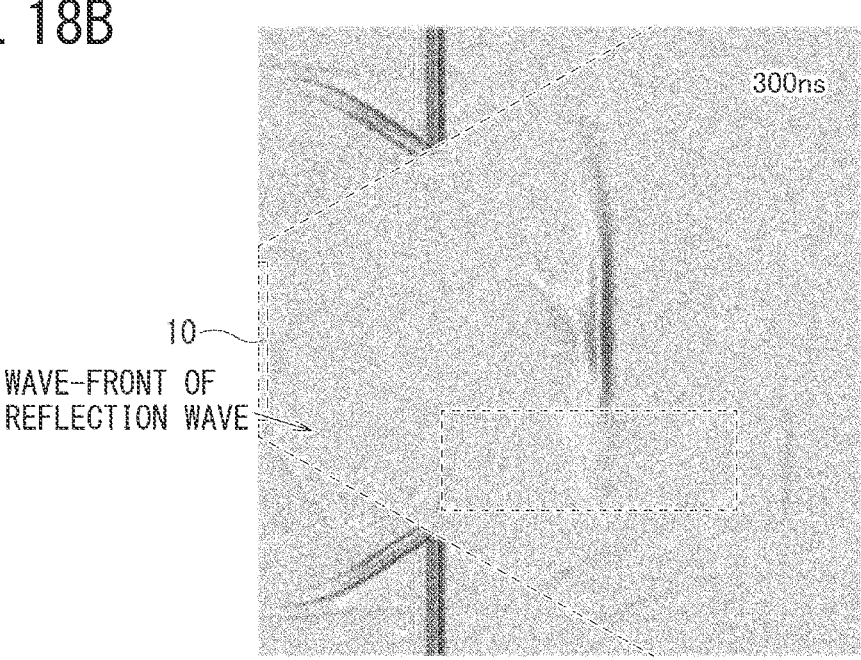
FIG. 18B is a diagram illustrating the leading wave-front of the reflection wave reflected by the IC chip at an elapse time of 300 ns after the ultrasonic wave arrives at a piezoelectric element, as an intensity of a sound pressure.
Figure 19A:
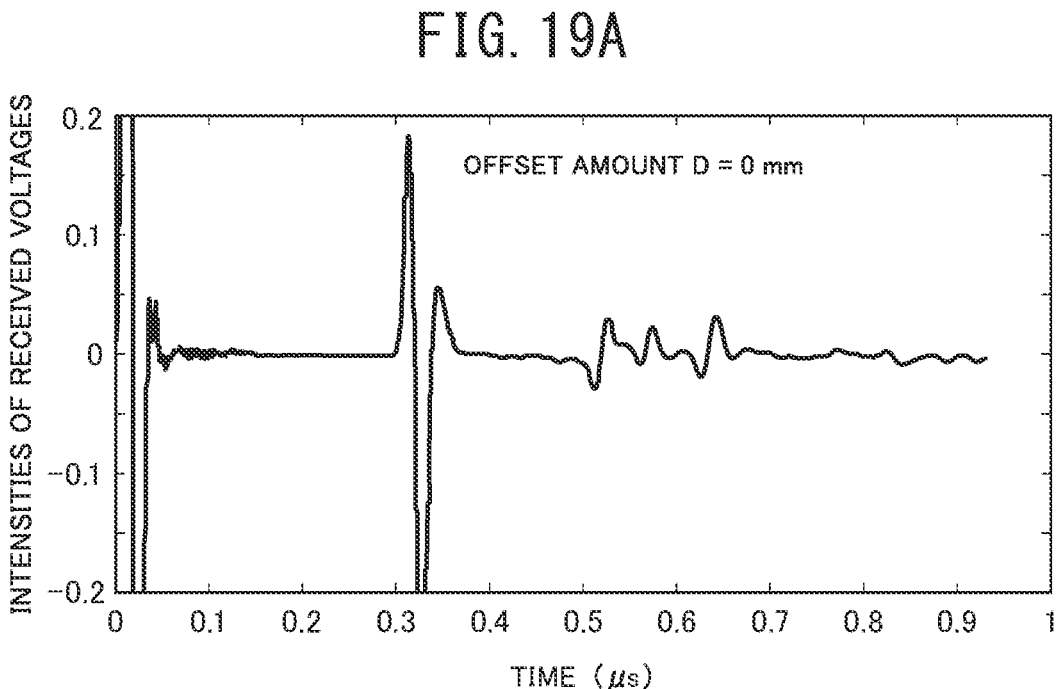
FIG. 19A illustrates a curve representing a time-dependent variation of intensities of a reflection wave in the ultrasonic receiver pertaining to the second embodiment for offset amount D=0 mm.
Figure 19B:
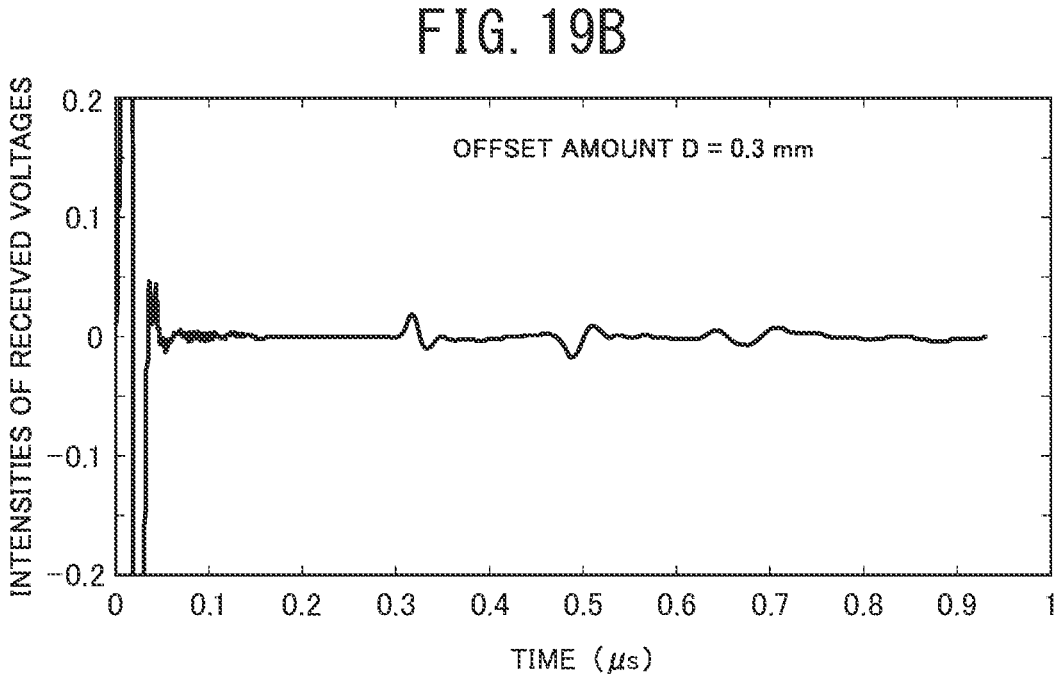
FIG. 19B illustrates a curve representing the time-dependent variation of intensities of the reflection wave in the ultrasonic receiver pertaining to the second embodiment for offset amount D=0.3 mm.

For example, with an offset amount D=0.3 mm, profiles of sound pressure-intensities of ultrasonic waves are observed as illustrated in FIGS. 18A and 18B according to the ultrasonic receiver pertaining to the second embodiment. FIGS. 18A and 18B corresponds to the case of CMSI angle θ=90 degrees, which has been explained in the ultrasonic receiver pertaining to the first embodiment. However, as illustrated in FIG. 18A, at a time of 160 ns, the transmission wave arrives to the edge of the top face of the IC chip 200 in the end of the behind space. After that, at a time of 300 ns, as illustrated in FIG. 18B, the transmission wave arrives to the vicinity of the center of one main-face (top face) of the IC chip 200. On the other hand, the wave-front of the reflection wave reflected by the edge of the top face of the IC chip 200 is known to arrive in vicinity of the piezoelectric element 10. FIG. 19B illustrates a curve representing intensity-variation of the received voltage in the piezoelectric element 10 for offset amount D=0.3 mm, in configurations illustrated in FIGS. 18A and 18B. Also, FIG. 19A illustrates the curve representing intensity-variation of the received voltage in the piezoelectric element 10 for offset amount D=0, for the sake of comparison.

Figure 20:
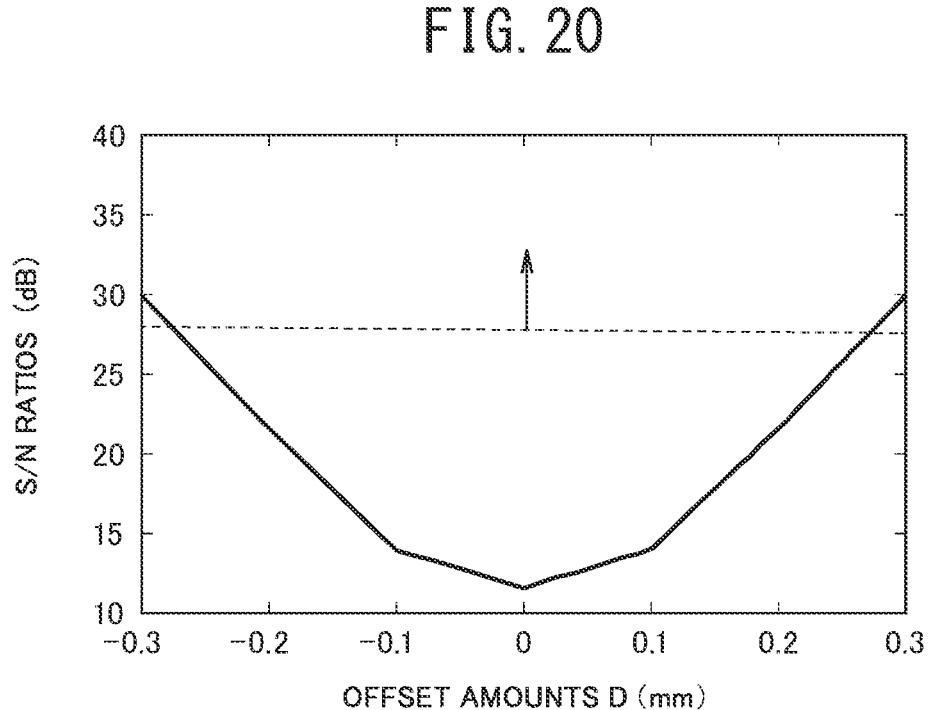
FIG. 20 is a diagram illustrating relationships between the offset amounts D of the IC chips and S/N ratios in the ultrasonic receiver pertaining to the second embodiment.

Moreover, although illustration is omitted, verification and validations in manners like those illustrated in FIGS. 18A-18B and 19A-19B are performed on the other offset amounts D. As a result, the relationship illustrated in FIG. 20 can be obtained as the relationship between the offset amount D of the stealth amplifier 200*b* and S/N ratio. According to the result of FIG. 20, it is known that the aimed values of 28 dB or more in S/N ratio can be obtained in the range in which the offset amounts D are 0.27 mm or more. As mentioned above, according to the ultrasonic receiver and ultrasonic-observation device pertaining to the second embodiment, a compact structure in which the piezoelectric element 10 and the stealth amplifier 200b are embedded and fixed in the resin horn (300, 301) is achieved, which can provide the ultrasonic receiver and the ultrasonic-observation device that are high in sensitivity and high in S/N ratio. Especially, PVDF film that has the excellent acoustic imped-ance matching with water can be used for the piezoelectric element 10. Thus, even if PVDF film is used, the input stray-capacitance $C_{stray}$ can be made small. Owing to the smaller input stray-capacitance $C_{stray}$, the ultrasonic receiver and the ultrasonic-observation device that are high in sen-sitivity and high in S/N ratio, which can measure the minute ultrasonic waves generated by the medical ultrasonic device, can be provided by the excellent pulse-response character-istics of PVDF film.

First Variation of Second Embodiment

Figure 21A:
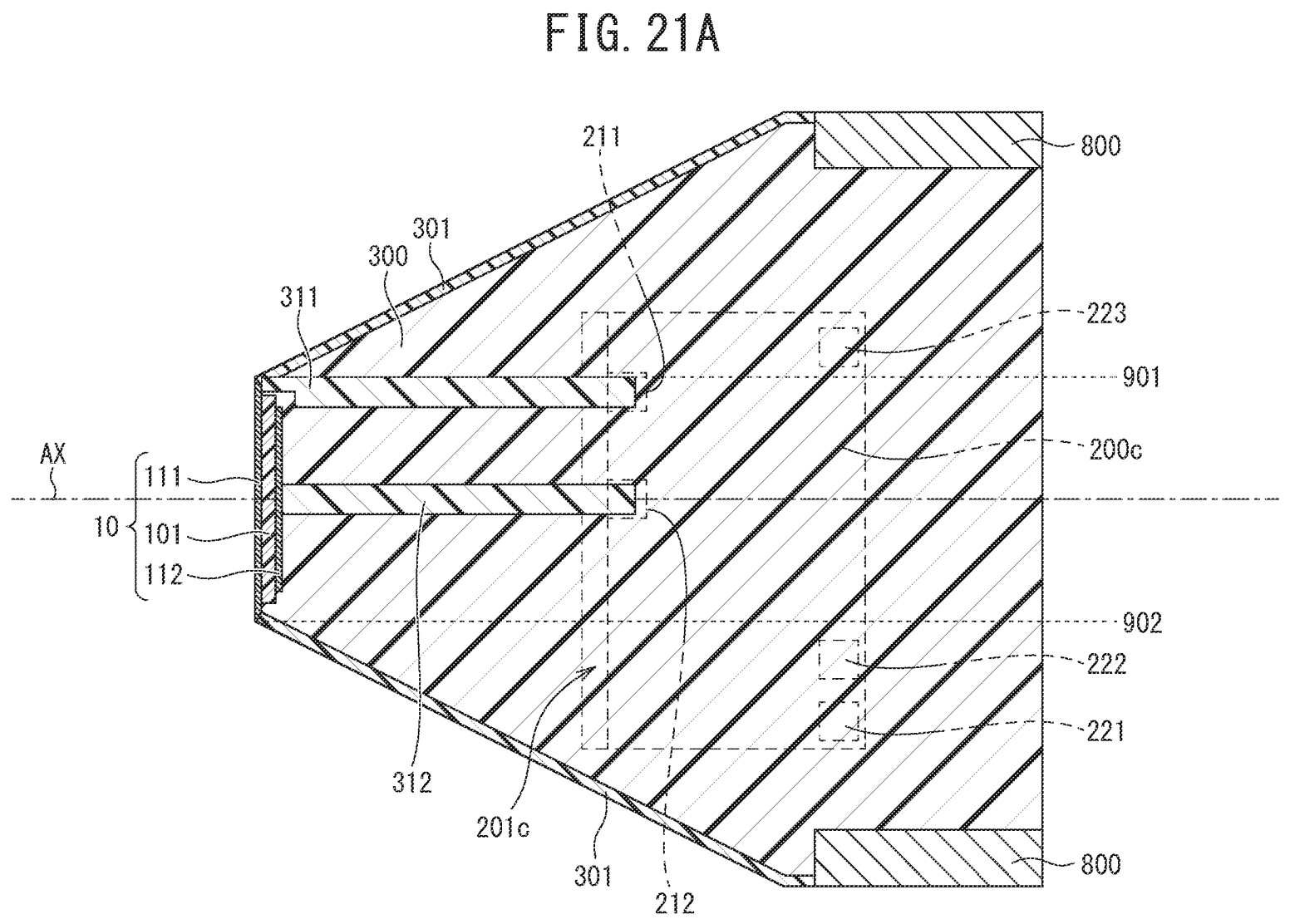
Figure 21B:
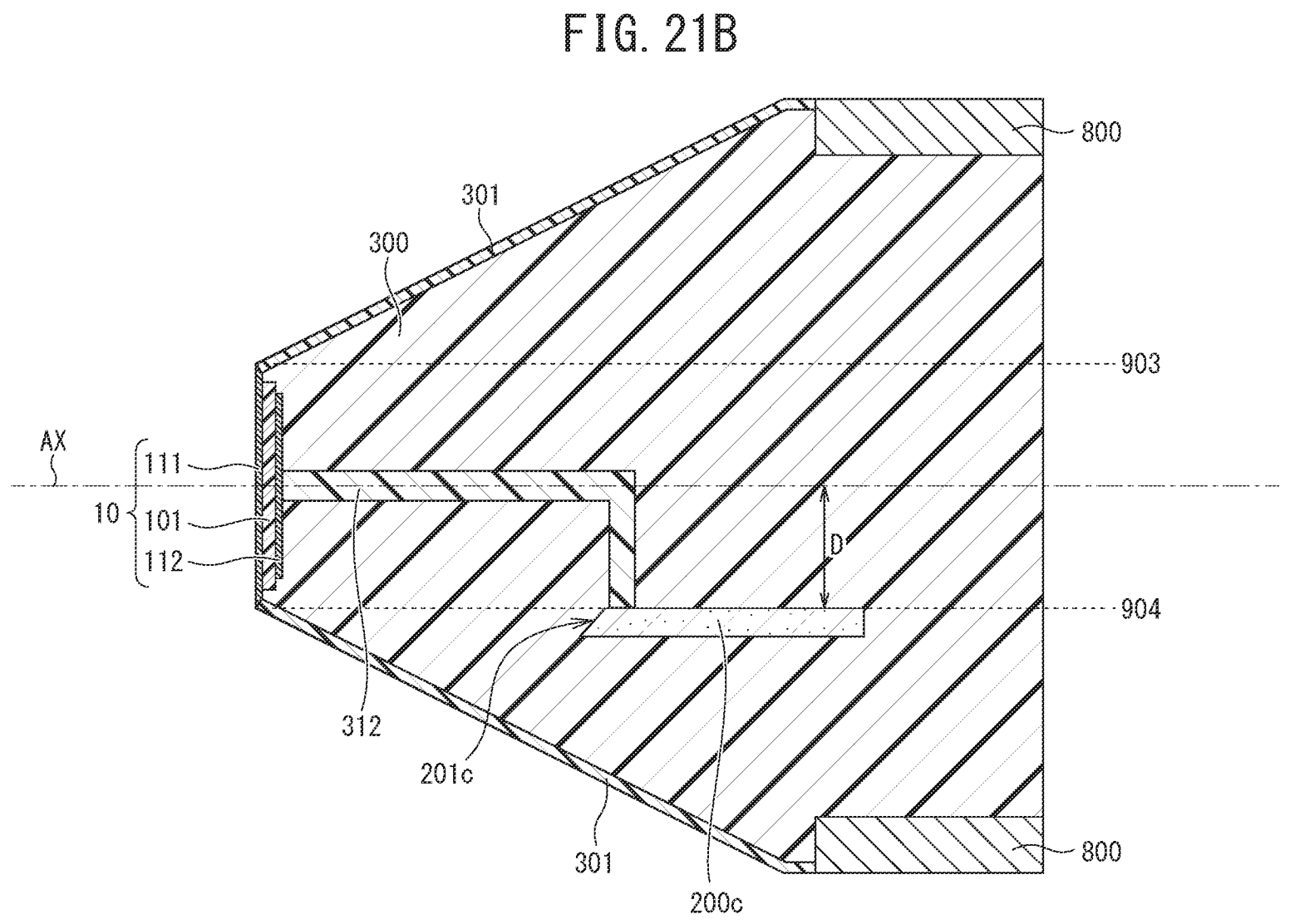

As illustrated in FIGS. 21A and 21B, an ultrasonic receiver pertaining to a first variation of the second embodi-ment of the present invention encompasses a resin horn (300, 301) having a tapered shape in part. The resin horn (300, 301) has a sound-field detection-axis AX parallel to the propagation direction of ultrasonic waves as a central axis. The ultrasonic receiver pertaining to the first variation of the second embodiment further encompasses a piezoelectric element 10, which is partially exposed and provided at a tip of the resin horn (300, 301), and a stealth amplifier 200c embedded in the resin horn (300, 301). The stealth amplifier 200c is arranged at a position displaced from a behind space, onto which a shape of the piezoelectric element 10 is projected, as illustrated in FIGS. 21A and 21B. The ultra-sonic receiver pertaining to the first variation of the second embodiment still further encompasses an input connection member (resin signal wiring) 312 electrically connecting between the piezoelectric element 10 and the stealth ampli-fier 200c, as illustrated in FIGS. 21A and 21B. The stealth amplifier 200c is disposed in vicinity of the piezoelectric element 10 at the distance corresponding to the minimum distance $d_{opt}$ as an available distance defined by basic design scheme with Eq. (3). The stealth amplifier 200c is provided to amplify electric signals generated by electro-acoustic conversions in the piezoelectric element 10. And further-more, the stealth amplifier 200c is provided to avoid a reflection wave from being entered to the piezoelectric element 10, or to avoid a wave-front from uniformly enter to the piezoelectric element 10 ascribable to a configuration such that the wave-front has angles of a certain level or more with respect to the main-face of the piezoelectric layer 101, which implements the piezoelectric element 10.

Figure 15:
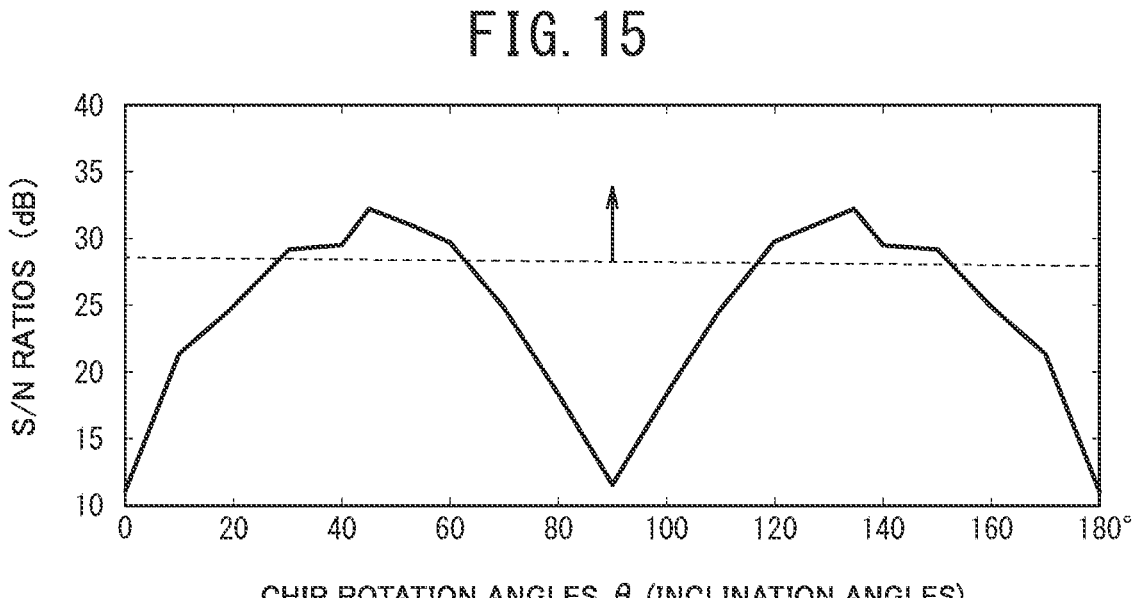
FIG. 15 is a diagram illustrating relationships between CMSI angles θ and S/N ratios.

As explained already with reference to FIG. 15, the aimed values of S/N ratio cannot be achieved in configurations that CMSI angles θ reside outside the range of 30 degrees≤θ≤60 degrees and outside the range of 120 degrees≤θ≤150 degrees. The reason why the aimed values of S/N ratio cannot be achieved lies in the influences of the other faces than the target main-face, namely, one of the quadruple side-faces or the other main-face of the IC chip 200b, which exhibits a shape of cube. According to the ultrasonic receiver pertaining to the first variation of the second embodiment, as illustrated in FIGS. 21A and 21B, an improved technical advantage in S/N ratio in all angles, except for a case in which CMSI angle θ is 0 degree or 180 degrees, can be achieved by beveling a specific side-face (hereafter, referred in as "the closest side-face 201c"), in a configuration that the stealth amplifier 200c is offset-arranged. The closest side-face 201c is the specific side-face located at a closest position to the piezoelectric element 10 among quadruple side-faces of the IC chip, which implements the stealth amplifier 200c, and the closest side-face 201c has a longi-tudinal latus in parallel direction of the plane of the first electrode plate 111.

In a horizontal cross-sectional view illustrated in FIG. 21A corresponding to the cross-sectional view taken from the A-A direction in FIG. 1C, at first glance, the stealth amplifier 200c may appear to reside in the behind space assigned to the piezoelectric element 10 and exposed to a transmission wave penetrating through the piezoelectric element 10. However, in the first variation of the second embodiment, as can be made clear from a vertical cross-sectional view in FIG. 21B orthogonal to FIG. 21A, the stealth amplifier 200c is displaced by offset amount D so as to be located at a site dislocated from the behind space. Moreover, the closest side-face 201c of the IC chip imple-menting the stealth amplifier 200c is beveled by a predeter-mined beveling angle φ with respect to the main-face of the IC chip. For example, in a case that the main-face of the IC chip is (100) plane, because a crystallographic angle mea-sured in an acute direction between (100) plane and (111) plane is 55 degrees, with beveling angle φ=55 degrees, the closest side-face 201c can be easily cut as a crystallographic cleavage plane.

The beveling angle φ is not limited to 55 degrees. For example, the beveling angle φ may be different angles, such as 45 degrees and the like. However, 30 degrees≤φ≤60 degrees is preferable. When the taper angle Φ of the closest side-face 201c is defined with respect to the direction of the tangent plane of the wave-fronts of the ultrasonic waves arriving at the stealth amplifier 200c, namely, the direction of the main-face of the first electrode plate 111, under a configuration of CMSI angle θ=90 degrees assigned to the IC chip implementing the stealth amplifier 200c, the taper angle Φ is defined as a complementary angle of the beveling angle φ, as represented by following Eq. (6):

$$\Phi = 90 - \phi \qquad (6).$$

Stated differently, for CMSI angle θ=90 degrees assigned to the IC chip implementing the stealth amplifier 200c, 30 degrees≤Φ≤60 degrees is preferable. That is, under a con-figuration having CMSI angle θ illustrated in FIGS. 21A and 21B, the closest side-face 201c of the IC chip implementing the stealth amplifier 200c is set to have taper angles Φ in a range spanning 30 to 60 degrees, with respect to the tangent planes of the wave-fronts of the ultrasonic waves arriving at the stealth amplifier 200c, according to the ultrasonic receiver pertaining to the first variation of the second embodiment.

Figure 22A:
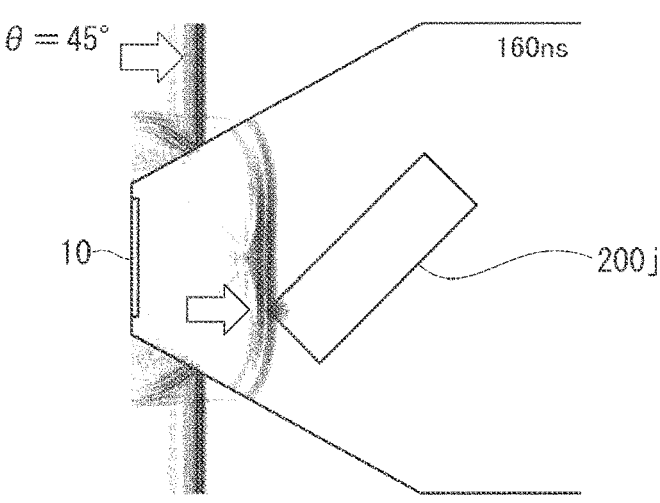
FIG. 22A is a view illustrating a leading wave-front of transmission wave at an instant of 160 ns, which is the instant when the transmission wave arrives to the front site of the edge of IC chip, represented by gray values corresponding to intensity-variation of the sound pressures, with CSMI angle θ=45 degrees for the IC chip having vertical side-faces, for explaining the first variation of the second embodiment.
Figure 22B:
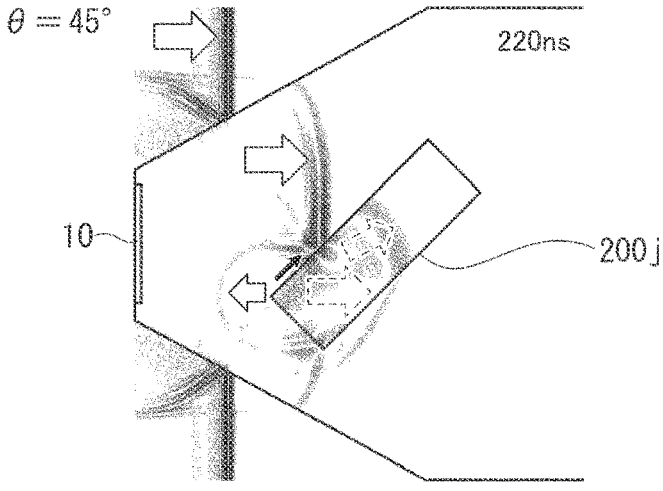
FIG. 22B is a view illustrating leading wave-fronts of the transmission wave traveling from a ridge of the IC chip toward the direction of a center of main-face a reflection wave reflected by a ridge of the IC chip, at timing of 220 ns, the leading wave-fronts are represented by gray values corresponding to intensity-variation of the sound pressures, following the situation illustrated in FIG. 22A, for CSMI angle θ=45 degrees assigned to the IC chip having vertical side-faces, for explaining the first variation of the second embodiment.

FIG. 22A illustrates an illustrative situation that a normal shaped IC chip 200j with beveling angle φ=90 degrees—without beveling—is used. In illustrative situation illustrated in FIG. 22A, CSMI angle θ=45 degrees is assumed, and a transmission wave arrives to an edge, at which a main-face of the normal shaped IC chip 200j and a closest side-face intersect at 90 degrees, at a time of 160 ns. After that, at a time of 220 ns, as illustrated in FIG. 22B, the transmission wave moves along the inclination of the main-face and arrives to a position slightly in front of the center of the main-face of the normal shaped IC chip 200j inclined at CMSI angle θ=45 degrees. However, at the time of 220 ns, there are mixtures of a reflection wave from the main-face, a wave passing through the normal shaped IC chip 200*j* to propagate forward. Moreover, FIG. 22B illustrates a situation that at the time of 220 ns, a reflection wave having curved-wavefront reflected from a region disposed in vicinity of the edge, at which the closest side-face and the main-face intersect in the normal shaped IC chip 200*j*, begins propagating back toward a vicinity of the piezoelectric element 10.

Figure 22C:
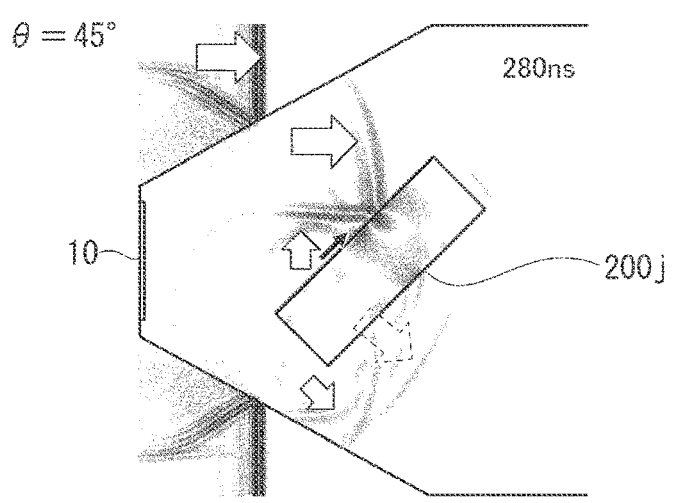
FIG. 22C is a view illustrating leading wave-fronts of the transmission wave transmission wave penetrating through the IC chip and the reflection wave reflected by the main-face of the IC chip, at timing of 280 ns at which the transmission wave travels from the center of the IC chip toward the end latus on the opposite main-face (bottom main-face), respectively, the leading wave-fronts are represented by gray values corresponding to intensity-variation of the sound pressures, following the situation illustrated in FIG. 22B, for CSMI angle θ=45 degrees assigned to the IC chip having vertical side-faces.
Figure 22D:
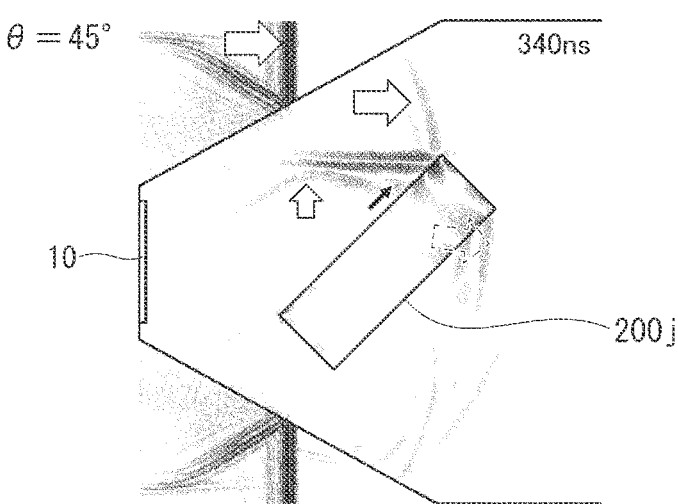
FIG. 22D is a view illustrating leading wave-fronts of transmission waves penetrating in the IC chip and the reflection wave reflected upward by the main-face of the IC chip, at timing of 340 ns at which the transmission wave arrives to the end latus on the opposite main-face of the IC chip, the leading wave-fronts are represented by gray values corresponding to intensity-variation of the sound pressures, following the situation illustrated in FIG. 22C, for CSMI angle θ=45 degrees assigned to the IC chip having vertical side-faces.
Figure 22E:
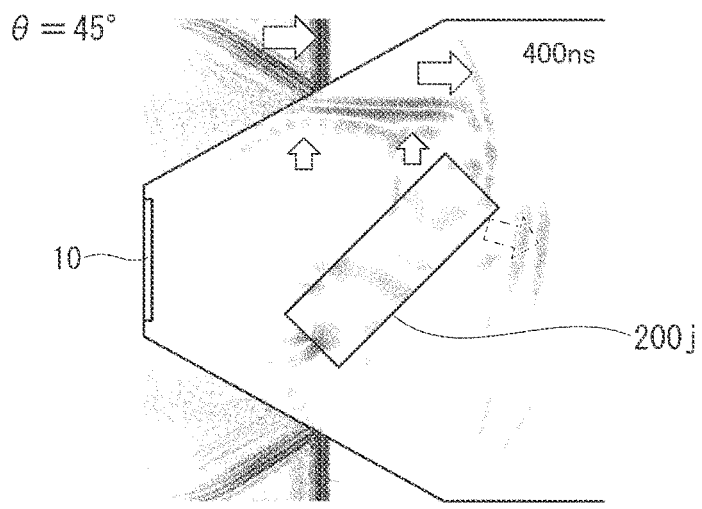
FIG. 22E is a view illustrating leading wave-fronts of transmission waves penetrating in the IC chip and the reflection wave reflected by the main-face of the IC chip, at timing of 400 ns at which the transmission wave further travels beyond a site at the end latus on the opposite main-face of the IC chip, represented by gray values corresponding to intensity-variation of the sound pressures, following the situation illustrated in FIG. 22D, for CSMI angle θ=45 degrees assigned to the IC chip having vertical side-faces.

FIG. 22C illustrates a situation at a time of 280 ns in which, the transmission wave moves along the inclination of the main-face and arrives to a position beyond a center of the main-face of the normal shaped IC chip 200*j* inclined at CMSI angle θ=45 degrees. At a time of 280 ns, there are mixtures of a reflection wave from the main-face toward a direction orthogonal to the transmission wave, the original transmission wave and the like, and further, the wave passing through the normal shaped IC chip 200*j* to propagate forward is also mixed. Moreover, at a time of 340 ns illustrated in FIG. 22D, the transmission wave moves along the inclination of the main-face and arrives to a position of an opposite edge of the main-face. Also, at the time of 340 ns, there are mixtures of a reflection wave from the main-face toward the direction orthogonal to the transmission wave, the original transmission wave and further, the wave passing through the normal shaped IC chip 200*j* to propagate forward is also mixed. Moreover, at a time of 400 ns illustrated in FIG. 22D, the transmission wave arrives to a position beyond the opposite edge of the main-face and wraps around to a bottom main-face through a side-face opposite to the closest side-face. Also, at the time of 400 ns, there are mixtures of a reflection wave from the main-face toward the direction orthogonal to the transmission wave, the original transmission wave and further, the wave passing through the normal shaped IC chip 200*j* to propagate forward is also mixed.

As can be understood from FIGS. 22A to 22E, under the condition that the normal shaped IC chip 200*j* without beveling is used, the ultrasonic wave is firstly hit to an edge at which the main-face of the normal shaped IC chip 200*j* and the closest side-face intersect at 90 degrees, and a reflection wave having curved-wavefront is emitted from the edge as emission center. And, each of the ultrasonic waves reflected sequentially by the main-face of the normal shaped IC chip 200*j*, the main-face exhibits an inclined plane, generates reflected wave-front respectively, in association with the trajectory of the transmission waves penetrating through the piezoelectric element 10. For CMSI angle θ=45 degrees as illustrated in FIGS. 22A to 22E, the reflection wave-fronts propagated in directions orthogonal to the transmission waves penetrating through the piezoelectric element 10 are generated, which has no bad influence on the piezoelectric element 10. Then, even in the case that the normal shaped IC chip 200*j* without beveling is used, CMSI angle θ can be controlled so that the reflection wave-fronts from the inclined plane provided by the main-face of the normal shaped IC chip 200*j* has no bad influence on the piezoelectric element 10.

However, it is known that the reflection waves having curved-wavefronts emitted from the edge, at which the closest side-face and the main-face intersect in the normal shaped IC chip 200*j*, can not to be avoided, even by controlling CMSI angle θ. According to the ultrasonic receiver pertaining to the first variation of the second embodiment, the beveling angle φ of the IC chip employed in the stealth amplifier 200*c* is set to 30 degrees≤θ≤60 degrees, and the stealth amplifier 200*c* is displaced at the offset position. Thus, the bad influence of the reflection wave having curved-wavefront from the edge, at which the closest side-face and the main-face intersect in the normal shaped IC chip 200*j*, on the piezoelectric element 10 can be avoided.

In the ultrasonic receiver pertaining to the first variation of the second embodiment, the main-face of the stealth amplifier 200*c* that is exposed to the transmission wave penetrating through the piezoelectric element 10 is a first main-face—top face—or a second surface—bottom face— of the stealth amplifier 200*c*. On the vertical cross-sectional view in FIG. 21B, CMSI angle θ defined for the first or second main-face is set to 90 degrees. Also, in a configuration that the stealth amplifier 200*c* is viewed on the vertical cross-sectional view in FIG. 21B, the stealth amplifier 200*c* is displaced by offset amount D that is more than half the size in the radial direction of the piezoelectric element 10, in the radial direction from the sound-field detection-axis AX as the central axis, in such a way that the stealth amplifier 200*c* does not exist in the behind space assigned to the piezoelectric element 10.

Then, the stealth amplifier 200*c* of the ultrasonic receiver pertaining to the first variation of the second embodiment is arranged at a position at which the stealth amplifier 200*c* does not overlap with the piezoelectric element 10, when the ultrasonic receiver is viewed from the tip side along the axial direction. By setting the beveling angle φ of the IC chip employed in the stealth amplifier 200*c* to an orientation of 30 degrees≤θ≤60 degrees, and further arranging the stealth amplifier 200*c* at a position at which the stealth amplifier 200*c* is displace by the offset amount D from the sound-field detection-axis AX, the generation of the reflection wave contributing as the unnecessary echo can be suppressed. Moreover, according to the ultrasonic receiver pertaining to the first variation of the second embodiment, even when the reflection wave having the fear of the contribution as the unnecessary echo is generated, by setting the beveling angle φ to 30 degrees≤φ≤60 degrees, the reflection wave is made to propagate in the direction in which the reflection wave is not re-entered to the piezoelectric element 10, or even if the reflection wave is entered, the reflection wave is made to propagate in the direction in which the wave-front is not uniformly entered because the wave-front has an angle with respect to the main-face of the piezoelectric layer 101, which implements the piezoelectric element 10. As a result, S/N ratio can be improved.

Figure 23A:
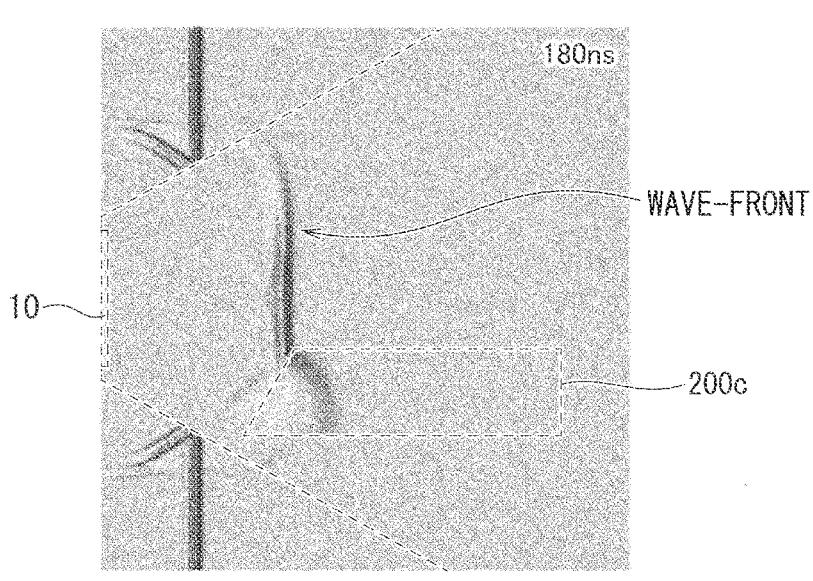
FIG. 23A is a view illustrating a leading wave-front of transmission wave at an instant of 200 ns, which is the instant when the transmission wave arrives to a vicinity of a boundary line between a main-face and a beveled side-face of the IC chip, in a configuration that the side-face is inclined at about 55 degrees with respect to the main-face as a (110) plane, with CSMI angle θ=90 degrees, and with offset amount D=0.4 mm.
Figure 23B:
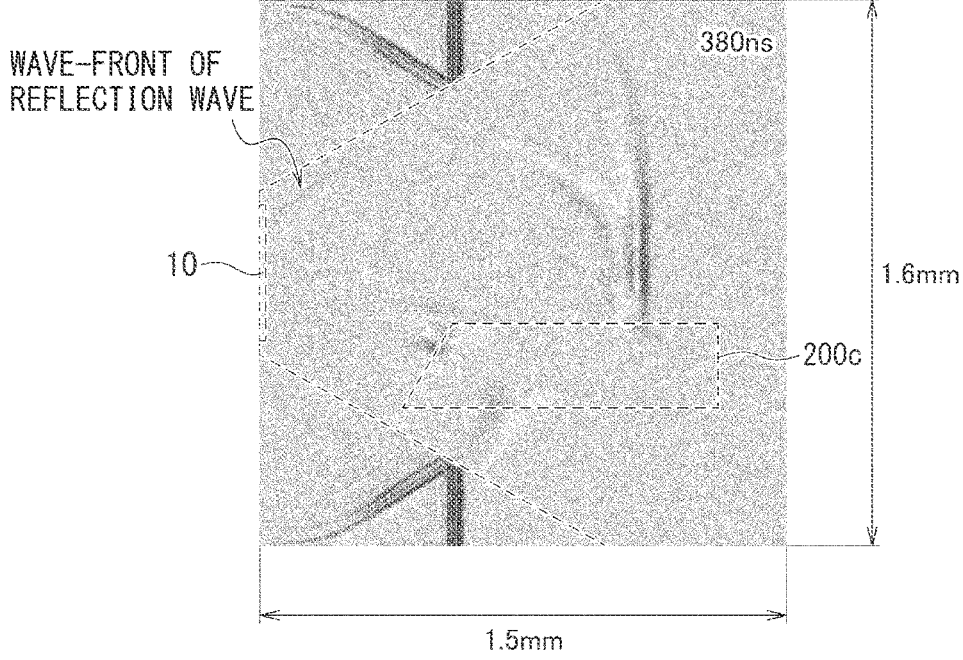
FIG. 23B is a view illustrating leading wave-fronts of reflection waves, which are reflected by the boundary line between the main-face and beveled side-face of the IC chip, and further reflected by the main-face, the leading wave-fronts are represented by gray values corresponding to intensity-variation of the sound pressures, at an elapse time of 380 ns after the ultrasonic wave arrives to the piezoelectric element, following the situation illustrated in FIG. 23A.

FIG. 23A illustrates profiles of sound pressure-intensities indicating that at a time of 180 ns, a transmission wave arrives to a beveled closest side-face, in a condition that a beveling angle φ=45 degrees of an IC chip, which is used as the stealth amplifier 200*c*, and offset amount D=+0.4 mm and CSMI angle θ=90 degrees are set to the IC chip. After that, at a time of 380 ns, as illustrated in FIG. 23B, profiles of the sound pressure-intensities are indicated in which the transmission wave moves along parallel main-faces and arrives to a position slightly deep from the center of the main-face of the stealth amplifier 200*c* at CMSI angle θ=90 degrees. At the time of 380 ns, there are mixtures of a reflection wave having curved-wavefront, the sound source of the reflection wave lies in a boundary between the closest side-face and the main-face, and the transmission wave having substantially plane wavefront moving along the parallel main-faces. Moreover, at the time of 380 ns, since the offset amount D=+0.4 mm, it is known that the reflection wave having curved-wavefront, whose sound source lies in the boundary between the closest side-face and the main-face in the stealth amplifier 200*c*, propagates toward a position that is upwardly displaced from the position of the piezoelectric element 10.

Figure 24:
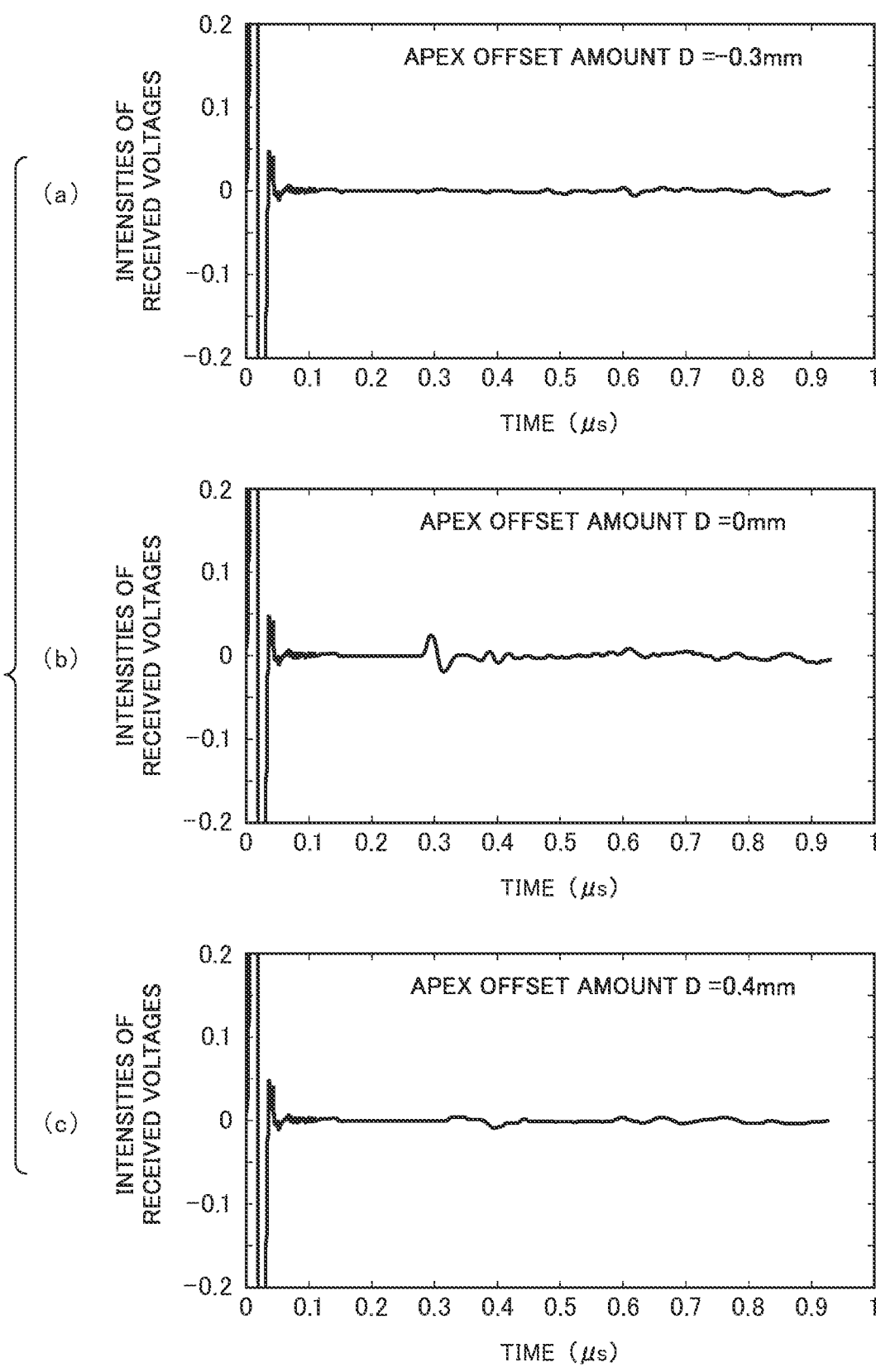
FIG. 24 illustrates a set of waveforms representing time-dependent variations of intensities of the reflection waves for triple different offset amounts, according to the ultrasonic receiver pertaining to the first variation of the second embodiment, which is implemented by an IC chip with beveling angle φ=45 degrees.
Figure 25:
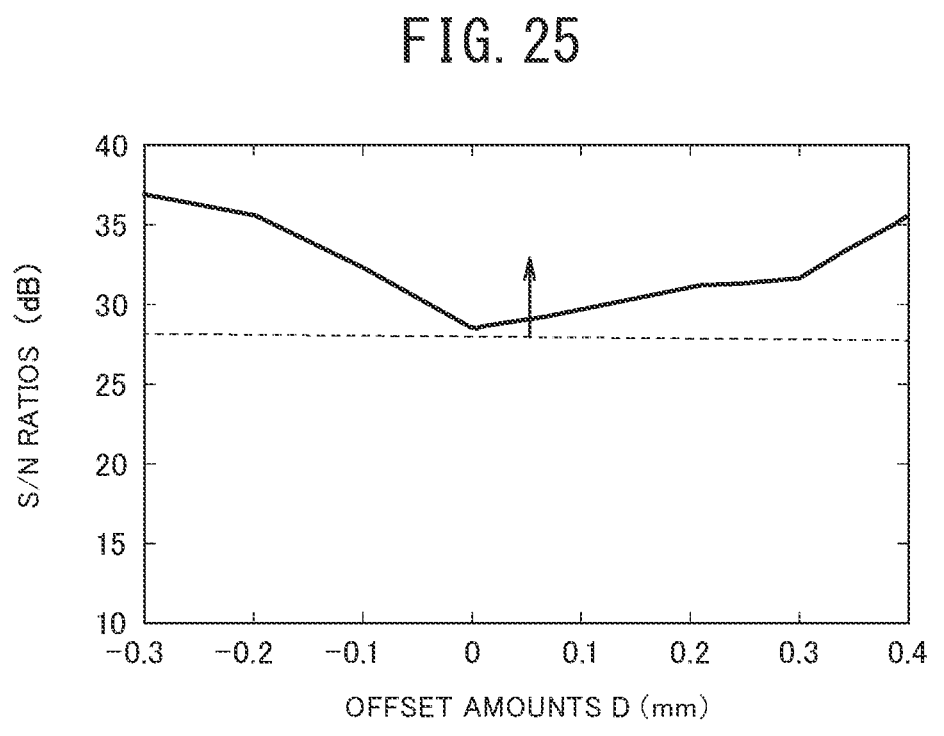

In a similar manner to FIGS. 23A and 23B, the time-dependent changes in the profiles of the sound pressure-intensities of the ultrasonic waves are observed for cases of offset amounts D=0.3 mm and 0 mm. FIG. 24 illustrates a set of the curves representing intensity-variations of the received voltages at the piezoelectric element 10 for offset amounts D=0.3 mm, 0 mm and +0.4 mm of apex portions of the IC chip used as the stealth amplifier 200c. Hereinafter, an offset amount D of the apex portion is called as "the apex offset amount D". FIG. 24 illustrates a set of three cases of the apex offset amounts D=0.3 mm, 0 mm and +0.4 mm, as representative examples. However, FIG. 25 illustrates a result when verified and validated on the other apex offset amounts D, as relationships between the apex offset amounts D and S/N ratios. FIG. 25 illustrates that the larger the apex offset amount D, an improved technical advantage in S/N ratio becomes larger. However, even for apex offset amount D=0 mm, the aimed value 28 dB or more of S/N ratio can be obtained by cutting the closest side-face 201c at the beveling angle φ=45 degrees. Then, according to the ultra-sonic receiver pertaining to the first variation of the second embodiment, by providing the apex offset amount D and beveling the closest side-face 201c, influences on S/N ratio can be minimized.

Although illustration is omitted, by encompassing a main body (300, 301, 800) of the ultrasonic receiver in which the right side is made thick in the stepped structure of, for example, two stages, an extraction terminal provided on the other end side of the main body (300, 301, 800), a transmission path connected to the extraction terminal, and an observation apparatus connected through the transmission path, an ultrasonic-observation device pertaining to the first variation of the second embodiment can be constructed. In the ultrasonic-observation device pertaining to the first variation of the second embodiment, even if the transmission path such as a coaxial cable has an external stray-capacitance $C_{ext}$ that is more than 50 times larger than the signal-source capacitance $C_{signal}$ inherent in the piezoelectric element 10, for example, a value of an external stray-capacitance $C_{ext} \approx 10$ pF may be supposed, a minimum distance $d_{opt}$ can be set to a value such that the input stray-capacitance $C_{stray}$ can be made smaller than 1/10 of the external stray-capacitance $C_{ext}$. For example, a value of about $C_{ext}/100$ can be obtained.

Additionally, because the main body (300, 301, 800) is continuous to the thick diameter side of the resin horn (300, 301) and the resin horn (300, 301) is made of the resin cylindrical portion whose right end side is made further thick in the two-stage stepped structure, by making the diameter of the resin cylindrical portion thick, the value of the output stray-capacitance $C_{out}$, which is parasitic in the output interconnection 437 electrically connecting between the stealth amplifier 200c and the extraction terminal 500, can be reduced to a lower value. Also, by shortening a distance between the stealth amplifier 200c and the extrac-tion terminal 500, the value of the output stray-capacitance $C_{out}$ of the ultrasonic receiver pertaining to the first variation of the second embodiment can be reduced to a smaller value. Moreover, if the output voltage of the piezoelectric element 10 can be amplified to a sufficiently high voltage by the stealth amplifier 200c, the disadvantageous effect caused by the contribution of the output stray-capacitance $C_{out}$ can be ignored.

As a result, a compact structure, in which the piezoelectric element 10 and the stealth amplifier 200c are embedded and fixed in the resin horn (300, 301), is achieved. And, the compact structure can provide the ultrasonic receiver and the ultrasonic-observation device having a high sensitivity and S/N ratio. Especially, even if PVDF film is used for the piezoelectric element 10, the input stray-capacitance $C_{stray}$ can be made small. Hence, the ultrasonic receiver and the ultrasonic-observation device, which are high in sensitivity and high in S/N ratio that enables the measurement of the minute ultrasonic waves and are preferable for the use in medical purpose, can be provided.

Second Variation of Second Embodiment

Figure 26:
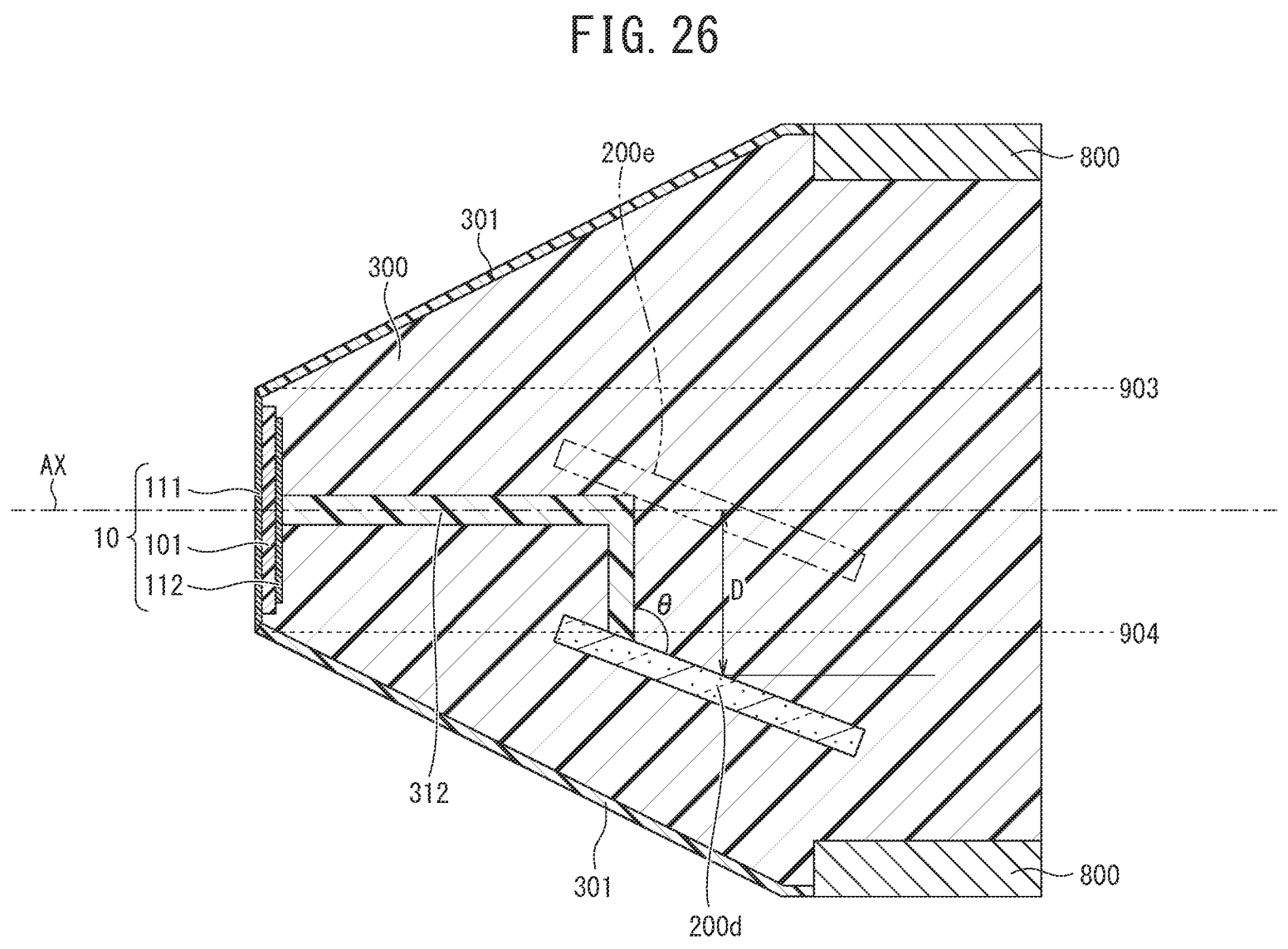

An ultrasonic receiver pertaining to a second variation of the second embodiment of the present invention encom-passes a resin horn (300, 301), which have a sound-field detection-axis AX parallel to a propagation direction of an ultrasonic wave as the central axis, having a tapered shape in part, a piezoelectric element 10, which is partially exposed and provided at the tip of the resin horn (300, 301), a stealth amplifier 200d that is arranged at a position allocated in the resin horn (300, 301) and displaced from a behind space onto which the shape of the piezoelectric element 10 is projected, and an input connection member (resin signal wiring) 312, electrically connecting between the piezoelectric element 10 and the stealth amplifier 200d, as illustrated in FIG. 26. The stealth amplifier 200d is disposed in vicinity of the piezoelectric element 10 at a distance corresponding to the minimum distance $d_{opt}$ that is determined as an available distance defined by basic design scheme with Eq. (3). The stealth amplifier 200d is provided to amplify electric signals generated by electro-acoustic conversion in the piezoelectric element 10, and avoid a reflection wave from being entered to the piezoelectric element 10, or avoid a wave-front from uniformly enter to the piezoelectric element even if the reflection wave is generated. Even if the reflection wave is generated, unless the wave-front of the reflection wave is not uniformly entered, because the wave-front of the reflection wave has the inclination on the main-face of the piezoelectric layer 101, which implements the piezoelectric element 10, the electromotive force generated by the piezoelectric electric-acoustic conversion in the piezoelectric element 10 is can-celled, and therefore, the electromotive force can be decreased to a small value.

As illustrated in FIG. 26, according to the ultrasonic receiver pertaining to the second variation of the second embodiment, a normal shaped IC chip, whose quadruple side-faces are vertical side walls, is employed as the stealth amplifier 200d. The stealth amplifier 200d of the ultrasonic receiver pertaining to the second variation of the second embodiment is arranged at a position that is displaced by apex offset amount D along the radial direction from the sound-field detection-axis AX as the central axis, so as not to receive the transmission wave penetrated from the piezo-electric element 10. Moreover, as illustrated in FIG. 26, CMSI angle θ assigned to the IC chip employed as the stealth amplifier 200d is set to 120 degrees and made larger than 90 degrees. FIGS. 27C and 27D represent changes in the sound-pressure intensity-profiles of the ultrasonic waves with regard to the stealth amplifier 200d in a case that the apex offset amount D=0.4 mm is set. Furthermore, for the sake of comparison, FIGS. 27A and 27B represent the changes in the sound-pressure intensity-profiles of the ultra-sonic waves, under the condition that the normal shaped IC chip 200e having a vertical side wall is used, under a condition that the apex offset amount D=0 mm.

Figure 27A:
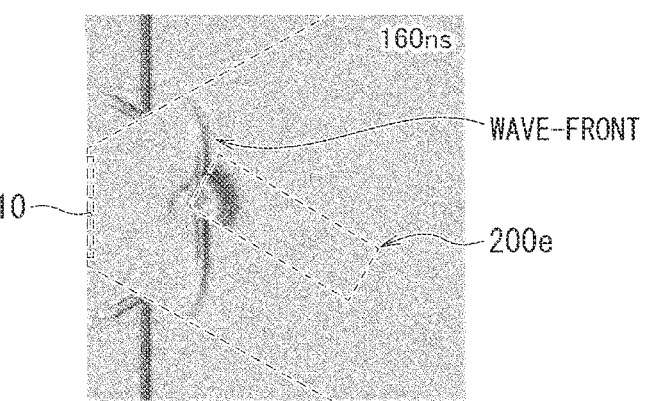
FIG. 27A illustrates an example of a leading wave-front of transmission wave at an instant of 160 ns, which is an instant when the transmission wave arrives to an end latus on a bottom main-face of the IC chip, under a configuration that the IC chip is inclined at CMSI angle θ=120 degrees and is displaced by offset amount D=0 mm, the wave-front is represented by gray values corresponding to intensity-variation of the sound pressures, using a normal shaped IC chip having vertical side-faces.
Figure 27B:
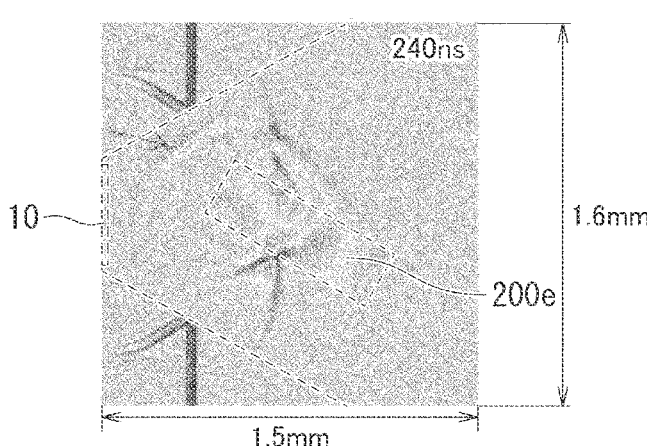
FIG. 27B illustrates a leading wave-front of reflection wave reflected by the bottom main-face of the IC chip at timing of 240 ns after the arrival at the piezoelectric element, following the situation illustrated in FIG. 27A, the wave-front is represented by gray values corresponding to intensity-variation of the sound pressures, using the normal shaped IC chip equal to FIG. 27A.
Figure 27C:
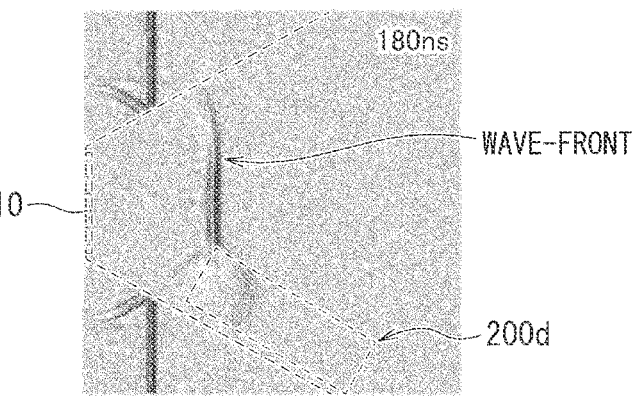
FIG. 27C illustrates a leading wave-front of transmission wave at an instant of 180 ns, which is the instant when the transmission wave arrives to a ridge at the main-face of the IC chip, for offset amount D=0.4 mm while keeping the CSMI angle θ=120 degrees, the wave-front is represented by gray values corresponding to intensity-variation of the sound pressures, using the normal IC equal to FIG. 27A.
Figure 27D:
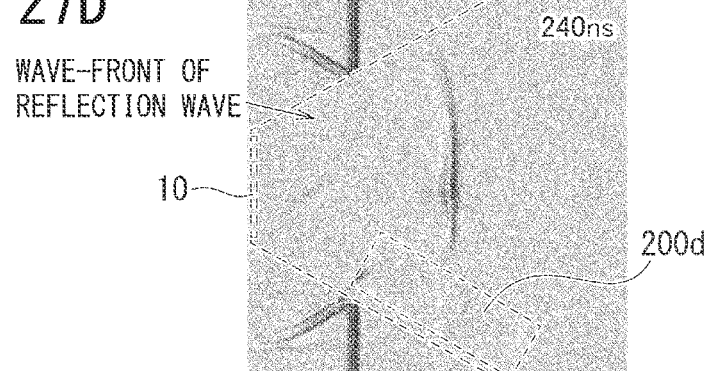
FIG. 27D is a view illustrating leading wave-fronts of the transmission wave, which envelops, traveling around behind the main-face of the IC chip, and the reflection wave reflected by a ridge at the main-face of the IC chip, at timing of 240 ns after the arrival at the piezoelectric element, following the situation illustrated in FIG. 27C, the wave-fronts are represented by gray values corresponding to intensity-variation of the sound pressures, using the normal shaped IC chip equal to FIG. 27A.

As illustrated in FIG. 27A, under the conditions that the normal shaped IC chip 200e is used, and that the IC chip

Figure 28:
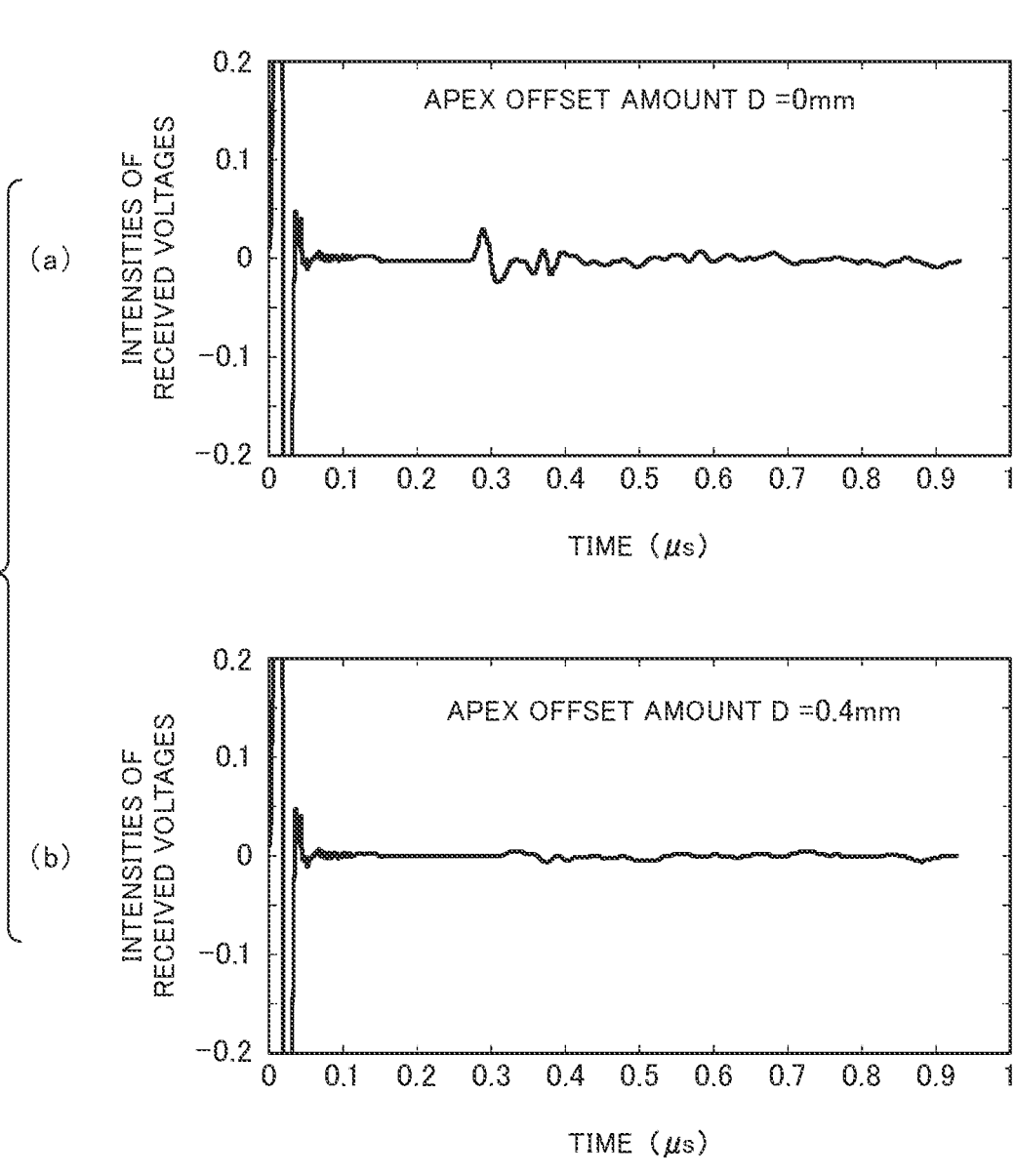
FIG. 28 illustrates a set of waveforms of the time-dependent variation of the intensities of the reflection waves for different offset amounts in the ultrasonic receiver pertaining to the second variation of the second embodiment, for CSMI angle θ=120 degrees assigned to the IC chip having vertical side-faces.

200e is inclined at CMSI angle θ=120 degrees and is displaced by apex offset amount D=0 mm are set, at a time of 200 ns, a transmission wave arrives to an edge at which the second main-face (bottom face) of the IC chip 200e and the closest side-face intersect at 90 degrees. After that, at a time of 240 ns, as illustrated in FIG. 27B, the transmission wave moves along the inclination of the second main-face and arrives to a position slightly in front of a center of the second main-face of the IC chip 200e assigned to CMSI angle θ=120 degrees. At the time of 240 ns, there are mixtures of a reflection wave reflected from the second main-face, an ultrasonic wave passing through the IC chip 200e to propagate forward, and the like. Moreover, at the time of 240 ns, FIG. 27B illustrates a situation that the reflection wave having curved-wavefront reflected from a region disposed in vicinity of the edge, at which the closest side-face of the IC chip 200e and the second main-face intersect, begins propagating toward the vicinity of the piezoelectric element 10. As a result, for apex offset amount D=0 mm, the curve representing intensity-variation of the received voltage is observed in a regime of times between 280 ns to 400 ns, by the piezoelectric element 10, as illustrated in FIG. 28(*a*).

FIG. 27C illustrates a case that the stealth amplifier 200d, which is inclined at CMSI angle θ=120 degrees and is displaced by apex offset amount D=0.4 mm, is used. Then, at a time of 180 ns, the transmission wave arrives to an edge at which the first main-face (top face) of the IC chip 200e in the stealth amplifier 200d and the closest side-face intersect at 90 degrees. After that, at the time of 240 ns, as illustrated in FIG. 27D, the transmission wave wraps around to the bottom main-face of the first main-face of the stealth amplifier 200d having CMSI angle θ=120 degrees and arrives to a position slightly in front of the center of the first main-face. At the time of 240 ns, there are mixtures of a reflection wave from the first main-face, the ultrasonic wave passing through the stealth amplifier 200d to propagate forward, and the like. Moreover, at the time of 240 ns, the main portion of the reflection wave having curved-wavefront reflected from a region disposed in vicinity of the edge at which the closest side-face of the IC chip as the stealth amplifier 200d and the first main-face intersect propagates toward a remote position located above the piezoelectric element 10. For apex offset amount D=0 mm, the curve representing intensity-variation of the received voltage is observed in vicinity of the time 280 ns to 400 ns, as illustrated in FIG. 28(*a*). However, for apex offset amount D=0.4 mm, as illustrated in FIG. 28(*b*), the remarkable waveform of the received voltages caused by the piezoelectric element 10 is not admitted in vicinity of the time 280 ns to 400 ns.

Figure 29:
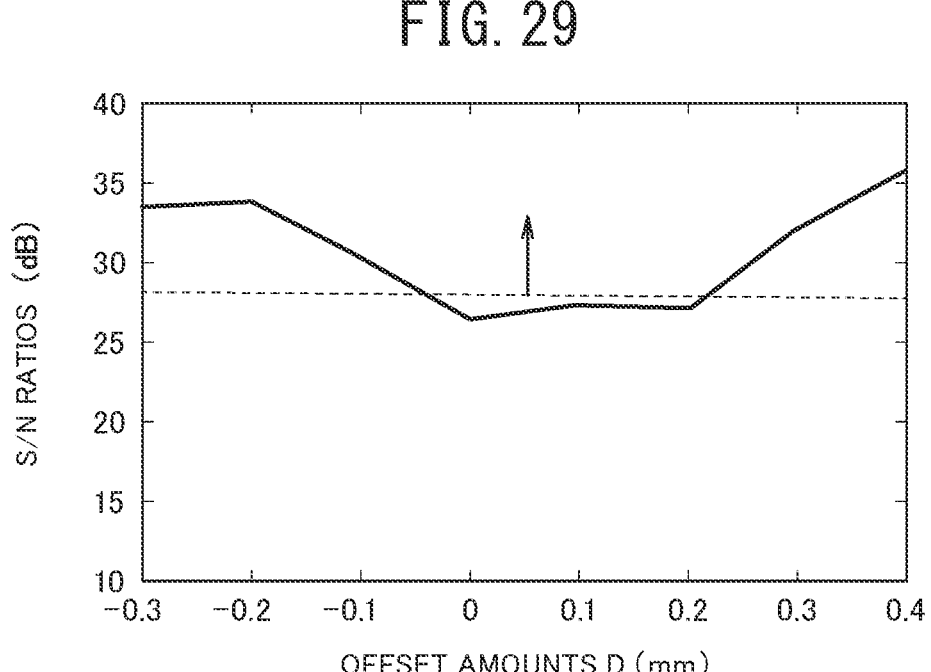
FIG. 29 is a diagram illustrating relationships between offset amounts of the IC chips and S/N ratios, in the ultrasonic receiver pertaining to the second variation of the second embodiment, for CSMI angle θ=120 degrees assigned to the IC chip having vertical side-faces.

Although FIGS. 27A-27C and 28 exemplify only two cases of apex offset amounts D=0 mm and 0.4 mm, apex offset amounts D other than the two cases are verified and validated. As a result, a relationship between apex offset amounts D of the IC chip employed as the stealth amplifier 200d and S/N ratios is obtained as illustrated in FIG. 29. According to the relationship illustrated in FIG. 29, S/N ratio is about 28 dB in a case that the apex offset amount D=0 mm and CMSI angle θ=120 degrees are set. On the other hand, when the displacement is tried to be displaced in a plus direction, while CMSI angle θ=120 degrees is kept, it is known that the aimed values of 28 dB or more in S/N ratio are obtained in the range of the apex offset amounts D≥0.2 mm. In FIG. 26, a lower direction along the radial direction of the sound-field detection-axis AX as the central axis is defined as "the plus direction". Also, as long as the displacements are tried in a minus direction, the aimed values of 28 dB or more in S/N ratio can be obtained in the range of apex offset amount D≥0.5 mm, while CMSI angle θ=120 degrees is kept, is known from FIG. 29. In FIG. 26, a displacement to the upper direction orthogonal to the sound-field detection-axis AX becomes "the minus direction".

Besides, there is a limit in a volume of the inner space of the resin horn (300, 301) in which the stealth amplifier 200d is arranged. In other words, the smaller the size of the resin horn (300, 301), the smaller the free degree of the arrangement of the stealth amplifier 200d. In view of the volume of the inner space, if an inclination angle of generatrix of a cone defining the resin horn (300, 301) can be matched to CMSI angle θ, the free degree can be made large with regard to the arrangement of the stealth amplifier 200d in the inner space of the resin horn (300, 301). Although illustration is omitted, for example, under an assumption that a piezoelectric element 10 is embedded on the left side, by encompassing the main body (300, 301, 800) of the ultrasonic receiver whose right side is thick in the two-stage stepped structure, an extraction terminal provided on an end side of the other side (right side) of the main body (300, 301, 800), a transmission path connected to the extraction terminal, and an observation apparatus connected through the transmission path, a ultrasonic-observation device pertaining to the second variation of the second embodiment can be constructed.

In the ultrasonic-observation device pertaining to the second variation of the second embodiment, even if the transmission path such as a coaxial cable has an external stray-capacitance $C_{ext}$ 50 times or more, further, for example, 100 times or more, or 1000 times or more larger than the signal-source capacitance $C_{signal}$ inherent in the piezoelectric element 10. For example, in a case that the value of the external stray-capacitance $C_{ext}$ 10 pF, a minimum distance $d_{opt}$ can be set so that the input stray-capacitance $C_{stray}$ has a value smaller than $1/10$ of the external stray-capacitance $C_{ext}$. Furthermore, the minimum distance $d_{opt}$ can be set so that the input stray-capacitance $C_{stray}$ has a value of about $C_{ext}/100$. As a result, a compact structure in which the piezoelectric element 10 and the stealth amplifier 200d are embedded and fixed in the resin horn (300, 301) is achieved, which can provide the ultrasonic receiver and the ultrasonic-observation device having a high sensitivity and S/N ratio, and are suitable for applications of medical purpose.

Additionally, as to the structure of the main body (300, 301, 800), for example, by thickening the diameter of the resin cylindrical portion in which a right end side is made more thicker in the stepped structure of, for example, two stages, the value of the output stray-capacitance $C_{out}$, which is parasitic in the output interconnection electrically connecting between the stealth amplifier 200d and the extraction terminal 500, can be reduced to a lower value. Also, by shortening the distance between the stealth amplifier 200d and the extraction terminal, the value of the output stray-capacitance $C_{out}$ of the ultrasonic receiver pertaining to the second variation of the second embodiment can be reduced to a smaller value. If the output voltage of the piezoelectric element 10 can be amplified to a sufficiently high voltage, the disadvantageous effect caused by the output stray-capacitance $C_{out}$ can be ignored. Especially, by PVDF film employed in the piezoelectric element 10, the input stray-capacitance $C_{stray}$ can be reduced, and the excellent pulse-response characteristics can be achieved. Thus, according to the ultrasonic receiver pertaining to the second variation of the second embodiment, the ultrasonic receiver and the ultrasonic-observation device, which are high in sensitivity and high in S/N ratio that enable the measurement of the minute ultrasonic waves can be provided, and are suitable for applications of medical purpose.

Comparative Example of Third Embodiment

Figure 30A:
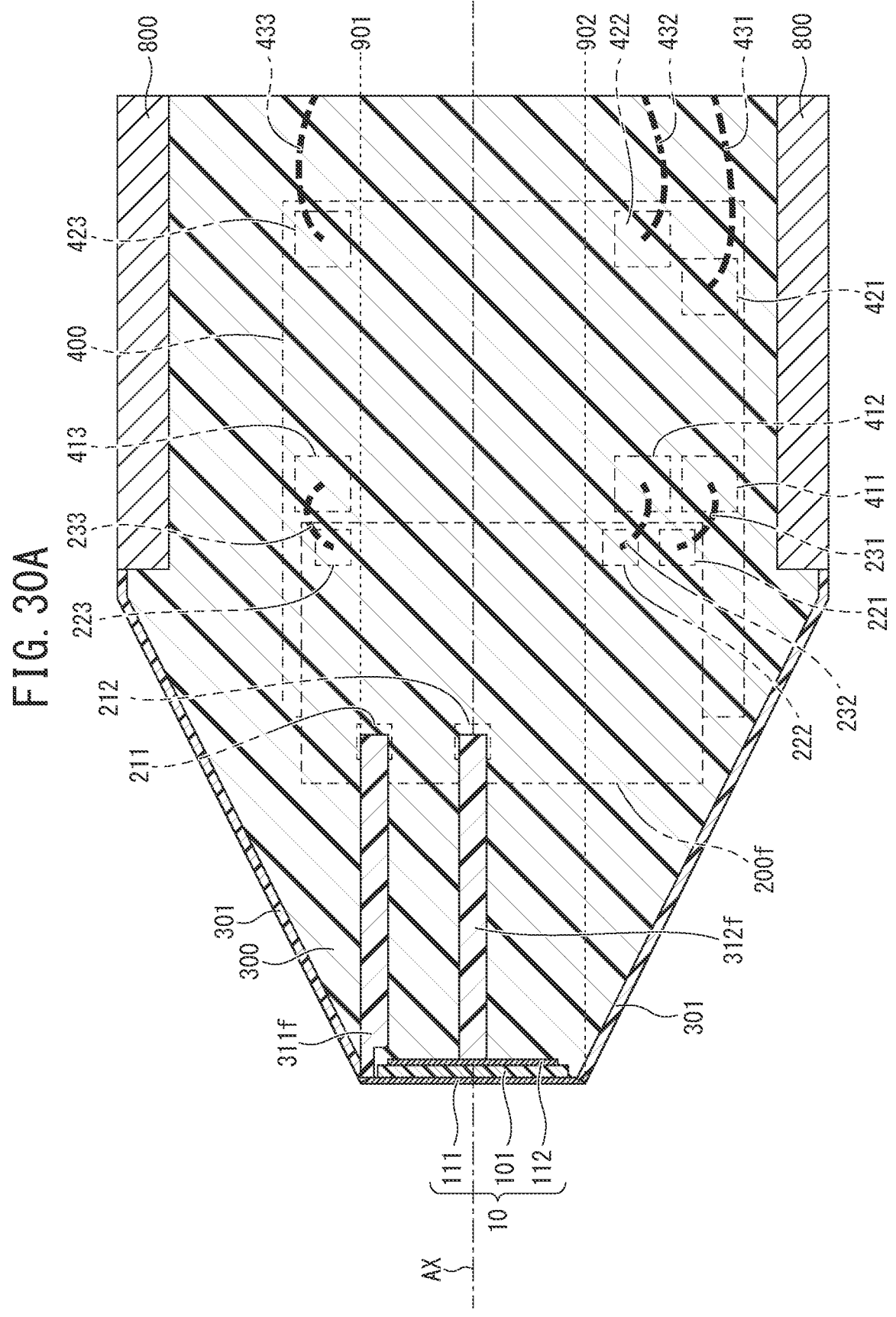
FIG. 30A is a schematic cross-sectional view explaining an outline of an ultrasonic receiver pertaining to a comparative example of a third embodiment of the present invention.
Figure 30B:
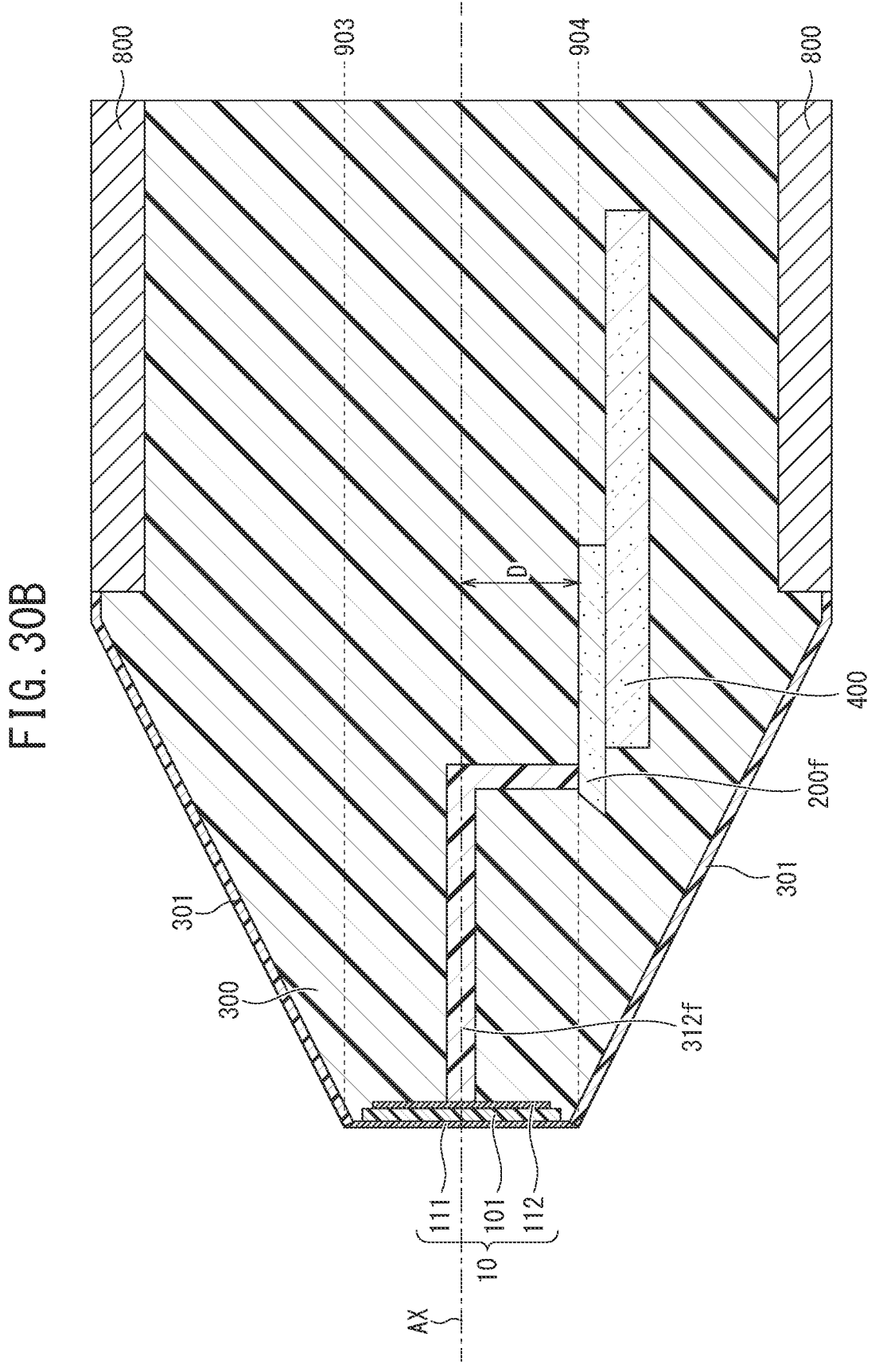
FIG. 30B is a schematic cross-sectional view of the ultrasonic receiver pertaining to the comparative example of the third embodiment, taken from a direction orthogonal to the cross-sectional view illustrated in FIG. 30A with respect to a sound-field detection-axis AX in FIG. 30A.

A piezoelectric element 10 of an ultrasonic receiver pertaining to a comparative example of the third embodiment of the present invention has a piezoelectric layer 101, and a first electrode plate 111 and a second electrode plate 112, sandwiching a piezoelectric layer 101 in between, as illustrated in FIGS. 30A and 30B. As represented by a vertical cross-sectional view in FIG. 30B, a stealth amplifier 200f does not exist in a behind space between a virtual line 903 extending along an axial direction from one ridge (upper ridge) assigned in a radial direction of the piezoelectric element 10 and a virtual line 904 extending along the axial direction from the other ridge (lower ridge) assigned in the radial direction of the piezoelectric element 10. Stated differently, the stealth amplifier 200f is displaced by apex offset amount D along the radial direction from a sound-field detection-axis AX located on a central axis, so as not to receive a transmission wave penetrated from the piezoelectric element 10 as much as possible. Due to the displacement by the apex offset amount D, the generation of a reflection wave that may be re-entered to the piezoelectric element 10 can be suppressed. And, even if the reflection wave is generated, the reflection wave can be avoided from being re-entered to the piezoelectric element 10. As a result, an improvement in S/N ratio can be expected.

As can be understood from the vertical cross-sectional view illustrated in FIG. 30B, a main-face of the IC chip implementing the stealth amplifier 200f exposed to the transmission wave penetrating through the piezoelectric element 10 shall be assigned as a first main-face (top face) of the IC chip. The first main-face of the IC chip is set to CMSI angle θ=90 degrees since the stealth amplifier 200f is displaced by offset distance D downward from the sound-field detection-axis AX, the first electrode plate 111 connected to the outside of the piezoelectric layer 101 is connected to an input pad (grounding side) 211 of the stealth amplifier 200f through a resin grounding wiring 311 that is bent downward in an L-shape. The second electrode plate 112 connected to inside of the piezoelectric layer 101 is connected to an input pad (signal side) 212 of the stealth amplifier 200f through a resin signal wiring 312f that is bent in L-shape. The stealth amplifier 200f has an amplifier (stealth amplifier 9 200f. Also, a chip side grounding pad 221 for receiving a grounding potential from the extraction terminal 500, a chip side output pad 222 for delivering signals amplified by the amplifier merged in the IC chip to the extraction terminal 500, and a chip side power-supply pad 223 for receiving a power-supply potential from the extraction terminal 500 are provided in the stealth amplifier 200f, respectively.

The stealth amplifier 200f building the ultrasonic receiver pertaining to the comparative example of the third embodiment is assembled on a printed circuit board 400. The printed circuit board 400 has an intermediate grounding pad 411 and an outer grounding pad 421 which correspond to the chip side grounding pad 221 of the stealth amplifier 200f, an intermediate output pad 412 and an outer output pad 422 which correspond to the chip side output pad 222 of the stealth amplifier 200f, and an intermediate power-supply pad 413 and an outer power-supply pad 423 which correspond to the chip side power-supply pad 223 of the stealth amplifier 200f, respectively. The chip side grounding pad 221 and the intermediate grounding pad 411 are connected to each other through a conductive line (grounding wire) such as Au (gold) wire and the like, and the outer grounding pad 421 is connected to the extraction terminal of the ultrasonic receiver through a conductive line (grounding lead line) such as Au wire and the like. Similarly, the chip side output pad 222 and the intermediate output pad 412 are connected to each other through a conductive line (output wire) 232 such as Au wire and the like, and the outer output pad 422 is connected to the extraction terminal 500 of the ultrasonic receiver through an output interconnection (output lead line) 432 such as Au wire and the like (see FIG. 3A). Also, the chip side power-supply pad 223 and the intermediate power-supply pad 413 are connected to each other through a conductive line (power-supply wire) 233 such as Au wire and the like, and the outer power-supply pad 423 is connected to the extraction terminal of the ultrasonic receiver through a conductive line (power-supply lead line) 433 such as Au wire and the like.

In the comparative example of the third embodiment, CMSI angle θ=90 degrees of the stealth amplifier 200f is set. The closest side-face of the IC chip implementing the stealth amplifier 200f is beveled at a predetermined taper angle Φ. That is, the taper angle Φ assigned to the closest side-face of the IC chip implementing the stealth amplifier 200f is set to 30 degrees≤Φ≤60 degrees. Moreover, the insulating epoxy resin 300 to fix the positional relation between the piezoelectric element 10 and the stealth amplifier 200f is molded in the metallic cylindrical sheath 800. The cylindrical sheath 800 is not arranged in a surface area covering a tip and tip vicinity of the ultrasonic receiver, under which the piezoelectric element 10 is embedded, According to the ultrasonic receiver pertaining to the comparative example of the third embodiment, even in the structure in which the piezoelectric element 10 and the stealth amplifier 200f are compactly embedded in the main body (300, 301, 800), the possible problem of the reflection wave due to the unnecessary echo from the stealth amplifier 200f can be removed. Thus, the improvement of S/N ratio as well as the received-voltage sensitivity can be expected. However, as illustrated in FIGS. 31A and 31B, there is a problem that the reflection waves from the grounding lead line 431, the output lead line (output interconnection) 432 and the power-supply lead line 433 are generated, and the problem will impose influence on S/N ratio.

Figure 31A:
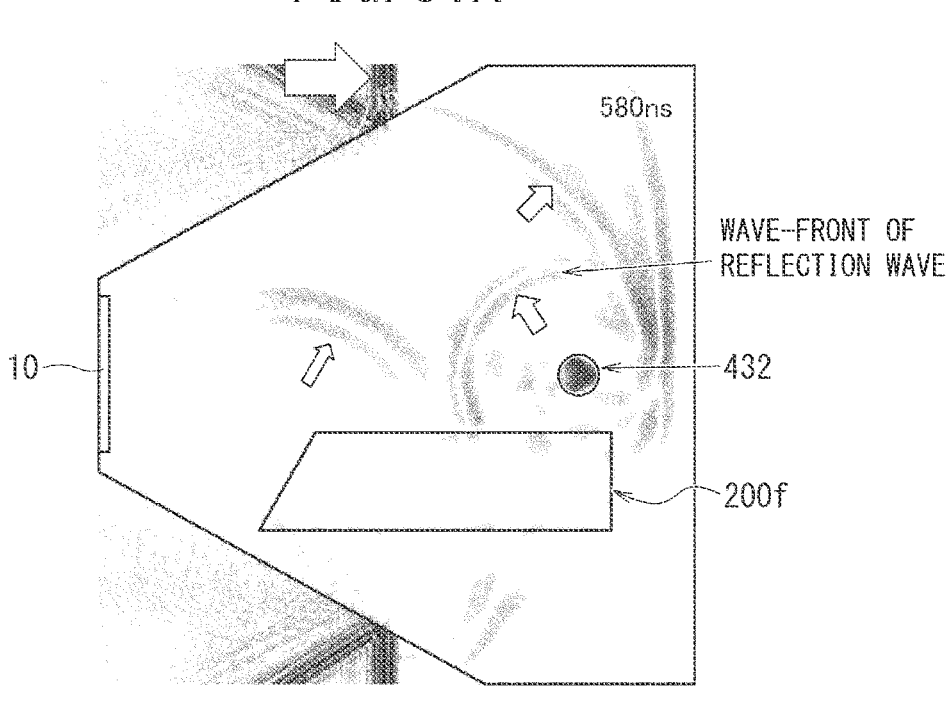
FIG. 31A is a view explaining reflections of ultrasonic waves from an output interconnection-line inherent in a main body of the ultrasonic receiver, in the ultrasonic receiver pertaining to the comparative example of the third embodiment.
Figure 31B:
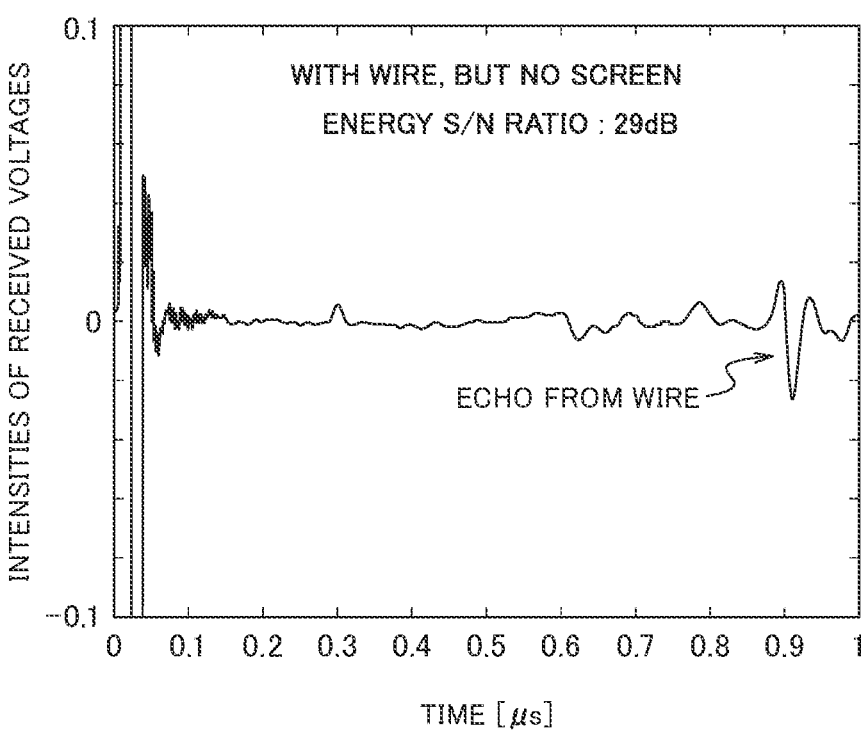
FIG. 31B illustrates a waveform representing intensities of unnecessary echo reflected by the output interconnection-line, which becomes problematic in a structure of the comparative example of the third embodiment illustrated in FIG. 31A.

FIG. 31A represents time-dependent changes in the sound-pressure intensity-profiles of the ultrasonic waves, which are observed in the structure of the ultrasonic receiver pertaining to the comparative example of the third embodiment illustrated in FIGS. 30A and 30B. As illustrated in FIG. 31A, at a time of 580 ns, a transmission wave arrives to a position behind the output lead line (output interconnection) 432. At the time of 580 ns, a reflection wave from the output lead line (output interconnection) 432 arrives to the vicinity of the center of the first main-face (top face) of the IC chip implementing the stealth amplifier 200f. On the other hand, at the time of 580 ns, a curved wave-front of the reflection wave reflected by a boundary between an top face of the IC chip implementing the stealth amplifier 200f and a closest side-face beveled at taper angle Φ is present, and the reflection wave is mixed with the transmission wave above the top face of the IC chip. FIG. 31B illustrates a curve representing intensity-variation of the received voltage, which is observed by the piezoelectric element 10 of the ultrasonic receiver pertaining to the comparative example of the third embodiment. In the case of the structure of the ultrasonic receiver pertaining to the comparative example of the third embodiment, the reflection wave—the echo—reflected from the Au wire appears at a time regime from the vicinity of the instant of 580 ns and continues until the vicinity of an instant of 950 ns. The S/N ratio of the ultrasonic receiver pertaining to the comparison in the third embodiment is 29 dB.

Third Embodiment

Figure 32:
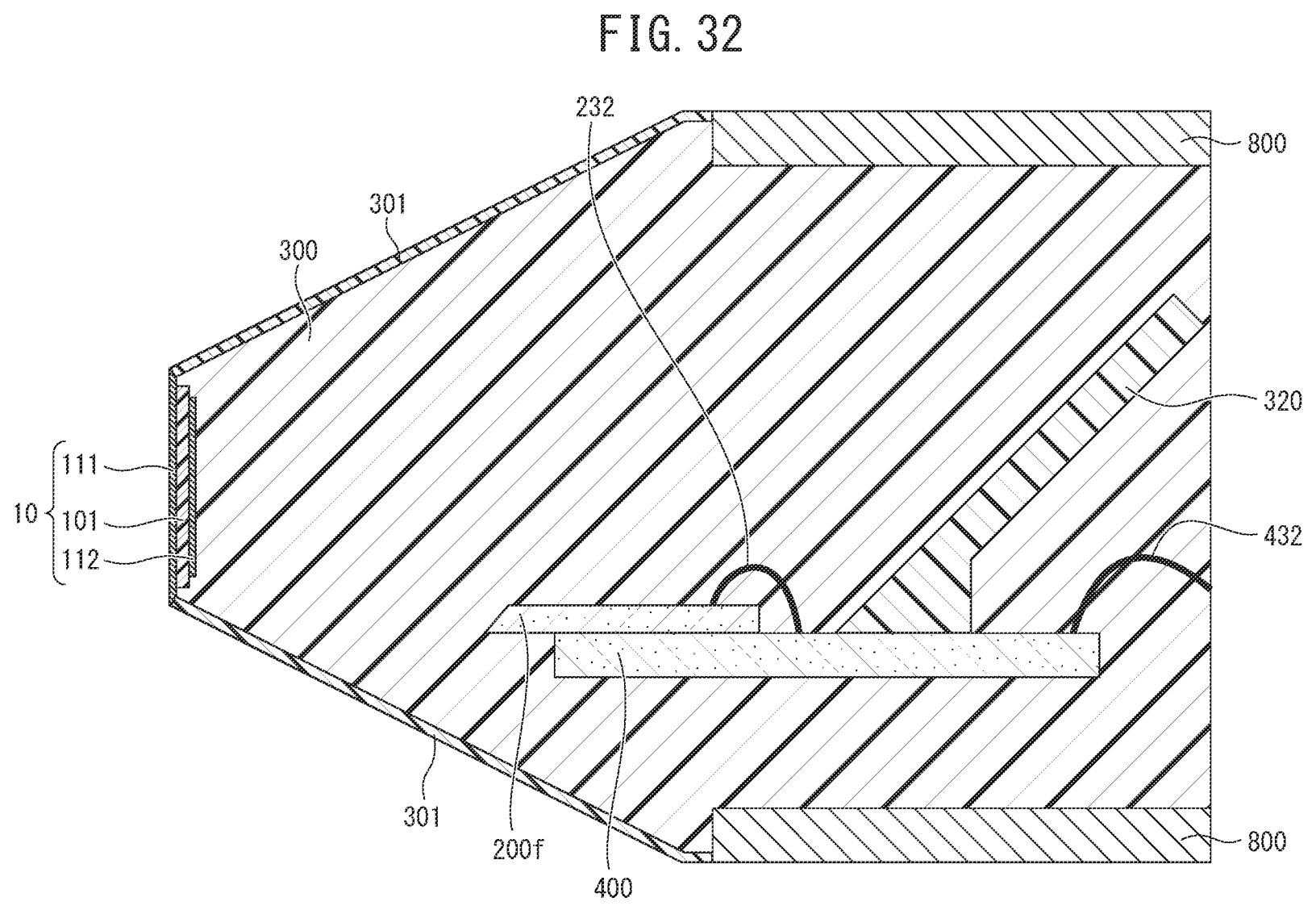

According to the ultrasonic receiver pertaining to the comparative example of the third embodiment, S/N ratio of 29 dB has been obtained, which was higher than the aimed value of 28 dB in S/N ratio, by setting the taper angle $\Phi$ to a range of 30 degrees$\leq\Phi\leq$60 degrees. However, depending on the arrangement position of the output interconnection (output lead line) 432 connecting between the stealth amplifier 200f and the extraction terminal 500 of the ultrasonic receiver, the reflection wave from the output interconnection 432 is generated, which affects a bad influence on S/N ratio. Moreover, depending on the arrangement positions of the grounding lead line 431 and the power-supply lead line 433 which connect between the stealth amplifier 200f and the extraction terminal of the ultrasonic receiver, the reflection waves from the outer connection lead line (grounding lead line) 431 and the outer connection lead line (power-supply lead line) 433 are generated, which affect bad influences on S/N ratio. So, as illustrated in FIG. 32, an arrangement of a screen member 320 becomes effective. In other words, an ultrasonic receiver pertaining to a third embodiment includes a resin horn (300, 301) having a tapered chip, the resin horn (300, 301) has a sound-field detection-axis AX parallel to a propagation direction of an ultrasonic waves as a central axis, a piezoelectric element 10 which is partially exposed and provided at the tip of the resin horn (300, 301), and a stealth amplifier 200f arranged at a position allocated in the resin horn (300, 301), the stealth amplifier 200f is displaced from the behind space onto which the shape of the piezoelectric element 10 is projected.

The stealth amplifier 200f is disposed in vicinity of the piezoelectric element 10 at a distance corresponding to the minimum distance $d_{opt}$ that is determined as an available distance defined by basic design scheme with Eq. (3). The stealth amplifier 200f is provided to amplify electric signals generated by electro-acoustic conversions in the piezoelectric element 10, and to avoid a reflection wave from being entered to the piezoelectric element 10, or to avoid the wave-front of the reflection wave from uniformly enter to the piezoelectric element 10 with regard to the main-face of the piezoelectric layer 101, which implements the piezoelectric element 10. Even if the reflection waves are generated, unless the wave-front of the reflection wave is uniformly entered, the generated electromotive force will be reduced to a small value, as mentioned already. Namely, as the wave-front of the reflection wave has the inclination on the main-face of the piezoelectric layer 101, which implements the piezoelectric element 10, the electromotive force generated in an inside of the piezoelectric element 10 by the piezoelectric electric-acoustic conversion is cancelled, and the cancel of the electromotive force decreases the electromotive force to a small value.

Furthermore, although illustration is omitted in FIG. 32, an input connection member (resin signal wiring), which electrically connects between the piezoelectric element 10 and the stealth amplifier 200f, and a resin grounding wiring are existing, in a manner similar to the ultrasonic receivers pertaining to the first to fifth embodiments. As compared with the ultrasonic receiver in the comparative example of the third embodiment, a feature of improvement in the ultrasonic receiver of the third embodiment inheres in a configuration that the screen member 320 having a flat stealth plane as the main-face is provided on the printed circuit board 400. The other structures of the ultrasonic receiver pertaining to the third embodiment are equal to those of the ultrasonic receiver in the comparative example of the third embodiment. Thus, hereinafter, the screen member 320 is explained. And, as to the other components, to which the same reference numerals are labeled on the drawings in the explanation of the ultrasonic receiver in the comparative example of the third embodiment, the detail explanations will be omitted.

The direction of the stealth plane establishing a main-face of the screen member 320 of the ultrasonic receiver pertaining to the third embodiment is inclined by "a screen inclination angle $\varsigma$" defined with respect to the direction of a main-face of the first electrode plate 111. Stated differently, the screen inclination angle $\varsigma$ is set in a range of 30 degrees$\leq\varsigma\leq$60 degrees. The lower limit value of 30 degrees in the screen inclination angle $\varsigma$ is equal to the lower limit value of CMSI angle $\theta$ as mentioned already. Like the reason for the lower limit value of CMSI angle $\theta$, the reason for determining the lower limit value in the screen inclination angle $\varsigma$ lies in an improvement of S/N ratio caused by the reflection wave, which will contribute as unnecessary echo. Also, the upper limit value of 60 degrees in the screen inclination angle $\varsigma$ is the angle determined by a required condition for removing the influence by the reflection wave contributing on S/N ratio, as unnecessary echo generated by the reflection wave itself, and for avoiding the ultrasonic waves from hitting a grounding lead line (outer connection lead line) 431, an output lead line (output interconnection) 432 and a power-supply lead line (outer connection lead line) 433, such as the as Au wire and the like, which are located behind the screen member 320—on the side of the extraction terminal 500—. Then, according to the ultrasonic receiver pertaining to the third embodiment, due to the presence of the stealth plane of the screen member 320, the reflection waves from the grounding lead line 431, the output lead line (output interconnection) 432 and the power-supply lead line 433, which are located behind the screen member 320, are removed, which can improve S/N ratio as well as the received-voltage sensitivity, even in the structure in which the piezoelectric element 10 and the stealth amplifier 200f are compactly embedded in the main body (300, 301, 800).

According to the ultrasonic receiver pertaining to the third embodiment, it is preferable that the grounding wire 231, the output wire 232 and the power-supply wire 233, such as the Au wire and the like, which are scheduled to be located ahead of the screen member 320, namely, located on the side of the piezoelectric element 10, shall be arranged at the positions out of the behind space assigned to the piezoelectric element 10, when the ultrasonic receiver is viewed from the tip side along the axial direction, in order to minimize the influences caused by the reflection waves from them. Similarly, it is preferable that a resin grounding wiring 311f and a resin signal wiring (input connection member) 312f, shall be arranged at the positions out of the behind space assigned to the piezoelectric element 10, when the ultrasonic receiver is viewed from the tip side along the axial direction. Moreover, in a situation that the screen member 320 does not exist, it is preferable that the grounding lead line 431, the output lead line (output interconnection) 432 and the power-supply lead line 433, shall be arranged at the positions out of the behind space assigned to the piezoelectric element 10, when the ultrasonic receiver is viewed from the tip side along the axial direction.

Figure 33A:
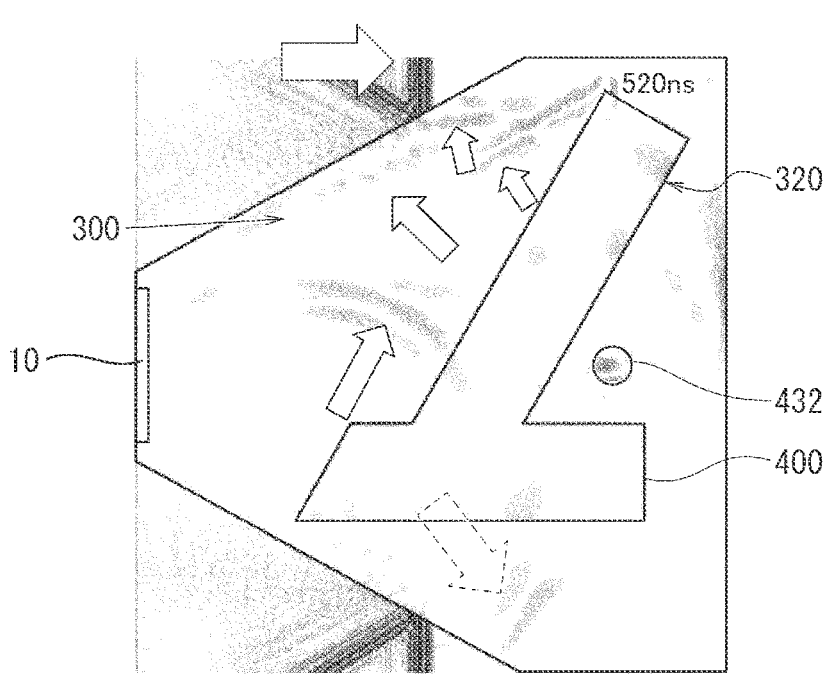
FIG. 33A is a view explaining a structure of the ultrasonic receiver pertaining to the third embodiment, for suppressing the reflections of the ultrasonic waves from the output interconnection-line by arranging a screen member, even in a configuration that the output interconnection-line exist in the main body of the ultrasonic receiver.

FIG. 33A illustrates, one of the time-dependent changes in the sound-pressure intensity-profile of the ultrasonic waves, which are observed in the structure of the ultrasonic receiver pertaining to the third embodiment illustrated in FIG. 32. As illustrated in FIG. 33A, an instant of 520 ns will become a timing at which the transmission wave arrives to a position behind the output lead line (output interconnection) 432 if there is no screen member 320. However, at the instant of the time 520 ns, due to the existence of the screen member 320, there is no reflection wave from the output lead line (output interconnection) 432. Instead, a plurality of reflection waves including the reflection waves from the stealth plane of the screen member 320 are propagating toward positions separated from the piezoelectric element 10 above the piezoelectric element 10. Also, at the time of 520 ns, curved wave-fronts of the reflection waves reflected by a boundary between a top face of the IC chip implementing the stealth amplifier 200f and a closest side-face beveled at taper angle (D is also present and mixed above the top face of the IC chip. Moreover, even a transmission wave penetrating in the IC chip implementing the stealth amplifier 200f is present on a side of a second main-face (bottom face) of the IC chip.

Figure 33B:
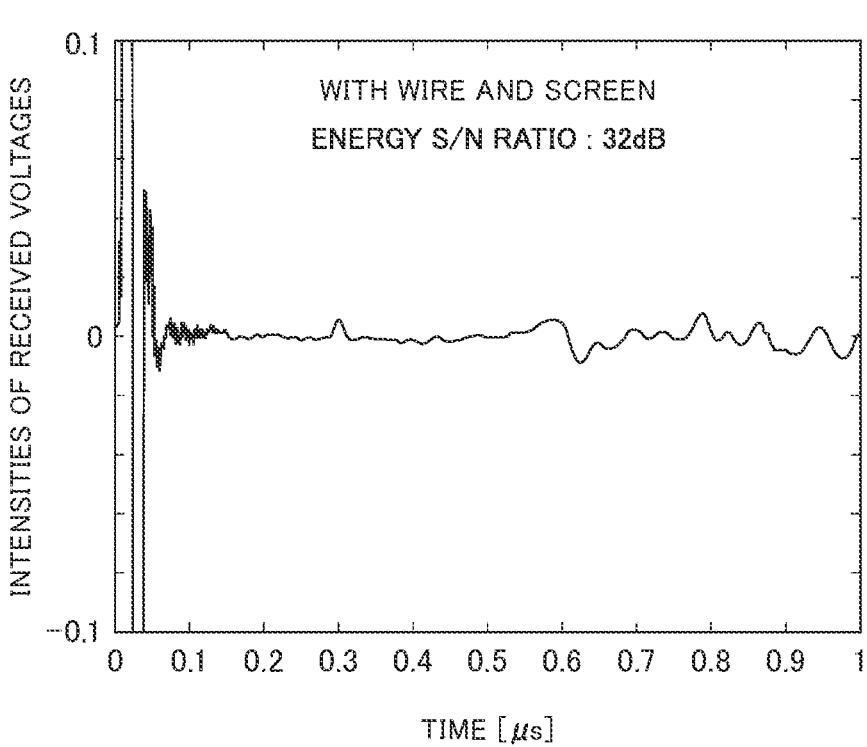
FIG. 33B illustrates a disappearance of the waveforms of the reflection waves reflecting from the output interconnection-line in the time-dependent intensity variation of the unnecessary echo, according to the ultrasonic receiver pertaining to the third embodiment.

FIG. 33B illustrates a curve representing intensity-variation of the received voltages, which are observed by the piezoelectric element 10 of the ultrasonic receiver pertaining to the third embodiment. In the case of the structure of the ultrasonic receiver in the comparative example of the third embodiment, the influence caused by the reflection wave from the Au wire appears in a time regime from the vicinity of the time of 580 ns and continues up to the vicinity of the time of 950 ns. However, in the case of the ultrasonic receiver pertaining to the third embodiment, although there is some influence caused by the reflection wave from the stealth plane of the screen member 320, nothing is observed ascribable to the reflection wave from the Au wire. As a result, S/N ratio of the ultrasonic receiver pertaining to the third embodiment becomes 32 dB, and therefore, an improvement compared with 29 dB of the ultrasonic receiver in the comparative example of the third embodiment can be known.

Although illustration is omitted, for example, when the piezoelectric element 10 is assumed to be arranged on the left side, a ultrasonic-observation device pertaining to the third embodiment can be constructed by encompassing the main body (300, 301, 800) of the ultrasonic receiver whose right side is thick in the two-stage stepped structure, an extraction terminal provided on an end side of the other side (right side) of the main body (300, 301, 800), a transmission path connected to the extraction terminal, and an observation apparatus connected through the transmission path. In the ultrasonic-observation device pertaining to the third embodiment, even if the transmission path such as coaxial cable has an external stray-capacitance $C_{ext}$ which is 50 times or more, further, for example, 100 times or more, or 1000 times or more larger than a signal-source capacitance $C_{signal}$ inherent in the piezoelectric element 10, for example, even if the transmission path has a value of external stray-capacitance $C_{ext} \approx 10$ pF, a minimum distance $d_{opt}$ can be set so that an input stray-capacitance $C_{stray}$ can have a value smaller than 1/10 of the external stray-capacitance $C_{ext}$. For example, the minimum distance $d_{opt}$ can be set so that the value of about $C_{ext}/100$ can be achieved.

Furthermore, as to a structure of the main body (300, 301, 800), for example, by thickening a diameter of the resin cylindrical portion in which the right end side is made more thicker in the stepped structure of, for example, two stages, the value of the output stray-capacitance $C_{out}$, which is parasitic in the output interconnection electrically connecting between the stealth amplifier 200f and the extraction terminal, can be reduced to a lower value. Moreover, by shortening the distance between the stealth amplifier 200f and the extraction terminal, the value of the output stray-capacitance $C_{out}$ of the ultrasonic receiver pertaining to the third embodiment can be reduced to a smaller value, and therefore, the considerations of the values of the output stray-capacitance $C_{out}$ can be omitted. As mentioned above, according to the ultrasonic receiver and ultrasonic-observation device pertaining to the third embodiment, a compact structure in which the piezoelectric element 10 and the stealth amplifier 200f are embedded and fixed in the resin horn (300, 301), and the screen member 320 is further provided is achieved, which can provide the ultrasonic receiver and the ultrasonic-observation device that are excellent in pulse-response characteristics and high in sensitivity and high in S/N ratio, and are suitable for applications of medical purpose.

Fourth Embodiment

Figure 34:
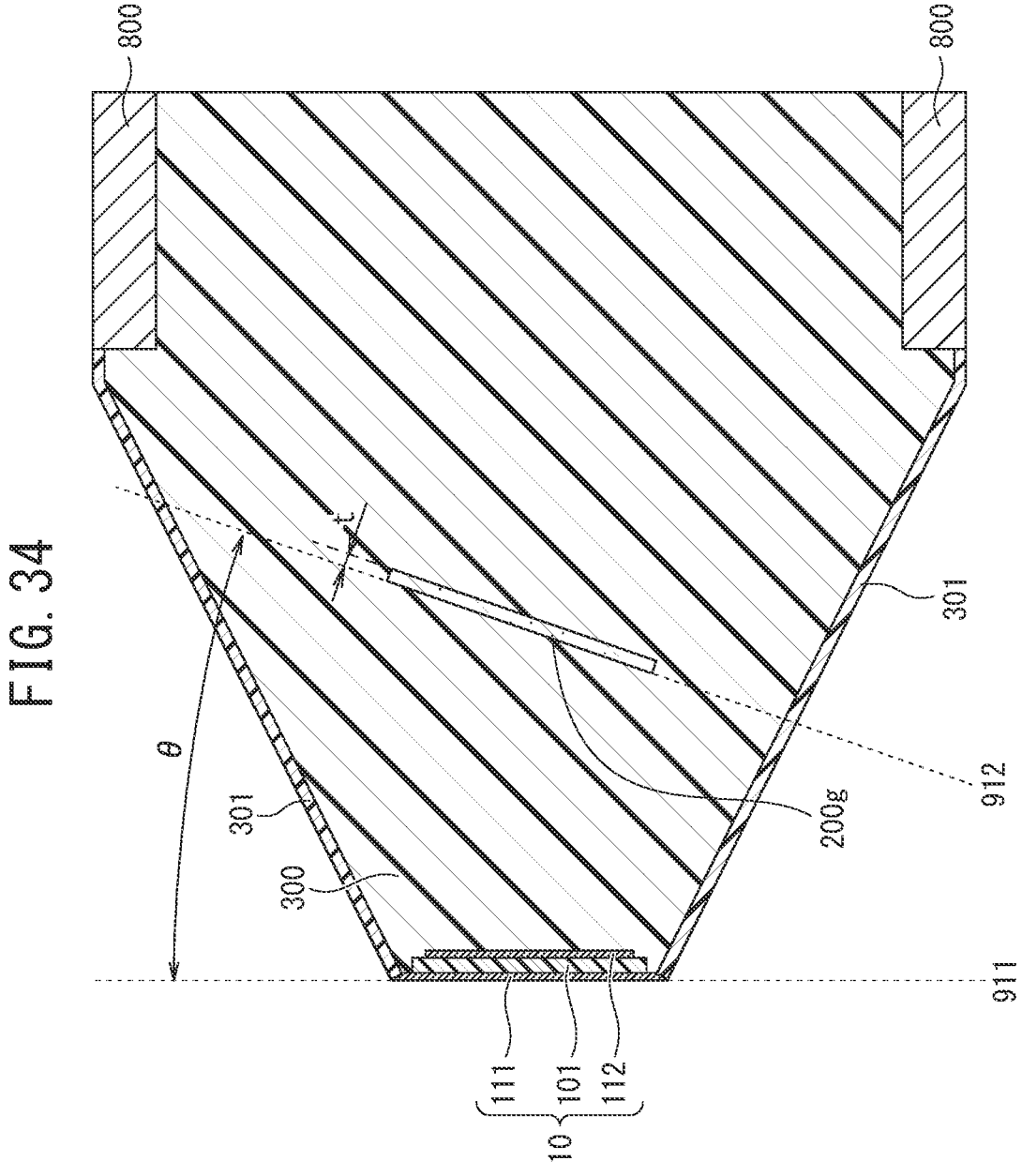
FIG. 34 is a schematic cross-sectional view explaining an outline of an ultrasonic receiver pertaining to a fourth embodiment of the present invention.

An ultrasonic receiver pertaining to a fourth embodiment of the present invention encompasses a resin horn (300, 301) having a tapered shape in part, which has a sound-field detection-axis AX as a central axis, a piezoelectric element 10 which is partially exposed and provided at a tip of the resin horn (300, 301), and a stealth amplifier 200g embedded in the resin horn (300, 301) and arranged in a behind space onto which the shape of the piezoelectric element 10 is projected, as illustrated in FIG. 34. The stealth amplifier 200g is disposed in vicinity of the piezoelectric element 10 at a distance corresponding to a minimum distance $d_{opt}$ that is determined as an available distance defined by basic design scheme with Eq. (3). The stealth amplifier 200g is provided to amplify electric signals generated by electroacoustic conversions in the piezoelectric element 10, to change the reflection characteristics of the ultrasonic waves passing through the piezoelectric element 10, and to avoid the reflection wave from being entered to the piezoelectric element 10, or to avoid the wave-front of the reflection wave from being uniformly entered to a main-face of the piezoelectric layer 101, which implements the piezoelectric element 10. Even if the reflection waves are generated, unless the wave-front of the reflection wave is uniformly entered because the wave-front of the reflection wave has an inclination on the main-face of the piezoelectric layer 101, which implements the piezoelectric element 10, the electromotive force is decreased to smaller values, as mentioned already. In addition, illustrations of an input connection member (resin signal wiring) electrically connecting between the piezoelectric element 10 and the stealth amplifier 200g. and a resin grounding wiring are omitted.

In a configuration with CMSI angle $\theta=45$ degrees or more, if a thickness t of the IC chip employed in the stealth amplifier 200g is about five micrometers or less, the deterioration of S/N ratio caused by the reflection wave is hardly generated even in a case of a rectangular silicon (Si) chip in which a length of one side is about 0.5 mm. In the case, even if a pure epoxy-resin layer having a thickness t≈100 micrometers is backed up on the stealth amplifier 200g, the problem of the generation of the unnecessary echo caused by the reflection wave is not similarly generated. Thus, CMSI angle $\theta$ is further preferable to be set to 45 degrees or more.

However, the influence on S/N ratio by the reflection wave cannot be ignored if the thickness t of the IC chip employed in the stealth amplifier 200g exceeds beyond 100 micrometers, even under the configuration of CMSI angle θ=45 degrees or more. Hence, it is preferable that the thickness t of the IC chip employed in the stealth amplifier 200g is set to be 100 micrometers or less.

Figure 35:
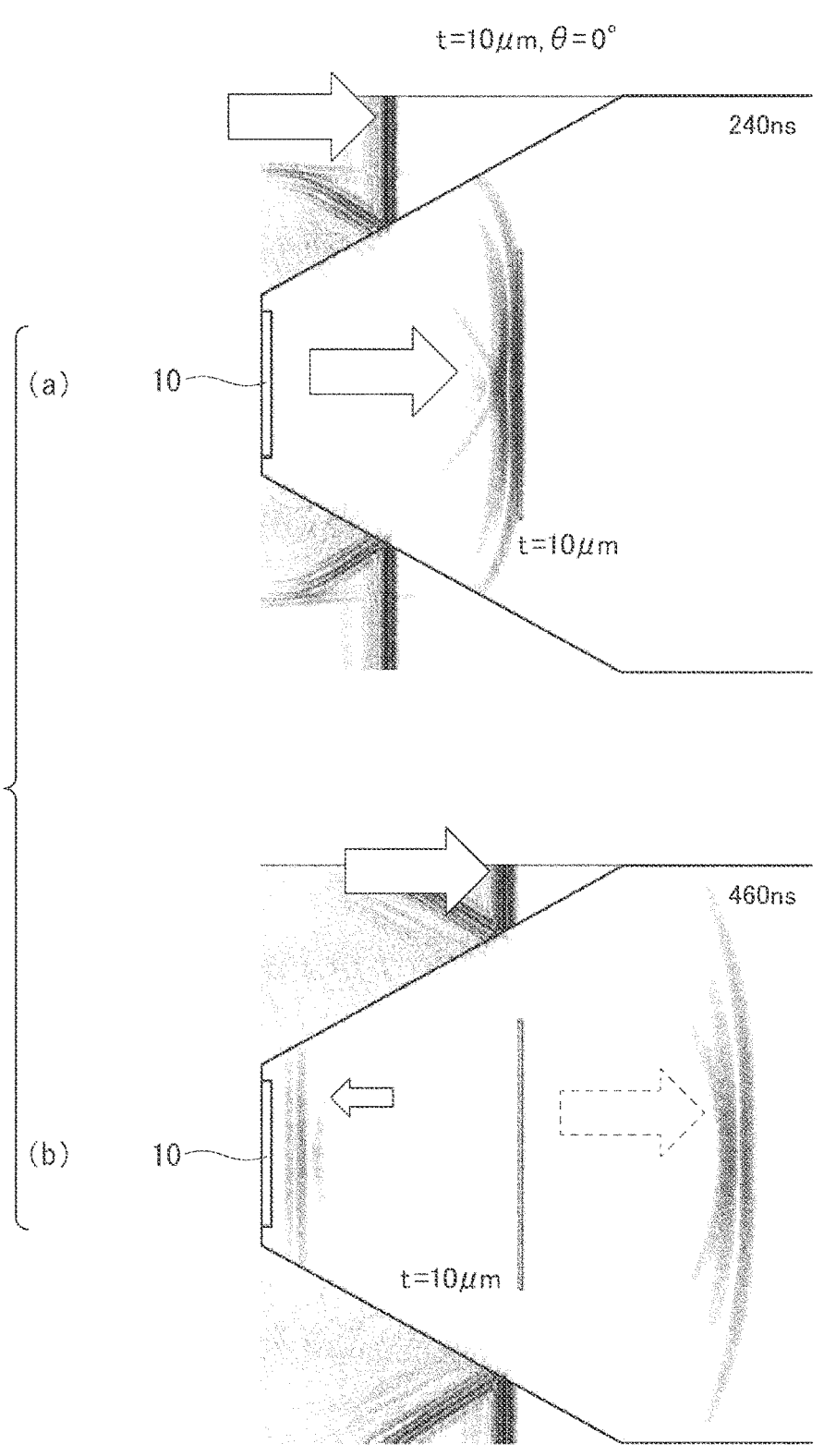
FIG. 35 is a set of views illustrating leading wave-fronts of the transmission waves sent to thin IC chips and the reflection wave reflected by one of the thin IC chips, under CMSI angle θ=0 degree, in the ultrasonic receiver pertaining to the fourth embodiment.
Figure 36:
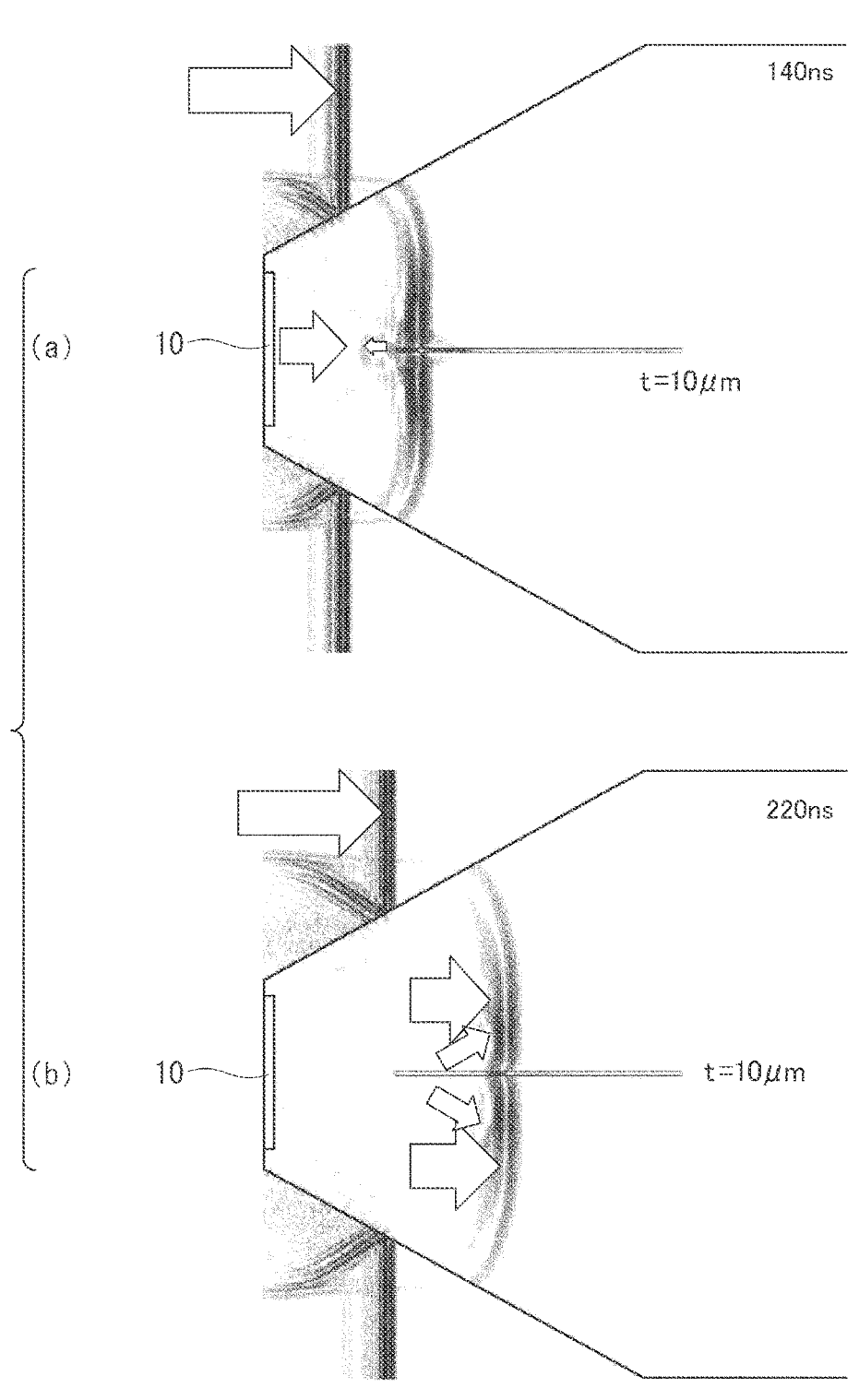
FIG. 36 is a set of views illustrating leading wave-fronts of the transmission waves sent to thin IC chips and the reflection waves reflected by one of the thin IC chips, for CMSI angle θ=0 degree, in the ultrasonic receiver pertaining to the fourth embodiment.

For example, in a state that the thickness t of the Si chip used in the stealth amplifier 200g is 10 micrometers, the time-dependent changes of the sound-pressure intensity-profile of the ultrasonic waves are illustrated in FIGS. 35 and 36. Under a configuration of CMSI angle θ=0 degree, the transmission wave arrives to the main-face of the Si chip at a time 240 ns, as illustrated in FIG. 35(*a*). After that, at an instant of 460 ns, as illustrated in FIG. 35(*b*), the transmission wave passes through the Si chip to propagate forward, and simultaneously, a weak reflection wave (unnecessary echo) is reflected by the main-face of the Si chip, and the weak reflection wave will enter to the piezoelectric element 10. Under a configuration of CMSI angle θ=90 degrees, a transmission wave arrives to a closest side-face of the Si chip at an instant of 140 ns, as illustrated in FIG. 36(*a*). After that, at an instant of 220 ns, as illustrated in FIG. 36(*b*), the transmission waves arrive to the vicinity of the center of both of main-faces of the Si chip, and there are mixtures of reflection waves from both of main-faces, the ultrasonic wave passing through the Si chip, and the like. On the other hand, any reflection wave reflected at edge faces of the Si chip is not admitted in vicinity of the piezoelectric element 10, in the sound-pressure intensity-profiles illustrated in FIG. 36(*b*).

Figure 37:
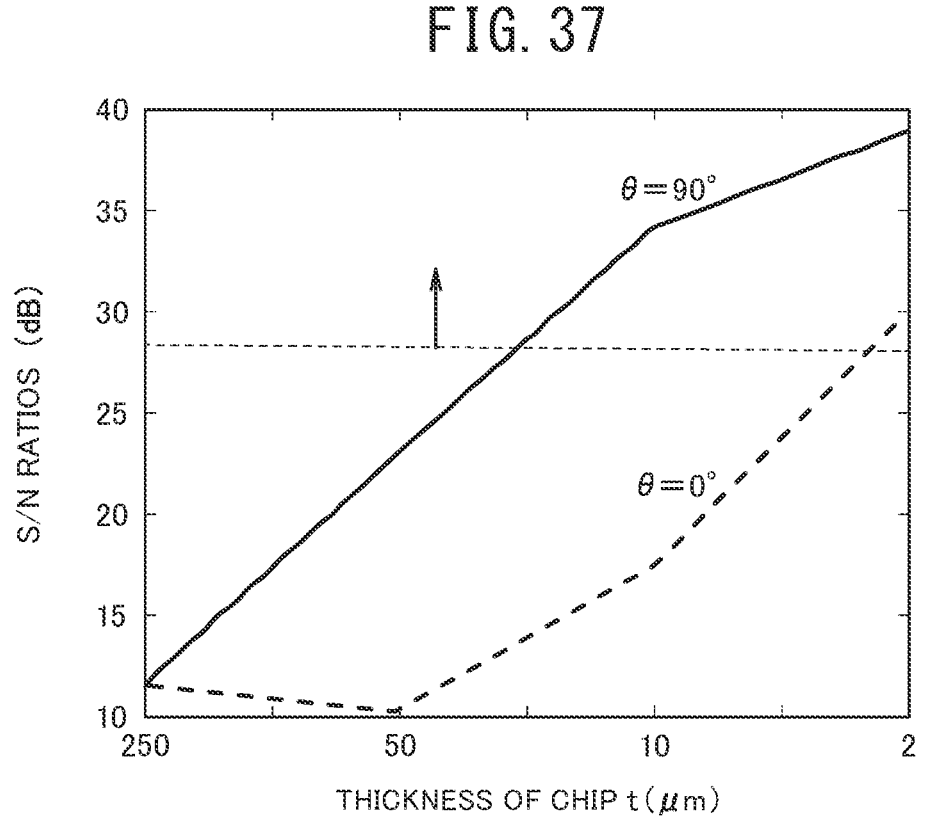
FIG. 37 is a diagram illustrating relationships between thickness of the IC chips and S/N ratios, in the ultrasonic receiver pertaining to the fourth embodiment.

FIG. 37 illustrates relationships between the thickness t of the Si chip used in the stealth amplifier 200g and S/N ratio. As can be understood from the result of FIG. 37, by setting the chip thickness t to about four micrometers or less for CMSI angle θ=0 degree, or setting the chip thickness t to about 40 micrometers or less for CMSI angle θ=90 degrees, the aimed values of 28 dB or more in S/N ratio can be achieved in the respective cases. However, for the thickness t of the Si chip used in the stealth amplifier 200g, consideration must be paid to the easiness of its handling. That is, when the chip thickness t becomes too thin, a problem of chip break when the chip is mounted is generated, and therefore, the chip must be carefully handled, which impairs the easiness of the assembling process of the ultrasonic receiver, as a result.

Thus, regarding the thickness t of the Si chip used in the stealth amplifier 200g, under a presumption that the assembling process is not troubled, a remarkably improved effectiveness in S/N ratio can be achieved, by thinning the thickness to a predetermined value or less depending on CMSI angle θ. For example, under the assumption that the piezoelectric element 10 is embedded in the left side, an ultrasonic-observation device pertaining to the fourth embodiment can be constructed by encompassing the main body (300, 301, 800) of the ultrasonic receiver in which the right side is thick in the two-stage stepped structure, an extraction terminal provided in the other end side (right side) of the main body (300, 301, 800), a transmission path connected to the extraction terminal and an observation apparatus connected through the transmission path.

In the ultrasonic-observation device pertaining to the fourth embodiment, even if the transmission path such as a coaxial cable has an external stray-capacitance $C_{ext}$ which is 50 times or more, further, for example, 100 times or more, or 1000 times or more larger than a signal-source capacitance $C_{signal}$ inherent in the piezoelectric element 10, for example, if the transmission path has the value of the external stray-capacitance $C_{ext} \approx 10$ pF, the minimum distance $d_{opt}$ can be set so that the input stray-capacitance $C_{stray}$ can have a value smaller than $\frac{1}{10}$ of the external stray-capacitance $C_{ext}$. For example, the minimum distance $d_{opt}$ can be set so that the input stray-capacitance $C_{stray}$ can have the value of about $C_{ext}/100$. Additionally, regarding the structure of the main body (300, 301, 800), for example, by thickening the diameter of the resin cylindrical portion in which the right end side is made more thicker in the stepped structure of, for example, two stages, the value of the output stray-capacitance $C_{out}$, which is parasitic in the output interconnection electrically connecting between the stealth amplifier 200g and the extraction terminal, can be designed to a lower value. Moreover, by shortening the distance between the stealth amplifier 200g and the extraction terminal, the value of the output stray-capacitance $C_{out}$ of the ultrasonic receiver pertaining to the fourth embodiment can be reduced to a smaller value. Thus, the technical concern of the output stray-capacitance $C_{out}$ can be omitted.

According to the ultrasonic receiver and ultrasonic-observation device pertaining to the fourth embodiment, even if PVDF film in which the acoustic-impedance matching-characteristics with water is excellent is used, a compact structure can be achieved. And therefore, a structure encompassing the stealth amplifier 200g, implemented by the IC chip whose plate thickness is thin, and the piezoelectric element 10, which are embedded and fixed in the resin horn (300, 301), is achieved to decrease the input stray-capacitance to a smaller value. As a result, according to the ultrasonic receiver and ultrasonic-observation device pertaining to the fourth embodiment, the ultrasonic receiver and the ultrasonic-observation device that are excellent in pulse-response characteristics and high in sensitivity and high in S/N ratio, and are suitable for applications of medical purpose can be provided.

Fifth Embodiment

Figure 38:
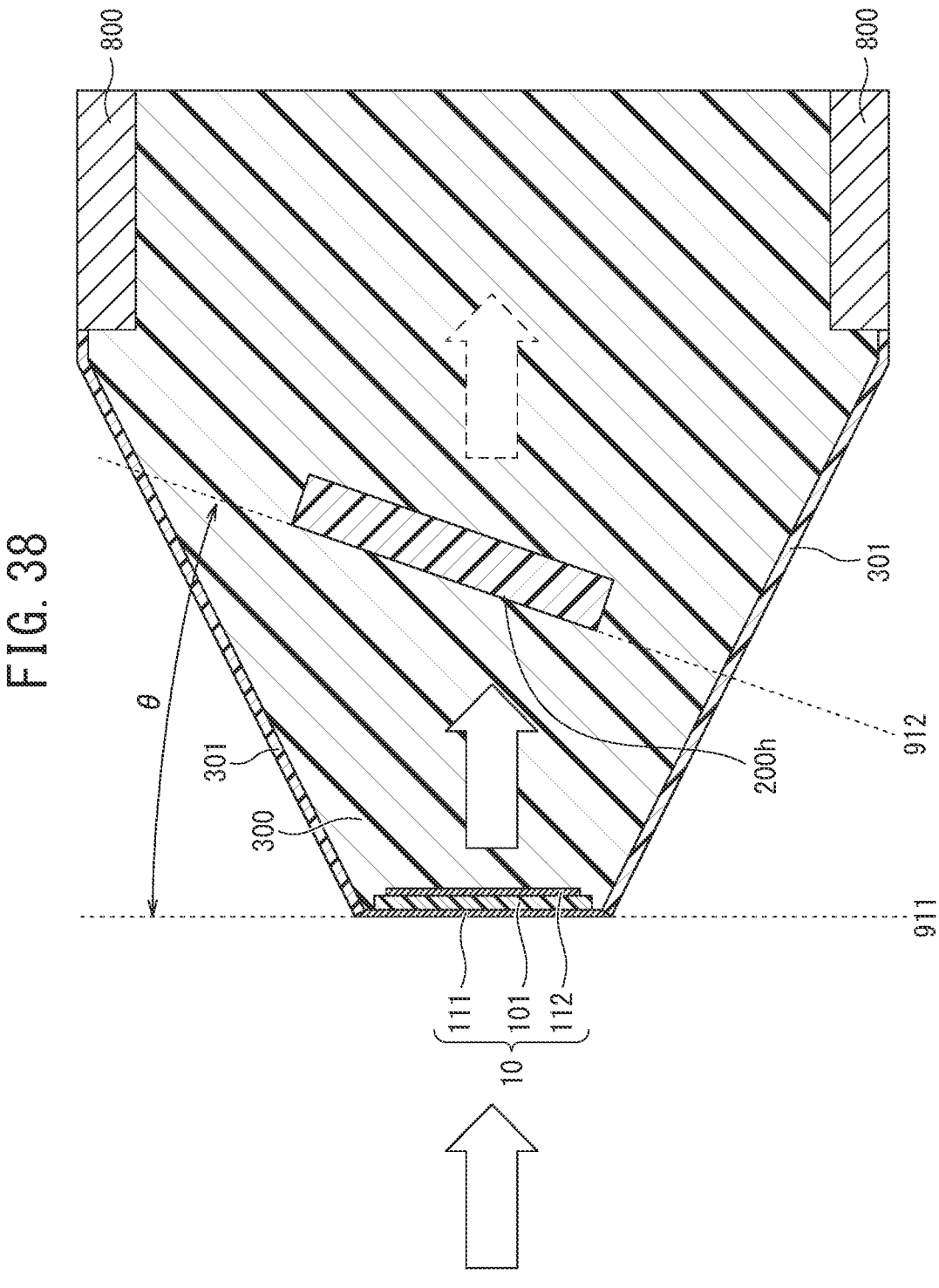
FIG. 38 is a schematic cross-sectional view explaining an outline of an ultrasonic receiver pertaining to a fifth embodiment of the present invention.

As illustrated in FIG. 38, an ultrasonic receiver pertaining to a fifth embodiment of the present invention encompasses a resin horn (300, 301) having a tapered shape in part, which have a sound-field detection-axis AX as a central axis, a piezoelectric element 10 which is partially exposed and provided at a tip of the resin horn (300, 301), and a stealth amplifier 200h embedded in the resin horn (300, 301) and arranged in the behind space onto which a shape of the piezoelectric element 10 is projected. The stealth amplifier 200h is disposed in vicinity of the piezoelectric element 10 at the distance corresponding to the minimum distance $d_{opt}$, determined as an available distance defined by basic design scheme with Eq. (3). The stealth amplifier 200h made of polymeric material is provided to amplify electric signals generated by electro-acoustic conversions in the piezoelectric element 10, to change the reflection characteristics of the ultrasonic waves passing through the piezoelectric element 10, and to avoid the reflection wave from being entered to the piezoelectric element 10, or to avoid the wave-front from being uniformly entered to the main-face of the piezoelectric layer 101, which implements the piezoelectric element 10 even if the reflection wave is generated. Even if the reflection wave is generated, unless the wave-front of the reflection wave is uniformly entered because the wave-front of the reflection wave has an inclination on the main-face of the piezoelectric layer 101, which implements the piezoelectric element 10, the electromotive force is decreased to smaller values. Furthermore, illustrations of an input connection member (resin signal wiring) electrically connecting between the piezoelectric element 10 and the stealth amplifier 200h, and a resin grounding wiring are omitted.

If the stealth amplifier 200h is made of polymeric material that is ultrasonically transparent to make an acoustic impedance of the stealth amplifier 200h equal to an acoustic impedance of the insulating resin 300, the problem of unnecessary echo-generation caused by the reflection wave can be easily solved, regardless of CMSI angle θ and the chip thickness t and the like. For example, in recent years, a chip is developed which is made of polymeric material of organic semiconductor such as polyimide substrate and the like. Since the organic semiconductor has a transparent characteristic for transmitting ultrasonic waves as compared with typical Si substrates, the problem of unnecessary echo-generation caused by the reflection wave can be solved, without any consideration of CMSI angle θ and the chip thickness t and the like.

The chip made of polymeric material used in the ultrasonic receiver pertaining to the fifth embodiment of the prevent invention means "polymeric material" in a broad sense. In the extreme, if a part of a substrate is made of a thin film of polymeric material, an active area in which active elements servicing as an amplifier are merged is not required to be organic. The active area may be a semiconductor layer, for example, which is surrounded by an element isolation region in a frame shape. Even in a complex structure made of the semiconductor layer and polymeric material layer, when the active area is made thinner than one micrometer, from an acoustic standpoint, the case that the reflection wave is hardly generated can be set, because the ultrasonic wave will transmit through the active area and the thin film of polymeric material. As the chip made of polymeric material, in addition to the polyimide substrate, polyethylene naphthalate substrate, epoxy substrate by varnish manufacturing method, and substrate made of material whose acoustic characteristics bears resemblance with the epoxy resin can be used.

Figure 39:
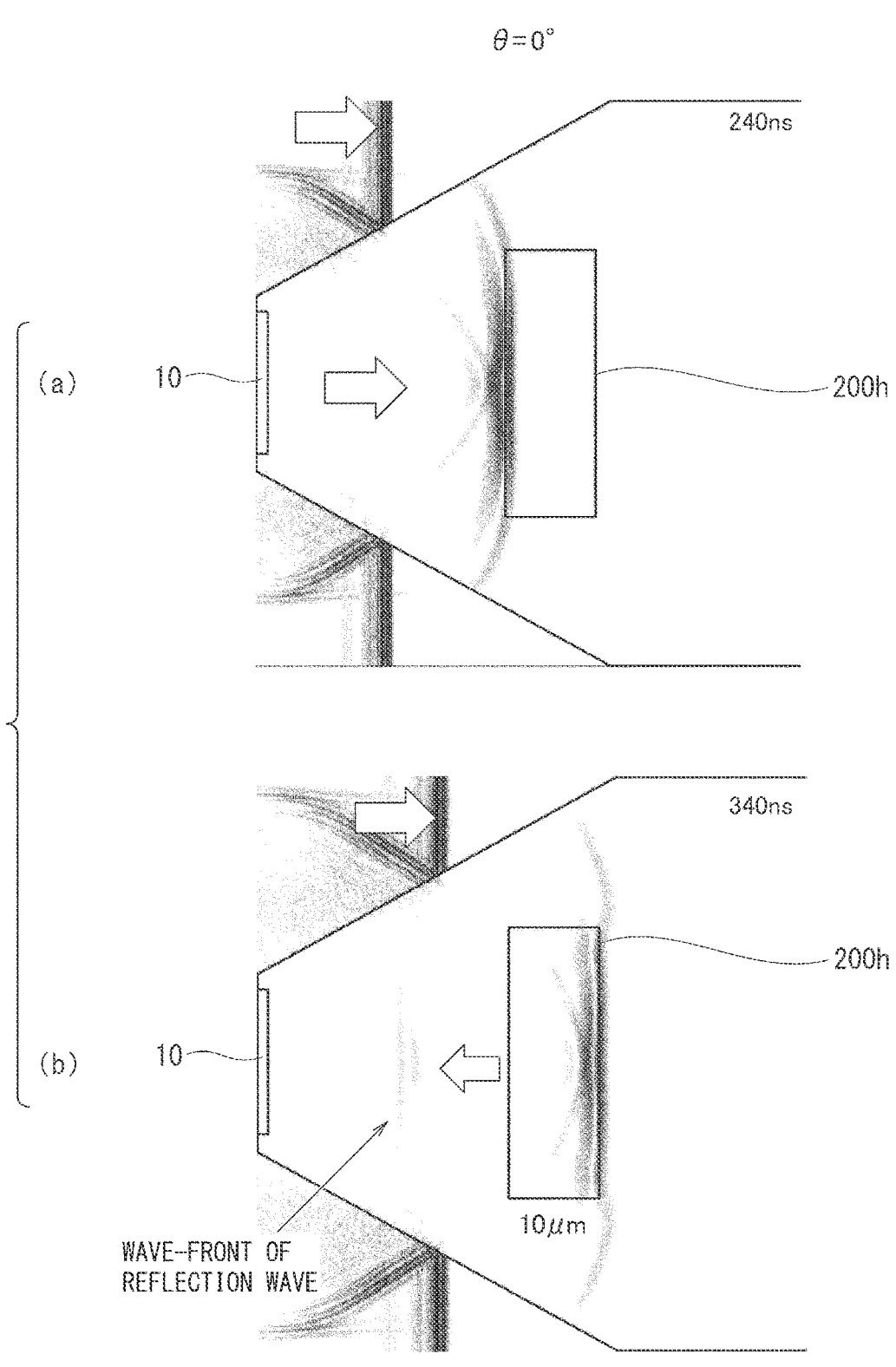
FIG. 39 is a set of views illustrating leading wave-fronts of the transmission waves sent to polyimide chips and the reflection wave reflected by one of the polyimide chips, under CMSI angle θ=0 degree, in the ultrasonic receiver pertaining to the fifth embodiment.
Figure 40:
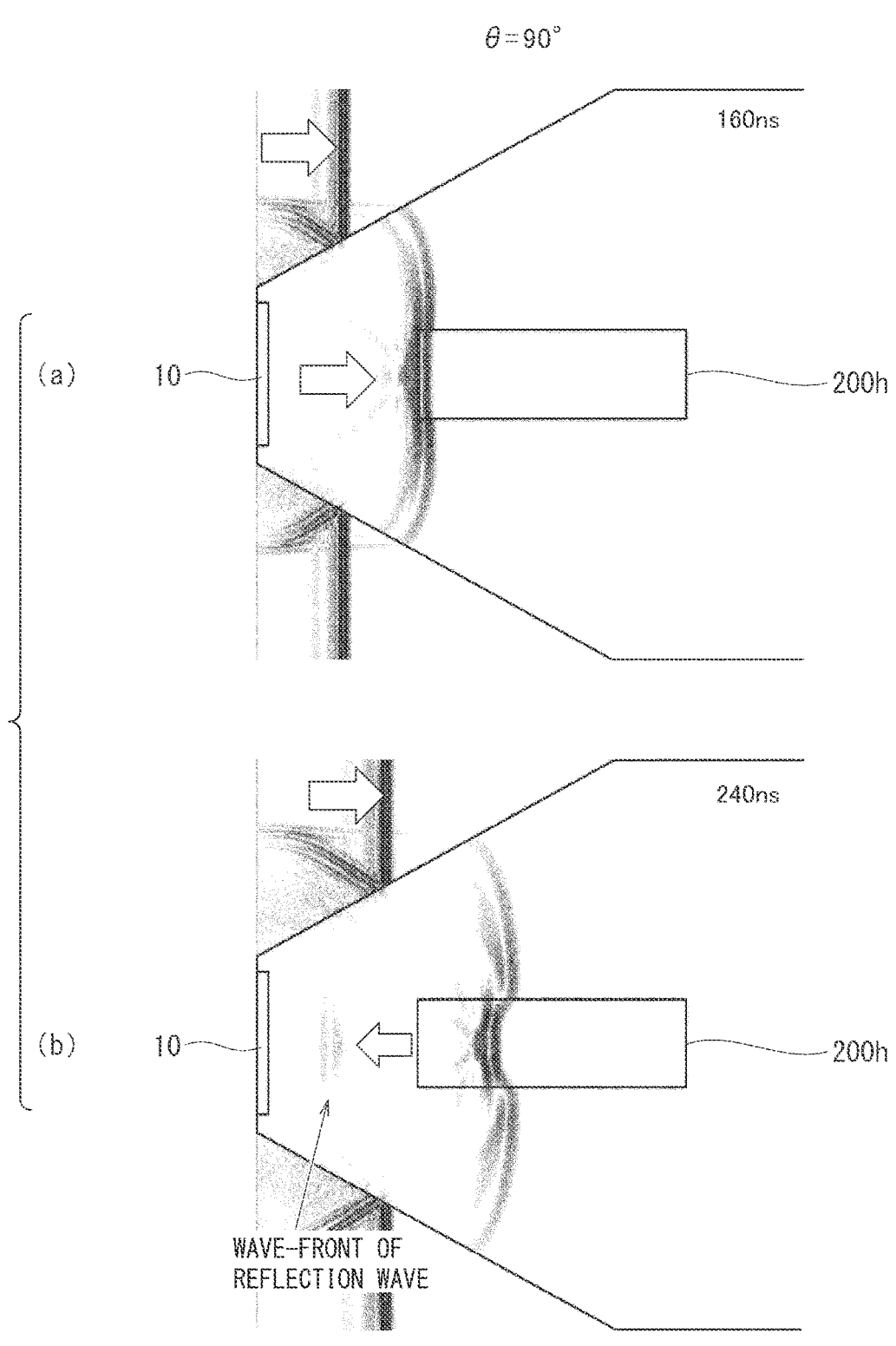
FIG. 40 is a set of views illustrating leading wave-fronts of the transmission waves sent to the polyimide chips and the reflection wave reflected by one of the polyimide chips, for CMSI angle θ=90 degrees, in the ultrasonic receiver pertaining to the fifth embodiment.

If the stealth amplifier 200h of the ultrasonic receiver pertaining to the fifth embodiment is made of polymeric material that is ultrasonically transparent, the problem of unnecessary echo-generation caused by the reflection wave can be easily solved regardless of CMSI angle θ and the chip thickness t and the like. For example, FIGS. 39 and 40 illustrate sets of time-dependent changes of the sound-pressure intensity-profiles of ultrasonic waves, which are observed for a case in which the organic semiconductor chip having a chip thickness t=10 micrometers is used as the stealth amplifier 200h. In a case of CMSI angle θ=0 degree, as illustrated in FIG. 39(a), a transmission wave arrives to a first main-face of an organic semiconductor chip at a time of 240 ns. After that, at an instant of 340 ns, as illustrated in FIG. 39(b), the transmission wave passes through the first main-face of the organic semiconductor chip and then arrives to the second main-face, and simultaneously, a weak reflection wave (unnecessary echo) is reflected by the first main-face of the organic semiconductor chip, which begins propagating back toward the piezoelectric element 10. Under a configuration of CMSI angle θ=90 degrees, as illustrated in FIG. 40(a), a transmission wave arrives to a closest side-face of the organic semiconductor chip, at an instant of 160 ns. After that, at a time of 240 ns, as illustrated in FIG. 40(b), the transmission wave arrives to the vicinities of both centers on the first and second main-faces of the organic semiconductor chip, and there are mixtures of reflection waves from the first and second main-faces, an ultrasonic wave that passes through the organic semiconductor chip and propagates toward the right direction, and the like. On the other hand, even the reflection wave reflected by the closest side-face of the organic semiconductor chip begins propagating back toward the piezoelectric element 10, in the sound-pressure intensity-profile illustrated in FIG. 40(b).

The corresponding characteristics to each of the time-dependent changes of the sound-pressure intensity-profiles in the resin horn (300, 301) illustrated in FIG. 39 is a curve representing intensity-variation of the received voltages measured in the piezoelectric element 10 illustrated in FIG. 41(a), and the corresponding characteristics to each of the time-dependent changes of the sound-pressure intensity-profiles in the resin horn (300, 301) illustrated in FIG. 40 is a curve representing intensity-variation of the received voltages in FIG. 41(b). For CMSI angle θ=0 degree, S/N ratio is about 12 dB, if the stealth amplifier is Si chip, as illustrated in FIG. 15. For CMSI angle θ=90 degrees, S/N ratio is about 12 dB, as illustrated in FIG. 15. From data of an offset amount D=0 mm in FIG. 20, S/N ratio is known to be about 12 dB in a configuration that the stealth amplifier has CMSI angle θ=90 degrees in the Si chip. On the contrary, from a result in FIG. 41(a), for CMSI angle θ=0 degree, by the stealth amplifier 200h as the organic semiconductor chip, it can be understood that S/N ratio is improved to about 25 dB. Also, from a result in FIG. 41(b), for CMSI angle θ=90 degrees, by the stealth amplifier 200h as the organic semiconductor chip, it can be understood that S/N ratio is improved to about 27 dB.

For example, under an assumption that the piezoelectric element 10 is embedded on the left side, by encompassing the main body (300, 301, 800) of the ultrasonic receiver in which the right side is thick in the two-stage stepped structure, an extraction terminal provided on an end side of the other side (right side) of the main body (300, 301, 800), a transmission path connected to the extraction terminal, and an observation apparatus connected through the transmission path, a ultrasonic-observation device pertaining to the fifth embodiment can be constructed. In the ultrasonic-observation device pertaining to the fifth embodiment, even if the transmission path such as coaxial cable has an external stray-capacitance $C_{ext}$, which is 50 times or more, further, for example, 100 times or more, or 1000 times or more larger than a signal-source capacitance $C_{signal}$ inherent in the piezoelectric element 10, for example, if the value of the external stray-capacitance $C_{ext} \approx 10$ pF, a minimum distance $d_{opt}$ can be set so that the input stray-capacitance $C_{stray}$ can have a value smaller than $\frac{1}{10}$ of the external stray-capacitance $C_{ext}$. For example, the minimum distance $d_{opt}$ can be set so that the input stray-capacitance $C_{stray}$ can have the value of about $C_{ext}/100$.

In addition, regarding the structure of the main body (300, 301, 800), for example, by thickening the diameter of the resin cylindrical portion in which the right end side is made more thicker by the stepped structure of, for example, two stages, the value of the output stray-capacitance $C_{out}$ which is parasitic in the output interconnection electrically connecting between the stealth amplifier 200h and the extraction terminal, can be designed to a lower value. Moreover, by shortening the distance between the stealth amplifier 200h and the extraction terminal, the value of the output stray-capacitance $C_{out}$ of the ultrasonic receiver pertaining to the fifth embodiment can be reduced to a smaller value. Thus, the technical concern of the output stray-capacitance $C_{out}$ can be omitted.

According to the ultrasonic receiver and ultrasonic-observation device pertaining to the fifth embodiment, since the stealth amplifier 200h is made of the resin having the transparent characteristics for transmitting ultrasonic waves, S/N ratio can be improved as compared with the case in which the stealth amplifier is made by Si substrate. Especially, if a material for the stealth amplifier 200h, which has an acoustic impedance allowing 100% of the ultrasonic wave can be transmitted, the problem of unnecessary echo-generation caused by the reflection wave can be solved without any consideration of CMSI angle θ and the chip thickness t and the like. As mentioned above, according to the ultrasonic receiver and ultrasonic-observation device pertaining to the fifth embodiment, even if PVDF film, in which the acoustic-impedance matching-characteristics with water is excellent, is used, a compact structure can be achieved. In the compact structure, the piezoelectric element 10 and the stealth amplifier 200h made of polymeric material are embedded and fixed in the resin horn (300, 301). By establishing the compact structure, the input stray-capacitance can be decreased to a smaller value. As a result, according to the ultrasonic receiver and ultrasonic-observation device pertaining to the fifth embodiment, the ultrasonic receiver and the ultrasonic-observation device that are excellent in pulse-response characteristics and high in sensitivity and high in S/N ratio, and are suitable for applications of medical purpose, can be provided.

Other Embodiment

As mentioned above, the present invention has been explained illustratively by the first to fifth embodiments. However, the descriptions and drawings that form the part of the disclosure should not be understood to limit the present invention. From the disclosure, various alternative embodiments, examples, and operating techniques may be apparent to those skilled in the art. For example, the ultrasonic receivers pertaining to the above-mentioned first to fifth embodiments have been explained under the assumption that the main-face of the IC chip employed as the stealth amplifier is flat and uniformly planar, and the reflection surface on which the transmission wave is reflected is flat and uniformly planar. However, the reflection surface is not required to be limited to the planar surface. "The planar surface" means the Euclidean plane in which the Gaussian curvature and the average curvature are always zero.

Figure 42:
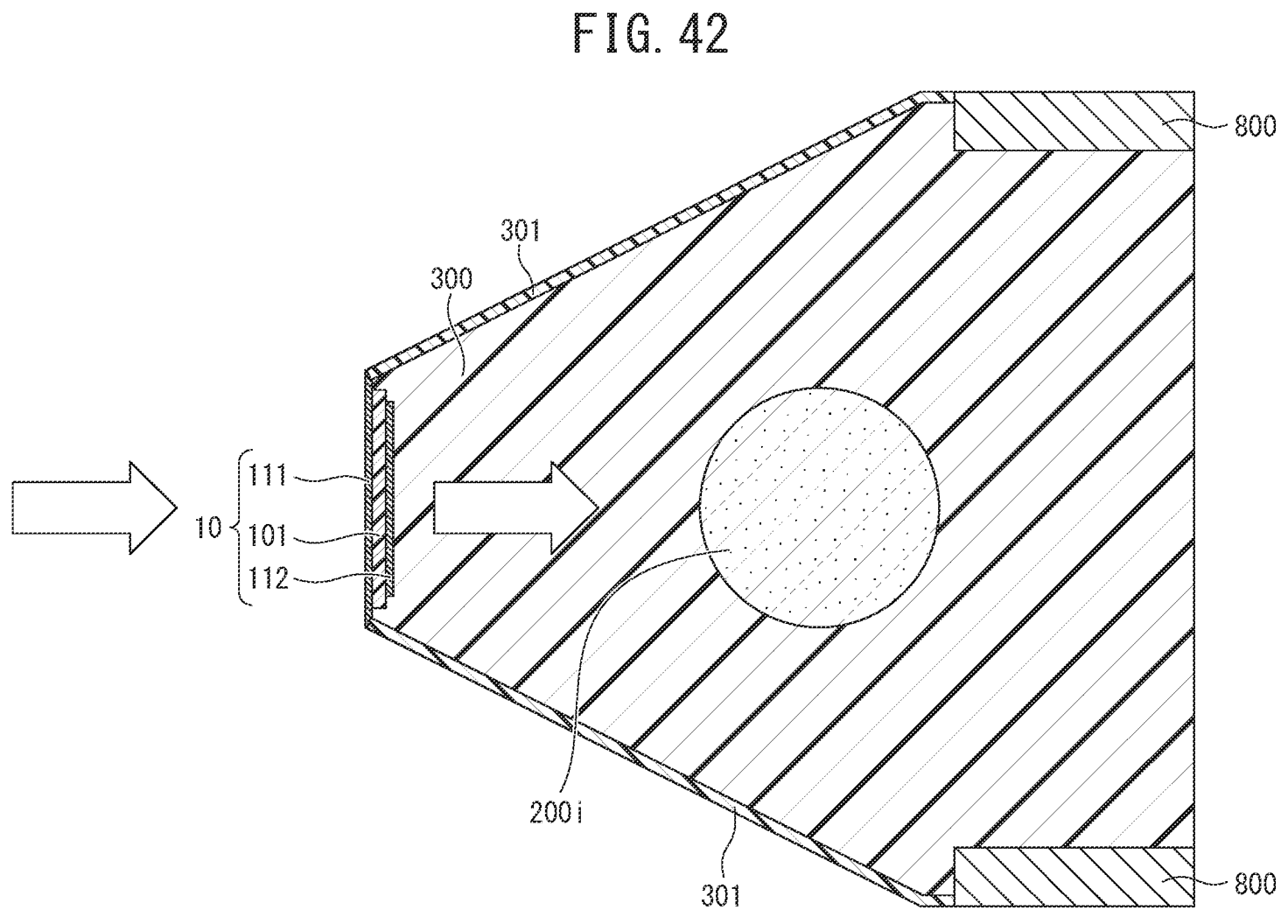

The ultrasonic receiver pertaining to another embodiment of the present invention encompasses a resin horn (300, 301) having a tapered shape in part, which has a sound-field detection-axis AX as a central axis, a piezoelectric element 10 which is partially exposed and provided at a tip of the resin horn (300, 301), and a stealth amplifier 200i embedded in the resin horn (300, 301) and arranged in the behind space onto which the shape of the piezoelectric element 10 is projected, as illustrated in FIG. 42.

The stealth amplifier 200i is disposed in vicinity of the piezoelectric element 10 at the distance corresponding to the minimum distance $d_{opt}$ determined as an available distance defined by basic design scheme with Eq. (3). The stealth amplifier 200i has a non-flat reflection surface, which is provided to amplify electric signals generated by electro-acoustic conversions in the piezoelectric element 10, to change the reflection characteristics of the ultrasonic waves passing through the piezoelectric element 10, and to avoid the reflection waves from being entered to the piezoelectric element 10, or to avoid the wave-fronts from being uniformly entered to the main-face of the piezoelectric layer 101, which implements the piezoelectric element 10 even if the reflection waves are generated. Even if the reflection waves are generated, unless the wave-fronts of the reflection waves are uniformly entered because the wave-fronts of the reflection waves have the inclinations on the main-face of the piezoelectric layer 101, which implements the piezoelectric element 10, the electromotive force is decreased to smaller values.

Although illustrations of an input connection member (resin signal wiring) electrically connecting between the piezoelectric element 10 and the stealth amplifier 200i, and a resin grounding wiring are omitted, in the ultrasonic receiver pertaining to another embodiment, even if the main-face of the IC chip employed as the stealth amplifier 200i is a non-flat curved-surface, the technical idea, concept or theory explained illustratively by the first to fifth embodiments can be similarly applied to cases in which the transmission waves are reflected by the curved-surface. As examples of three-dimensional structures where the reflection surfaces on which the transmission waves are reflected are the curved-surface, a sphere, a rugby ball (rotating ellipsoid) or an egg-shaped shape, in which the Gaussian curvatures are positive, are general. And especially, a spherical IC chip is already in practical use. However, in the ultrasonic receiver pertaining to another embodiment, under an assumption that the stealth amplifier 200i has a cylindrical topology, a two-dimensional simulation in which a cross-section vertical to a central axis of a cylinder is defined as an analysis surface will be explained in order to avoid the complexity. Although the Gaussian curvature of a cylinder is zero, the average curvature is not zero. Even in a case of the cylindrical topology, the lithography technique on the curved-surface is industry established already, and therefore, the cylindrical IC chip can be easily manufactured. Additionally, when the Gaussian curvature is negative, it becomes a hyperbolic plane.

Figure 43:
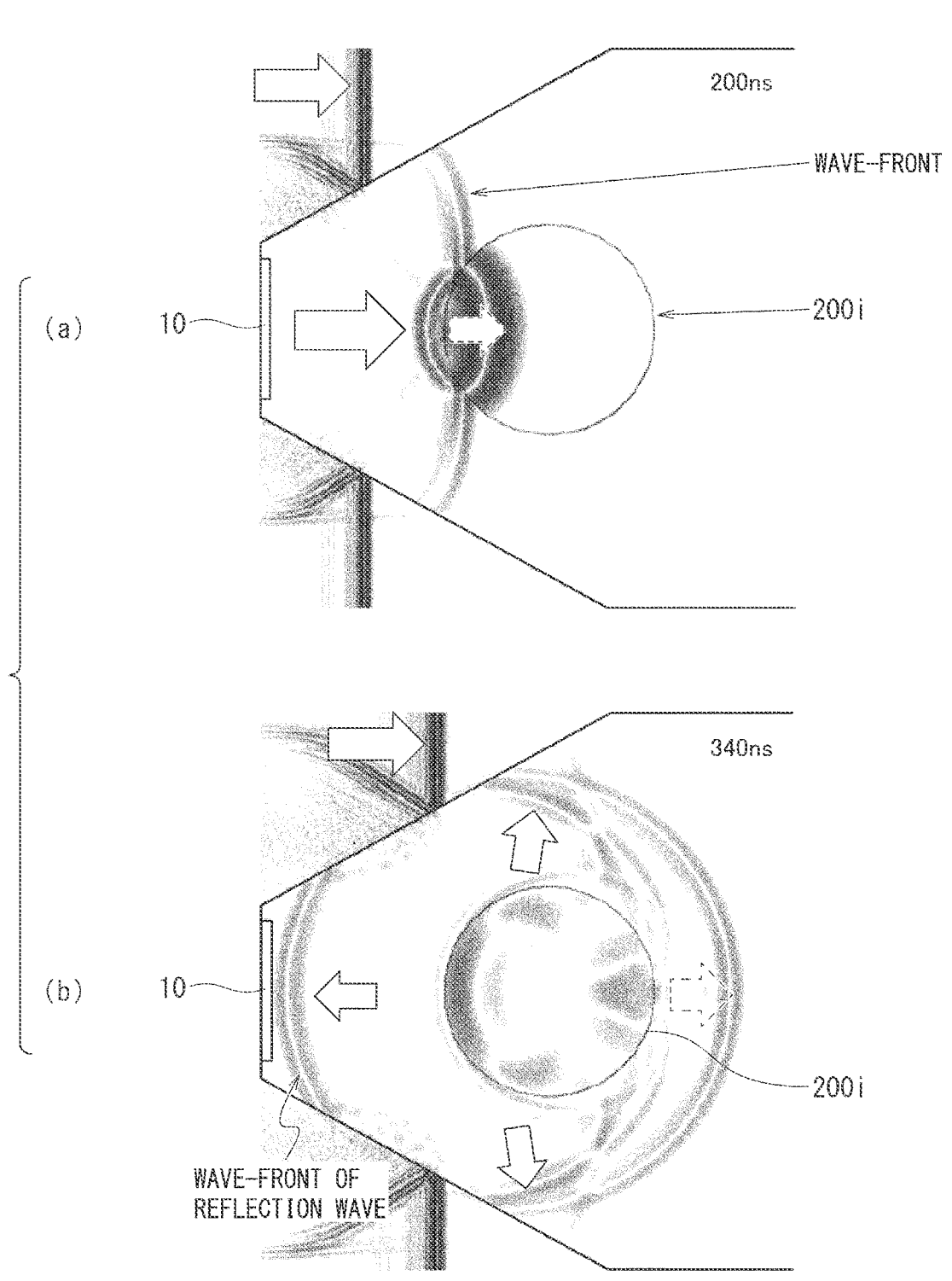
FIG. 43 is a set of views illustrating leading wave-fronts of the transmission waves sent to cylindrical chips and a plurality of reflection waves reflected by one of the cylindrical chips, in the ultrasonic receiver pertaining to another embodiment.

FIG. 42, illustrates a structure of the ultrasonic receiver pertaining to another embodiment, and the stealth amplifier 200i is assumed to be arranged just on a sound-field detection-axis AX of the ultrasonic receiver, in such way that any offset is not incorporated. The stealth amplifier 200i is a cylindrical chip whose diameter is about 1.0 mm. In FIG. 42, a central axis defining a rotational symmetrical structure of a cylinder is vertical to a paper surface. A set of results illustrated in FIG. 43 is obtained for each of the time-dependent changes of the sound-pressure intensity-profiles of the ultrasonic waves in the resin horn (300, 301) according to the ultrasonic receiver pertaining to another embodiment illustrated in FIG. 42. Firstly, as illustrated in FIG. 43(a), at an instant of 200 ns, a transmission wave arrives to a closest generatrix existing at the closest position to the piezoelectric element 10 on a side face of the cylindrical chip. A reflection wave propagating back toward the piezoelectric element 10 and the transmission wave, which passes through the cylindrical chip and travels to the direction of a furthest generatrix opposite to the closest generatrix, are generated at a time of 200 ns. After the time of 200 ns, at an instant of 340 ns, as illustrated in FIG. 43(b), the transmission wave passes through the cylindrical chip and arrives to the position exceeding the furthest generatrix opposite to the closest generatrix, and simultaneously, a wave-front of the reflection wave reflected at the position of the closest generatrix of the cylindrical chip arrives to the piezoelectric element 10. Furthermore, other reflection waves that begin propagating toward the upper and lower directions of the cylindrical chip are present. Moreover, there is the transmission wave, which travels to the right side face of the cylindrical chip and passes through an inner path in the cylindrical chip, and ultrasonic waves coming around along the upper and lower side faces to the right side of the cylindrical chip.

Figure 44:
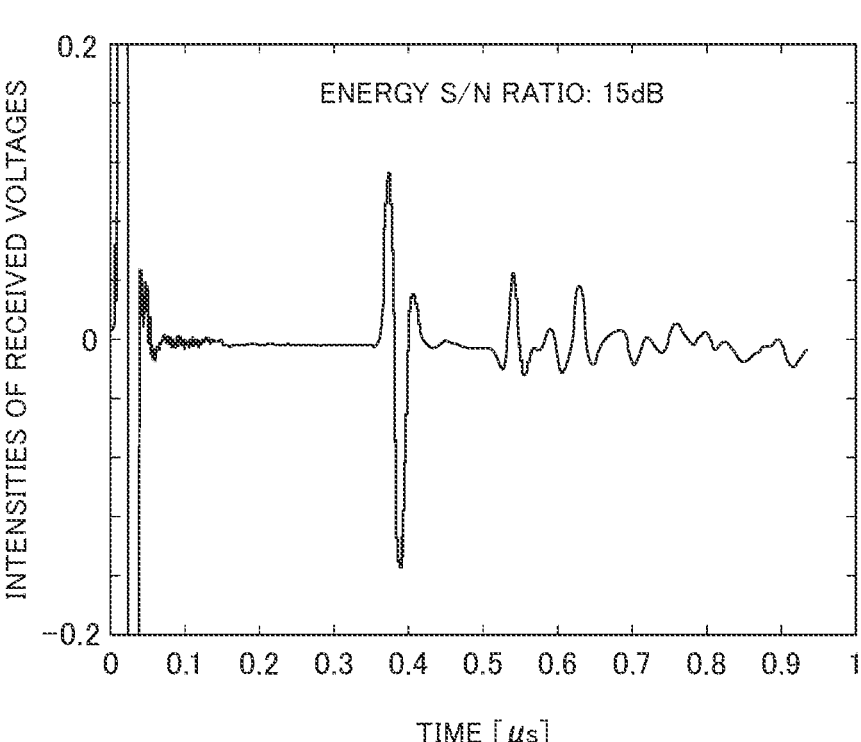
FIG. 44 illustrates an influence of the reflection wave on S/N ratio, by a diagram representing intensity variation of the reflection wave reflected by the cylindrical chip, in the ultrasonic receiver pertaining to another embodiment.

FIG. 44 illustrates a curve representing intensity-variation of the received voltages in the piezoelectric element 10, and a result in which S/N ratio is 15 dB is obtained from FIG. 44. The result is almost the same as S/N ratios when the rectangular-shaped IC chip, whose one side is about 1.0 mm, is set to CMSI angle θ=0 degree or 90 degrees without any offset. However, similarly to the case in which the chip thickness t is thinned in the fourth embodiment, the aimed values of 28 dB or more in S/N ratio can be achieved by setting the size of the cylindrical chip to a smaller value, for example, about 0.1 mm or less. Or, similarly to the case in which the offset arrangement has been employed in the second embodiment, the aimed values of 28 dB or more in S/N ratio can be achieved, by displacing the position of the cylindrical chip to the radial direction from the sound-field detection-axis AX located at the central axis by the offset amount D. Moreover, the size of the cylindrical chip may be reduced to a smaller size, and furthermore, employ the offset arrangement.

Figure 45:
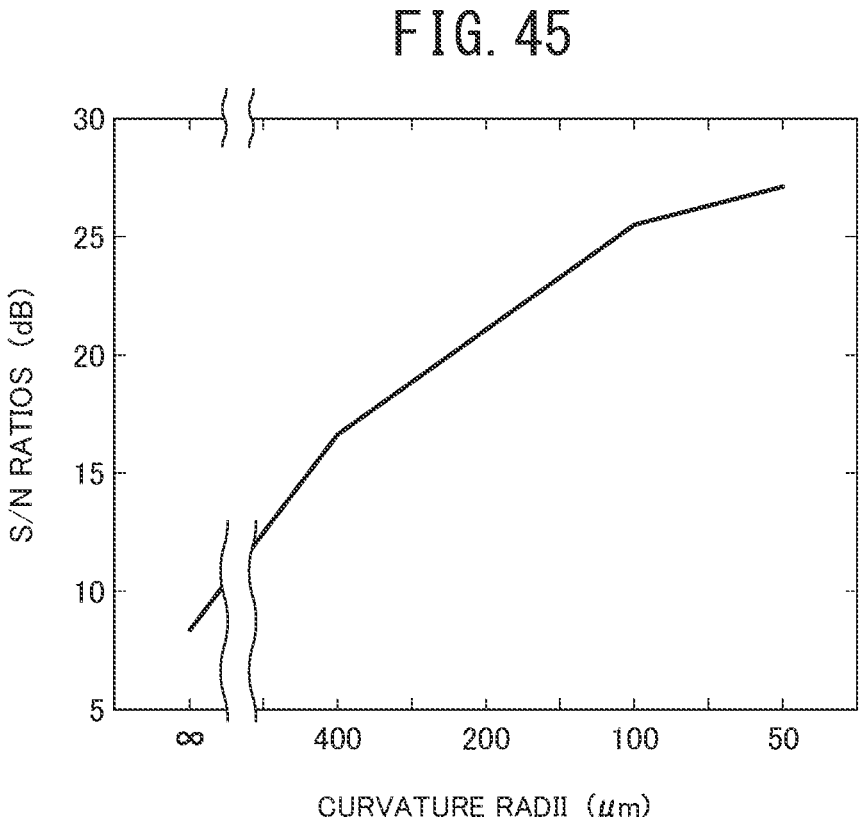
FIG. 45 is a diagram illustrating relationships between curvature radii and S/N ratios, S/N ratios are affected by reflection waves reflected by the spherical surfaces of spherical IC chips, the spherical surfaces having different curvature radii, in ultrasonic receivers pertaining to a still another embodiment.

In order to avoid the complexity in the above explanation, the explanation has been carried out with the two-dimensional simulation, in which the cross-section vertical to the central axis of the cylinder has been elected as the analysis surface, under the assumption that the stealth amplifier 200i was provided with the cylindrical shape. However, if the stealth amplifier 200i has a spherical shape, reflection waves will diverge in three-dimensional directions including a vertical direction to the paper surface of FIG. 43. In the sphere implementing three-dimensional curved-surface, when an ultrasonic wave is assumed to be firstly entered to the north pole of the sphere, an area effective for reflection becomes large proportionally depending on square of the distance from the north pole. Due to the increase of the area effective for reflection, when the spherical surface is elected as the reflection surface, the energy of the ultrasonic waves reflected at the north pole becomes small, which improves S/N ratio. As illustrated in FIG. 45, because a curvature radius of sphere becomes the smaller, S/N ratio becomes the larger, it is preferable that the curvature radius becomes the smaller. In FIG. 45, the curvature radius=∞ indicates the case of the flat surface. Although S/N ratio in the case of the curvature radius=∞ is about 8 dB, it is indicated that S/N ratio can be achieved to the aimed value of 28 dB, by reducing the curvature radius of the sphere to 50 micrometers. Then, in the case of using the spherical IC chip, since the reflection waves diverge in the three-dimensional directions, only extremely small reflection wave can arrive to the piezoelectric element 10, as compared with the case of the cylinder, and therefore, technical advantages achieved by the ultrasonic receivers pertaining to the second to fifth embodiments can be enhanced more effectively.

The shape of the stealth amplifier 200i used in the ultrasonic receiver pertaining to another embodiment is not limited to the cylinder or the sphere, and may include a solid torus—annulus—having a circular inner diameter, or a donut shape. If the piezoelectric element 10 is circular, the corresponding behind space becomes a cylindrical region onto which the piezoelectric element 10 is projected along the sound-field detection-axis AX. Thus, if the stealth amplifier 200i is constructed by the torus surrounding the cylindrical behind space, the stealth amplifier 200i can be arranged at a site dislocated from the behind space. The behind space defined for a case when the piezoelectric element 10 is circular is the cylindrical projection region that can be generated by the parallel movement around the outer circumference of the piezoelectric element 10 along the sound-field detection-axis AX, then the diameter of the inner circumference of the torus shall be designed to be larger than the diameter of the outer circumference of the piezoelectric element 10. Anyway, according to the ultrasonic receiver pertaining to another embodiment and the ultrasonic-observation device using the ultrasonic receiver, a compact structure, in which the piezoelectric element 10 and the stealth amplifier 200i having the curved-contour are merged in the resin horn (300, 301) so as to decrease the input connection capacitance to smaller value, is achieved. And therefore, the ultrasonic receiver and the ultrasonic-observation device that are excellent in pulse-response characteristics, and are high in sensitivity and high in S/N ratio, and suitable for applications of medical purpose can be provided.

Furthermore, the above explanations have been carried out under the situations that the ultrasonic receivers are mainly addressing to the hydrophone. However, the present invention can be applied to ultrasonic receivers, each having the piezoelectric element 10, other than the hydrophone. Also, the above explanations have been carried out under the assumptions that the stealth amplifiers are disposed in vicinity of the piezoelectric element 10. However, the IC chip is allowed to include an integrated circuit having a function other than the amplifier, or the IC chip may be a chip having a different function that replaces the amplifier. Moreover, an improved technical advantage in S/N ratio can be obtained, only by disposing a component having a function resembling to the screen member explained in the third embodiment behind the piezoelectric element 10, instead of arranging the IC chip.

Figure 41:
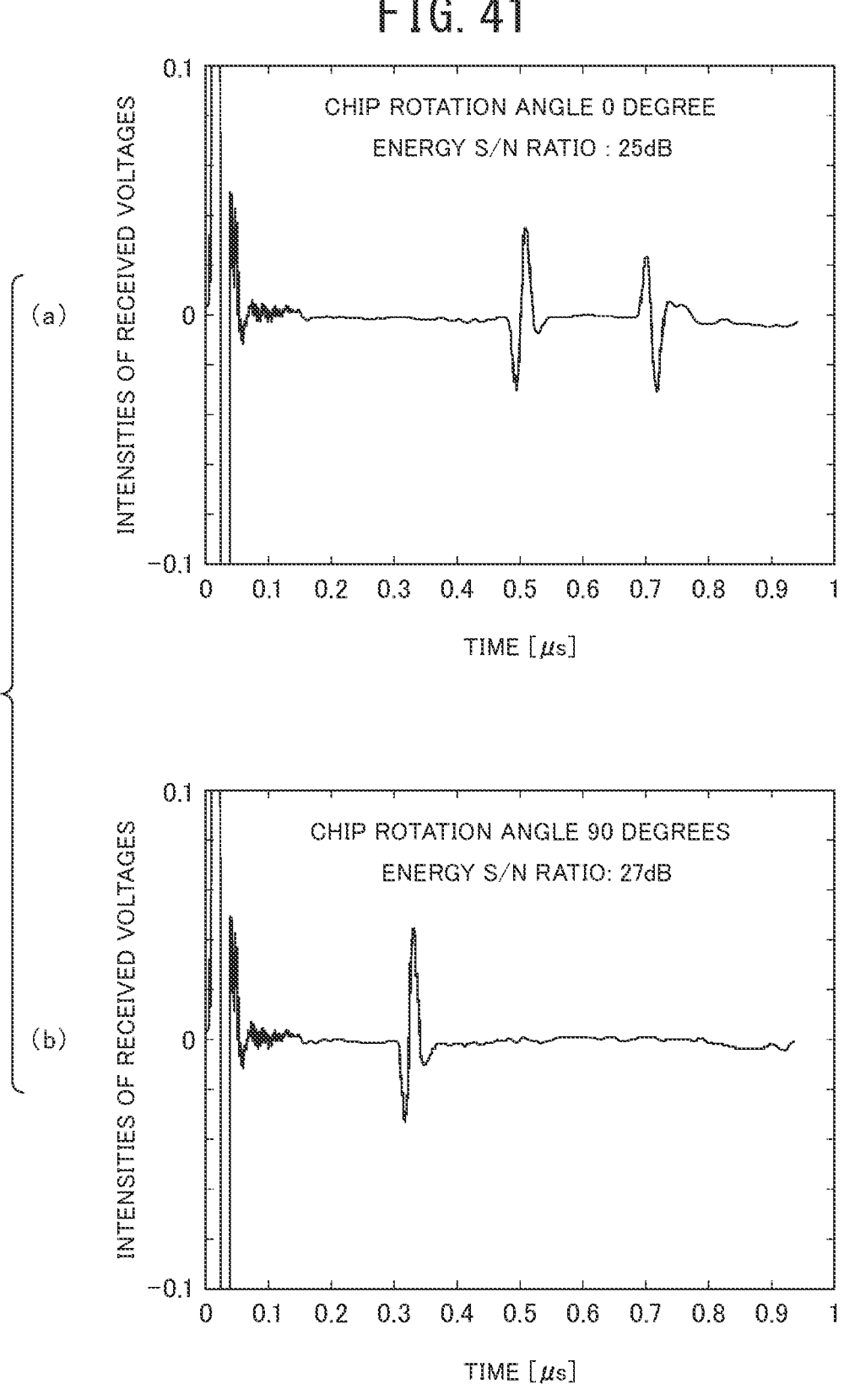
FIG. 41 illustrates a set of waveforms due to intensity variation of reflection waves, representing the influences of the reflection waves on S/N ratios, the reflection waves are reflected by the IC chips, in a case that the IC chips are molded by polyimide, in the ultrasonic receiver pertaining to the fifth embodiment.

Also, the respective technical ideas explained in the first to fifth embodiments can be combined with each other. For example, in the explanation of the ultrasonic receiver pertaining to the fifth embodiment, the value of S/N ratio derived from the set of result illustrated in FIG. 41 is a value slightly lower than the aimed value of 28 dB. However, the aimed values of 28 dB or more can be achieved by applying the technical idea of the ultrasonic receiver explained in the fifth embodiment that uses polymeric material chip to the technical ideas of the ultrasonic receivers explained in the first to fourth embodiments. Or alternatively, by applying the technical idea of the ultrasonic receiver pertaining to another embodiment, and using polymeric material chip instead of the semiconductor chip, the aimed values of 28 dB or more can be achieved.

Moreover, in the first to third embodiments and the like, although the cases in which the input connection members electrically connecting between the piezoelectric element and the stealth amplifier have been exemplified, respectively, the input connection member shall not be limited to the resin-made wiring. "The input connection member" may be any member made of materials other than resin, such as metallic wirings, if the input connection member can have the function for electrically connecting between various piezoelectric elements and the stealth amplifier. Thus, it should be noted that the present invention is not limited to the description of the first to fifth embodiments described above, and various modifications can be made, which are also included within the scope of the invention. Therefore, the scope of the present invention is defined only by the technical features specifying the present invention, which are prescribed by claims. And therefore, the words and terms in the claims shall be reasonably construed from the subject matters recited in the present specification.

What is claimed is:

1. An ultrasonic receiver comprising:
a resin horn having a tapered shape in part, configured to include a sound-field detection-axis as a central axis;
a piezoelectric element provided at a tip of the tapered shape, partially exposed to outside;
a stealth amplifier disposed at a predetermined minimum distance from the piezoelectric element, embedded in the resin horn and arranged in a behind space, onto which a shape of the piezoelectric element is projected along the central axis, configured to amplify electric signals generated by an ultrasonic wave transmitted through the piezoelectric element in parallel with the sound-field detection-axis through electro-acoustic conversion in the piezoelectric element, to change reflection characteristic of a reflection wave, which is the ultrasonic wave reflected by the stealth amplifier, and to avoid the reflection wave from being entered to the piezoelectric element; and
an input connection member electrically connecting between the piezoelectric element and the stealth amplifier,
wherein the predetermined minimum distance is a distance determined by design as a theoretical minimum value of an input stray-capacitance, which is parasitic in the input connection member, the theoretical minimum value is calculated from a sum of a component which increases depending on the distance, and another component which decreases inversely proportional to the distance.

2. The ultrasonic receiver of claim 1, wherein the stealth amplifier is a plate-shaped integrated-circuit chip having a flat main-face, and an orientation of the integrated-circuit chip is determined so that an angle between a normal direction of the main-face and the sound-field detection-axis is 30 degrees and more and 60 degrees or less.

3. An ultrasonic receiver comprising:
a resin horn having a tapered shape in part, configured to include a sound-field detection-axis as a central axis;
a piezoelectric element provided at a tip of the tapered shape, partially exposed to outside;
a stealth amplifier disposed at a predetermined minimum distance from the piezoelectric element, embedded in the resin horn and arranged in a position displaced from a behind space, onto which a shape of the piezoelectric element is projected along the central axis, configured to amplify electric signals generated by an ultrasonic wave transmitted through the piezoelectric element in parallel with the sound-field detection-axis through electro-acoustic conversion in the piezoelectric element, to change reflection characteristic of a reflection wave, which is the ultrasonic wave reflected by the stealth amplifier, and to avoid the reflection wave from being entered to the piezoelectric element; and
an input connection member electrically connecting between the piezoelectric element and the stealth amplifier,
wherein the predetermined minimum distance is a distance determined by design as a theoretical minimum value of an input stray-capacitance, which is parasitic in the input connection member, the theoretical minimum value is calculated from a sum of a component which increases depending on the distance, and another component which decreases inversely proportional to the distance.

4. The ultrasonic receiver of claim 3, wherein the stealth amplifier is a plate-shaped integrated-circuit chip having a flat main-face, and quadruple side-faces connected to the main-face, a closest side-face located closest to the piezoelectric element among the quadruple side-faces is beveled to an angle of 30 degrees and more and 60 degrees or less with respect to the main-face.

5. The ultrasonic receiver of claim 4, further comprising:
a printed circuit board, on a part of which the integrated-circuit chip is mounted;
an outer connection lead line provided on another part of the printed circuit board; and
a plate-shaped screen member a flat stealth plane provided at a still another part of the printed circuit board between the integrated-circuit chip and the outer connection conductive lead, an angle between a normal direction of the stealth plane and the sound-field detection-axis is 30 degrees or more and 60 degrees or less.

6. An ultrasonic-observation device comprising:
a main body including a resin horn at one end, the resin horn having a tapered shape shrinking toward a side of the one end, defining a sound-field detection-axis as a central axis;
a piezoelectric element provided at a tip of the tapered shape, partially exposed to outside;
a stealth amplifier disposed at a predetermined minimum distance from the piezoelectric element, embedded in the resin horn and arranged in a behind space, onto which a shape of the piezoelectric element is projected along the central axis, configured to amplify electric signals generated by an ultrasonic wave transmitted through the piezoelectric element in parallel with the sound-field detection-axis through electro-acoustic conversion in the piezoelectric element, to change reflection characteristic of a reflection wave, which is the ultrasonic wave reflected by the stealth amplifier, and to avoid the reflection wave from being entered to the piezoelectric element;
an input connection member electrically connecting between the piezoelectric element and the stealth amplifier, an extraction terminal connected to other end of the main body;
an output interconnection electrically connecting between the stealth amplifier and the extraction terminal;
a transmission path connected to the extraction terminal, having an output stray-capacitance 50 times or more larger than signal-source capacitance inherent in the piezoelectric element; and
an observation apparatus connected to the transmission path,
wherein the predetermined minimum distance is a distance determined by design, in such a way that an input stray-capacitance parasitic in the input connection member becomes a value smaller than $\frac{1}{10}$ of the output stray-capacitance.

7. The ultrasonic-observation device of claim 6 wherein the stealth amplifier is a plate-shaped integrated-circuit chip having a flat main-face, and an orientation of the integrated-circuit chip is determined so that an angle between a normal direction of the main-face and the sound-field detection-axis is 30 degrees or more and 60 degrees or less.

8. An ultrasonic-observation device comprising:
a main body including a resin horn at one end, the resin horn having a tapered shape shrinking toward a side of the one end, defining a sound-field detection-axis as a central axis;
a piezoelectric element provided at a tip of the tapered shape, partially exposed to outside;

a stealth amplifier disposed at a predetermined minimum distance from the piezoelectric element, embedded in the resin horn and arranged in a position displaced from a behind space, onto which a shape of the piezoelectric element is projected along the central axis, configured to amplify electric signals generated by an ultrasonic wave transmitted through the piezoelectric element in parallel with the sound-field detection-axis through electro-acoustic conversion in the piezoelectric element, to change reflection characteristic of a reflection wave, which is the ultrasonic wave reflected by the stealth amplifier, and to avoid the reflection wave from being entered to the piezoelectric element;

an input connection member electrically connecting between the piezoelectric element and the stealth amplifier, an extraction terminal connected to other end of the main body;

an output interconnection electrically connecting between the stealth amplifier and the extraction terminal;

a transmission path connected to the extraction terminal, having an output stray-capacitance 50 times or more larger than signal source capacitance existing in the piezoelectric element; and an observation apparatus connected to the transmission path, wherein the predetermined minimum distance is a distance between the piezoelectric element and the stealth amplifier, which is determined by design, in such a way that an input stray-capacitance parasitic in the input connection member becomes a value smaller than $\frac{1}{10}$ of the output stray-capacitance.

\* \* \* \* \*